(12) United States Patent
Suzuki et al.

(10) Patent No.: US 8,274,625 B2
(45) Date of Patent: Sep. 25, 2012

(54) CELLULOSE ESTER FILM, METHOD FOR PRODUCTION OF CELLULOSE ESTER FILM, AND PROTECTIVE FILM FOR POLARIZING PLATE, POLARIZING PLATE AND LIQUID CRYSTAL DISPLAY DEVICE EACH USING THE CELLULOSE ESTER FILM

(75) Inventors: Takatugu Suzuki, Tokyo (JP); Takayuki Suzuki, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 374 days.

(21) Appl. No.: 12/664,683

(22) PCT Filed: Jul. 3, 2008

(86) PCT No.: PCT/JP2008/062083
§ 371 (c)(1),
(2), (4) Date: Dec. 15, 2009

(87) PCT Pub. No.: WO2009/011229
PCT Pub. Date: Jan. 22, 2009

(65) Prior Publication Data
US 2010/0188622 A1 Jul. 29, 2010

(30) Foreign Application Priority Data

Jul. 19, 2007 (JP) ................................. 2007-188137
Aug. 10, 2007 (JP) ................................. 2007-209231

(51) Int. Cl.
*G02F 1/1335* (2006.01)
(52) U.S. Cl. .......... 349/96; 349/117; 349/118; 349/119; 349/120; 349/121; 349/122
(58) Field of Classification Search .................. 349/95, 349/96, 117–122
See application file for complete search history.

(56) References Cited

U.S. PATENT DOCUMENTS
4,981,944 A * 1/1991 Bartels et al. ................. 528/220
(Continued)

FOREIGN PATENT DOCUMENTS
| CN | 1653123 | | 8/2005 |
| JP | 6501040 | | 2/1994 |
| JP | 2000352620 | | 12/2000 |
| JP | 2001066781 A * | 3/2001 |

(Continued)

OTHER PUBLICATIONS

SIPO Office Action dated May 24, 2011 (6 pages) and English language Translation thereof (8 pages).

*Primary Examiner* — Hoan C Nguyen
(74) *Attorney, Agent, or Firm* — Lucas & Mercanti, LLP

(57) ABSTRACT

Disclosed is a cellulose ester film which rarely causes the attachment of foreign matters to the surface of a conveying roll or the failure of film transfer induced by the attachment of the foreign matters, which is free of the partial deformation caused by foreign matters on the conveying roll, exhibits high durability after saponification treatment, has good close adhesion to a polarizer, and has excellent processing suitability in the processing into a polarizer. Also disclosed is a method for producing the cellulose ester film by a melt-casting process. Further disclosed are; a protective film for a polarizing plate, which has high film strength; a polarizing plate having high durability; and a liquid crystal display having high image quality; each comprising the cellulose ester film. The cellulose ester film comprises a cellulose ester, a compound represented by the general formula (1) and a compound represented by the general formula (2).

$$G \!-\!\!\!+\! L\text{-}R_1)_r \quad (1)$$

$$(HO)_{\overline{m}} G \!-\!\!\!+\! L\text{-}R_1)_n \quad (2)$$

14 Claims, 1 Drawing Sheet

U.S. PATENT DOCUMENTS

| | | | |
|---|---|---|---|
| 5,667,950 A * | 9/1997 | Schmidt | 430/510 |
| 5,672,792 A * | 9/1997 | Tassara et al. | 570/229 |
| 6,090,988 A * | 7/2000 | Kambe et al. | 568/687 |
| 2003/0171458 A1* | 9/2003 | Buchanan et al. | 524/32 |
| 2009/0316417 A1* | 12/2009 | Chari et al. | 362/326 |
| 2010/0188622 A1* | 7/2010 | Suzuki et al. | 349/96 |

FOREIGN PATENT DOCUMENTS

| | | |
|---|---|---|
| JP | 2003068465 | 3/2003 |
| JP | 2006265301 | 10/2006 |
| JP | 2007138121 | 6/2007 |
| WO | 03/062314 | 7/2003 |

* cited by examiner

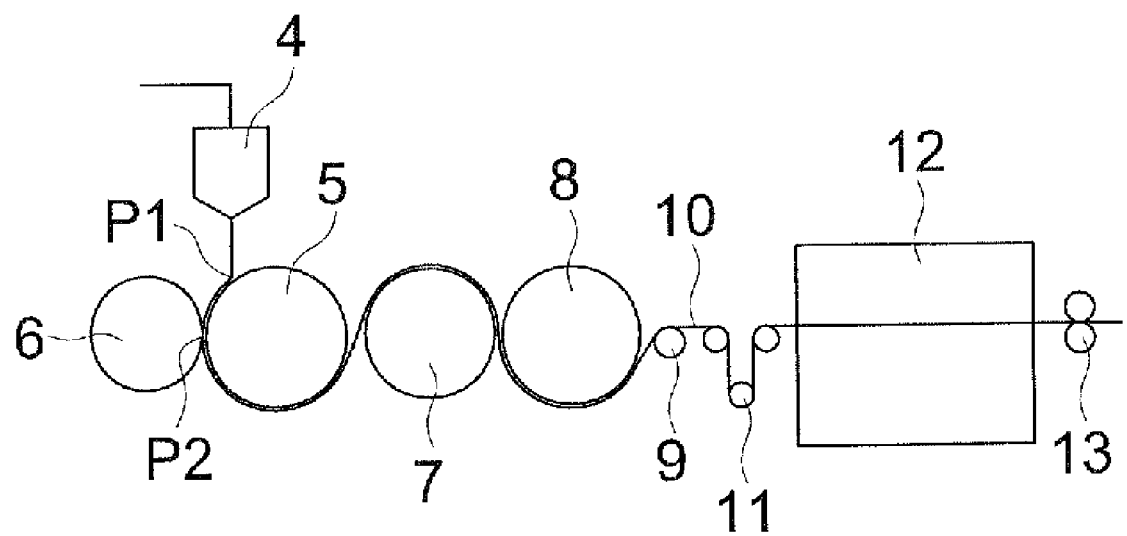

CELLULOSE ESTER FILM, METHOD FOR PRODUCTION OF CELLULOSE ESTER FILM, AND PROTECTIVE FILM FOR POLARIZING PLATE, POLARIZING PLATE AND LIQUID CRYSTAL DISPLAY DEVICE EACH USING THE CELLULOSE ESTER FILM

CROSS REFERENCE TO RELATED APPLICATION

This is a U.S. National Phase Application under 35 U.S.C. 371 of International Application PCT/JP2008/062083, filed Jul. 3, 2008, which claims the priority of Japanese Application No. 2007-188137, filed Jul. 19, 2007, which, in turn, claims the priority of JP2007-209231, filed Aug. 10, 2007, the entire contents of all three Applications are hereby incorporated by reference.

TECHNICAL FIELD

The present invention relates to a cellulose ester film and a method for producing a cellulose ester film, as well as a polarizing plate protective film, a polarizing plate, and a liquid crystal display device using the same.

BACKGROUND

Cellulose ester films have been used for supports of photographic negative films and for polarizing plates as films protecting polarizers used in liquid crystal displays, due to their high transparency, low birefringence properties, and easy adhesion properties to such polarizers.

Over recent years, the production volume of liquid crystal displays has remarkably increased due to their thin depth and lightweight and demands therefor are increasing. Further, TV sets using a liquid crystal display have features such as thinness and lightweight, whereby large-size TV sets have been produced, but such a large size has not been realized by conventional TV sets using cathode ray tubes. With this demands for polarizers and polarizer protective films constituting liquid crystal displays are increasing.

These cellulose ester films have been conventionally produced only via a solution casting method. The solution casting method is a film formation method in which a cellulose ester is dissolved in a solvent and the resulting solution is cast into a film. Then, the solvent is evaporated, followed by being dried to obtain a film. Such a film formed via the solution casting method exhibits enhanced flatness, whereby by use thereof, liquid crystal displays realizing high image quality without non-uniformity can be obtained.

However, the solution casting method requires a large amount of an organic solvent, resulting in the problem of a large environmental load. A cellulose ester film is formed using a halogen-based solvent having a large environmental load due to its dissolution characteristics, whereby especially, the reduction of the used amount of the solvent is being required, resulting in the difficulty of increasing production of a cellulose ester film via the solution casting method.

Therefore, in recent years, attempts for melt film formation from cellulose esters without any organic solvent have been conducted for sliver halide photography (Patent Document 1) or polarizer protective films (Patent Document 2). However, cellulose esters are polymers exhibiting very high viscosity during melting, as well as having high glass transition point. Thereby, it has become clear that to lower melt viscosity and glass transition point, a plasticizer is effectively added.

In above Patent Documents 1 and 2, used are phosphoric acid ester-based plasticizers such as triphenyl phosphate or phenylenebisdiphenyl phosphate. However, the results of investigations conducted by the present inventors made it clear that these phosphoric acid-based plasticizers exhibit high moisture permeability, whereby phosphoric acid esters are decomposed and phosphoric acid is generated, resulting in the problem of deterioration of a cellulose ester and a polarizer caused by the generated phosphoric acid.

As plasticizers used for cellulose esters other than phosphoric acid ester-based ones, sugar derivatives are disclosed in Patent Documents 3, 4 and 5. Plasticizers containing sugar derivatives exhibit enhanced chemical stability and do not generate any strong acid causing deterioration of cellulose esters, being, therefore, preferable plasticizers for the cellulose esters.

Generally, in production of a cellulose ester film, conveyance is carried out using conveyance rolls and drying is conducted using a drying apparatus or through a stretcher to obtain a cellulose ester film. However, it has become clear that in the methods described in Patent Documents 3, 4 and 5, foreign substances are deposited on rolls during the process using these conveyance rolls and these foreign substances are transferred to the film, resulting in problems such that the film surface is contaminated and pressure defects, in which the film is partially deformed via pressure by raised portions of the foreign substances, are produced.

Further, a cellulose ester film provided with a functional layer such as a hard coat layer, an anti-reflection layer, or an antistatic layer is commonly applied on the top surface of a display device such as a liquid crystal one. However, it has become clear that in the methods described in Patent Documents 3, 4 and 5, abrasion resistance of a cellulose ester film provided with such a functional layer is deteriorated.

When a polarizing plate is produced by bonding a polarizer protective film and a polarizer, a cellulose ester film is immersed in an alkali liquid of high temperature and high concentration to allow a water-soluble adhesive to be easily coated, namely, saponification is carried out for hydrophilic treatment of the film surface, and then the adhesive is coated for bonding to the polarizer. However, in the methods described in Patent Documents 3, 4 and 5, it has become clear that noted is the problem of adhesion properties of a cellulose ester film after saponification, resulting in difficulty in continuous production of polarizing plates; and also, when a cellulose ester film and a polarizer are bonded together, minute bubbles are generated at the interface therebetween, resulting in occurrence of minute foreign substance defects on the bonded surface. It has become clear that these defects impair visibility to a large extent and decease yield markedly in the production process of polarizing plates. Improvement of these problems is a big challenge and it has been demanded that these problems are solved.

Patent Document 1: Japanese Translation of PCT International Application Publication No. 6-501040
Patent Document 2: Unexamined Japanese Patent Application Publication (hereinafter referred to as JP-A) No. 2000-352620
Patent Document 3: Japanese Translation of PCT International Application Publication No. 2005-515285
Patent Document 4: JP-A No. 2006-265301
Patent Document 5: JP-A No. 2007-138121

DISCLOSURE OF THE INVENTION

Problems to be Solved by the Invention

In view of the above problems, the present invention was achieved. An object of the present invention is to provide a cellulose ester film in which foreign substance adhesion on the conveyance roll surface and the resulting film transfer defects are generated to a minimal extent; no pressure defects caused by foreign substances on conveyance rolls occur; durability after saponification is enhanced; excellent adhesion properties to a polarizer is expressed; and excellent processability during processing into a polarizing plate is expressed; as well as to provide such a cellulose ester film via a melt film-forming method. Further, the object is to provide a polarizing plate protective film exhibiting large film strength and a polarizing plate exhibiting enhanced durability, as well as a liquid crystal display realizing high image quality, using the cellulose ester film.

The above object has been attained by the following constitutions:

1. A cellulose ester film comprising a cellulose ester, a compound represented by Formula (1) and a compound represented by Formula (2);

Formula (1):

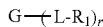

Formula (2):

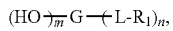

wherein G represents a monosaccharide residue or a polysaccharide residue having 2 to 10 monosaccharide units; L represents a divalent linking group comprising one or more group selected from a group of a single bond, —O—, —CO—, —$NR_2$— (wherein $R_2$ represents an aliphatic group or an aromatic group) and an aliphatic group; $R_1$ represents an aliphatic group or an aromatic group, each of which may have a substituent respectively; m and n represent an integer of 1 or more; r represents an integer of 3 or more and m+n≧3.

2. The cellulose ester film of item 1 satisfying Expression (I);

$$0.20 \leq a/(a+b) \leq 0.80, \quad \text{Expression (I)}$$

wherein a % by mass represents a content of the compound represented by Formula (1), and b % by mass represents a content of the compound represented by Formula (2).

3. The cellulose ester film of item 1 or 2 satisfying Expression (II);

$$0.20 \leq a/(a+b+c) \leq 0.80, \quad \text{Expression (II)}$$

wherein a % by mass represents a content of the compound represented by Formula (1), b % by mass represents a content of the compound represented by Formula (2) and c by mass represents a content of the compound represented by Formula (3);

Formula (3):

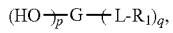

wherein G represents a monosaccharide residue or a polysaccharide residue having 2 to 10 monosaccharide units; represents a divalent linking group comprising one or more group selected from a group of a single bond, —O—, —CO—, —$NR_2$— (wherein $R_2$ represents an aliphatic group or an aromatic group) and an aliphatic group; $R_1$ represents an aliphatic group or an aromatic group, each of which may have a substituent respectively; p and q represent an integer of 1 or more, p≠m, q≠n and p+q≦3.

4. The cellulose ester film of any one of items 1 to 3, wherein L in Formulas (1) to (3) is a divalent liking group represented by —OCO—.

5. The cellulose ester film of any one of items 1 to 4, wherein G in Formulas (1) to (3) is the polysaccharide residue having 2 to 6 monosaccharide units.

6. The cellulose ester film of item 5, wherein G is a sucrose residue.

7. The cellulose ester film of any one of items 1 to 6, wherein $R_1$ in Formulas (1) to (3) is an aromatic group.

8. The cellulose ester film of any one of items 1 to 7 comprising a compound represented by Formula (4);

Formula (4):

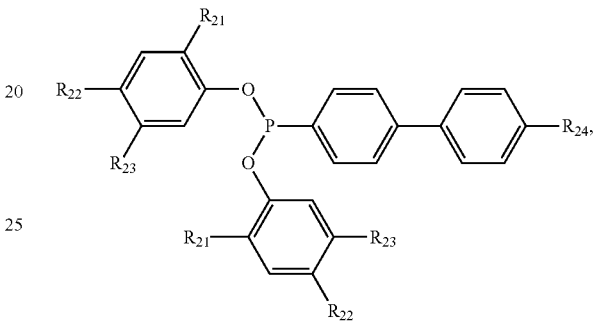

wherein $R_{21}$ and $R_{22}$ represent an alkyl group or a cyclo alkyl group, each of which may have a substituent respectively; $R_{23}$ represents an alkyl group or a cyclo alkyl group or an aryl group, each of which may have a substituent respectively; and $R_{24}$ represents a hydrogen atom or a phosphor atom.

9. The cellulose ester film of any one of items 1 to 8 comprising a compound represented by Formula (5) or a compound represented by Formula (6);

Formula (5):

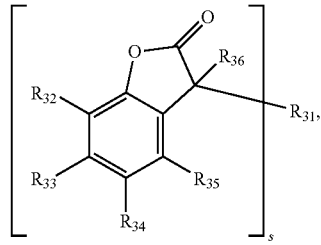

wherein $R_{32}$ and $R_{35}$ each independently represent a hydrogen atom or a substituent; $R_{36}$ represent a hydrogen atom or a substituent; s represents an integer of 1 to 4; $R_{31}$ represents a substituent when s is 1; $R_{31}$ represents a linking group having 2 to 4 valence when s is an integer of 2 to 4; wherein the substituent represent an alkyl group, a cyclo alkyl group, an aryl group, an acylamino group, an alkylthio group, an arylthio group, an alkenyl group, a halogen atom, an alkynyl group, a heterocyclic group, an alkylsulfonyl group, an arylsulfonyl group, an alkylsulfynyl group, an arylsulfynyl group, a phosphono group, an acyl group, a carbamoyl group, a sulfamoyl group, a sulfonamide group, a cyano group, an alkoxy group, an aryloxy group, a heterocyclic oxy group, a cyloxy group, an acyloxy group, a sulfonic acid group, a salt of sulfonic acid, an aminocarbonyloxy group, an amino group, an anilino group, an imide group, an ureido group, an alkoxycarbonylamino group, an alkoxycarbonyl group, an aryloxycarbonyl group, a heterocyclicthio group, a thioureido group, a carboxyl group, a salt of carboxylic acid, a hydroxyl group, a mercapto group or a nitro group;

Formula (6):

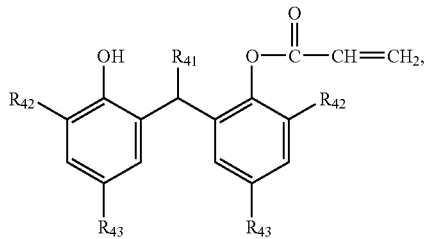

wherein $R_{41}$ represent a hydrogen atom or an alkyl group having 1 to 10 carbon atoms; $R_{42}$ and $R_{43}$ each independently represent a independently represent an alkyl group having 1 to 8 carbon atoms.

10. The cellulose ester film of any one of items 1 to 9 comprising a cellulose ester satisfying Expression (III) and (IV);

$$2.40 \leq X+Y \leq 2.90, \quad \text{Expression (III)}$$

$$1.00 \leq Y \leq 1.50, \quad \text{Expression (IV)}$$

wherein X represents a degree of substitution by an acetyl group and Y represents a degree of substitution by an propionyl group.

11. A method of producing the cellulose ester film of any one of items 1 to 10 comprising a step of a melt casting.

12. The method of producing the cellulose ester film of item 11, wherein a melting temperature is 245° C. to 265° C.

13. A protective film for a polarizing plate comprising the cellulose ester film of any one of items 1 to 10 or the cellulose ester film produced by the method of production for the cellulose ester film of item 11 or 12.

14. A polarizing plate comprising the cellulose ester film of any one of items 1 to 10 or the cellulose ester film produced by the method of production for the cellulose ester film of item 11 or 12 at least on one side of polarizer.

15. A liquid crystal display comprising the polarizing plate of item 14 at least on side of a liquid crystal cell.

Effects of the Invention

According to the present invention, there can be provided a cellulose ester film in which foreign substance adhesion on the conveyance roll surface and the resulting film transfer defects are generated to a minimal extent; no pressure defects caused by foreign substances on conveyance rolls occur; durability after saponification is enhanced; excellent adhesion properties to a polarizer is expressed; and excellent processability during processing into a polarizing plate is expressed; as well as to provide such a cellulose ester film via a melt film-forming method. Further, using a cellulose ester film as described above, there can be provided a polarizing plate protective film exhibiting large film strength and a polarizing plate exhibiting enhanced durability, as well as a liquid crystal display realizing high image quality.

BRIEF DESCRIPTION OF THE DRAWINGS

FIG. 1 A schematic flow sheet showing one embodiment of an apparatus to carry out a method for producing a cellulose ester film according to the present invention

DESCRIPTION OF THE NUMERIC DEGIGNATIONS

4: casting die
5: rotating support (first cooling roll, conveyance roll)
6: nip pressing rotator (touch roll)
7: rotating support (second cooling roll, conveyance roll)
8: rotating support (third cooling roll, conveyance roll)
9, 11 and 13: conveyance rolls
10: cellulose ester film
12: stretcher

DESCRIPTION OF THE PREFERRED EMBODIMENT

The preferred embodiment to carry out the present invention will now be detailed but the present invention is not limited thereto.

The present inventors conducted diligent investigations on the above problems. Then, it was found that surprisingly, via combinations of compounds containing at least 2 types of sugar derivatives differing in the number of hydroxyl groups contained, there was able to be obtained a cellulose ester film in which foreign substance adhesion on the conveyance roll surface and the resulting film transfer defects are generated to a minimal extent; no pressure defects caused by foreign substances on conveyance rolls occur; durability after saponification is enhanced; excellent adhesion properties to a polarizer is expressed; and excellent processability during processing into a polarizing plate is expressed. And also such a cellulose ester film was found to be obtained via a melt film-forming method. Thus, the present invention was completed. Further, it was found that using a cellulose ester film as described above, there was able to be provided a polarizing plate protective film exhibiting large film strength and a polarizing plate exhibiting enhanced durability, as well as a liquid crystal display realizing high image quality.

The present invention will now be detailed.

<<Compounds Represented by above Formulas (1), (2) and (3)>>

In Formulas (1), (2) and (3), G represents a monosaccharide residue or a polysaccharide residue containing 2-10 monosaccharide units, but G contains no saccharide-derived hydroxyl group. Examples of monosaccharides and polysaccharides containing 2-10 monosaccharide units include, for example, ribose, arabinose, apiose, xylose, lyxose, allose, altrose, glucose, mannose, gulose, idose, galactose, talose, erythrulose, ribulose, xylulose, psicose, fructose, sorbose, tagatose, sedoheptulose, trehalose, isotrehalose, neotrehalose, trehalosamine, kojibiose, nigerose, maltose, maltitol, maltulose, isomaltose, isomaltulose, palatinose, sophorose, laminarabiose, cellobiose, cellobionic acid, gentiobiose, galactosucrose, lactose, lactosamine, lactosediamine, lactobionic acid, lactitol, lactulose, melibiose, neolactose, primeverose, rutinose, scillabiose, sucralose, sucrose (saccharose), turanose, vicianose, hyalobiuronic acid, cellobiose, chacotriose, gentianose, isomaltotriose, isopanose, maltotriose, manninotriose, melezitose, panose, planteose, raffinose, solatriose, umbelliferose, lycotetraose, maltotetraose, stachyose, maltopentaose, verbascose, maltohexaose, deoxcyribose, fucose, rhamnose, α-cyclodextrin, β-cyclodextrin, γ-cyclodextrin, δ-cyclodextrin, α-cycloawaodorin, and β-cycloawaodorin.

In above Formulas (1), (2) and (3), G is preferably a polysaccharide residue containing 2-6 monosaccharide units, more preferably a disaccharide residue or a trisaccharide residue, still more preferably a disaccharide residue, most preferably a sucrose residue.

In Formulas (1), (2) and (3), L represents a single bond or a divalent linking group formed of at least 1 group selected from the group consisted of —O—, —CO—, —$NR_2$— ($R_2$ represents an aliphatic group or an aromatic group) and an aliphatic group. Combinations of such linking groups are not specifically limited but specifically preferably selected from —O—, —CO—, and —$NR_2$— ($R_2$ represents an aliphatic group or an aromatic group).

In Formulas (1), (2) and (3), L is preferably a divalent linking group represented by —OCO—.

In Formulas (1), (2) and (3), $R_1$ is an aliphatic group or an aromatic group. The aliphatic group and the aromatic group each may have a substituent independently. As the substituent, substituents $R_3$ to be described later are listed.

In Formula (1), r represents an integer of at least 3, preferably an integer of at least 4, more preferably an integer of at least 5, most preferably an integer of at least 8. In this case, plural -L-$R_1$'s each may be the same or differ.

In Formula (2), m and n represent an integer of at least 1 but m+n≧3, preferably m+n≧4, more preferably m+n≧5, and most preferably m+n≧8. Further, when n is at least 2, plural -L-$R_1$'s each may be the same or differ.

In Formula (3), p and q represent an integer of at least 1 but p+q≧3, preferably p+q≧4, more preferably p+q≧5, and most preferably p+q≧8. Further, when q is at least 2, plural -L-$R_1$'s each may be the same or differ.

Herein, in Formulas (2) and (3), m·p and n·q.

Aliphatic groups in Formulas (1), (2) and (3) will now be described. The aliphatic groups may be straight-chained, branched, or cyclic; and are preferably those of a carbon atom number of 1-25, more preferably those of a carbon atom number of 1-20, and specifically preferably those of a carbon atom number of 2-15. Specific examples of the aliphatic groups include, for example, a methyl, an ethyl, an n-propyl, an isopropyl, a cyclopropyl, an n-butyl, an isobutyl, a tert-butyl, an amyl, an isoamyl, a tert-amyl, an n-hexyl, a cyclohexyl, an n-heptyl, an n-octyl, a bicyclooctyl, an adamantyl, an n-decyl, a tert-octyl, a dodecyl, a hexadecyl, an octadecyl, and a dodecyl group.

Aromatic groups in Formulas (1), (2) and (3) will now be described. The aromatic groups may be aromatic hydrocarbon groups or aromatic heterocyclic groups and are more preferably aromatic hydrocarbon groups. As the aromatic hydrocarbon groups, aromatic hydrocarbon groups of a carbon number of 6-24 are preferable and those of a carbon number of 6-12 are more preferable. Specific examples of the aromatic hydrocarbon groups include, for example, benzene, naphthalene, anthracene, biphenyl, and terphenyl. Of these, as the aromatic hydrocarbon groups, benzene, naphthalene, and biphenyl are specifically preferable. As the aromatic heterocyclic groups, those containing at least 1 atom selected from an oxygen atom, a nitrogen atom, and a sulfur atom. Specific examples of the aromatic heterocyclic groups include, for example, furan, pyrrole, thiophene, imidazole, pyrazole, pyridine, pyrazine, pyridazine, triazole, triazine, indole, indazole, purine, thiazoline, thidiazole, oxazoline, oxazole, oxadiazole, quinoline, isoquinoline, phthalazine, naphthylidine, quinoxaline, quinazoline, cinnoline, pteridine, acridine, phenanthroline, phenazine, tetrazole, benzimidazole, benzoxazole, benzothiazole, benzotriazole, and tetrazaindene. As the aromatic heterocyclic groups, pyridine, triazine, and quinoline are specifically preferable.

Further, substituent $R_3$ in Formulas (1), (2) and (3), will now be detailed.

Substituents represented by $R_3$ are not specifically limited, including, for example, an alkyl group (e.g., a methyl group, an ethyl group, a propyl group, an isopropyl group, a t-butyl group, a pentyl group, a hexyl group, an octyl group, a dodecyl group, and a trifluoromethyl group), a cycloalkyl group (e.g., a cyclopentyl group and a cyclohexyl group), an aromatic (aryl) group (e.g., a phenyl group and a naphthyl group), an acylamino group (e.g., an acetylam no group and a benzoylamino group), an alkylthio group (e.g., a methylthio group and an ethylthio group), an arylthio group (e.g., a phenylthio group and a naphthylthio group), an alkenyl group (e.g., a vinyl group, a 2-propenyl group, a 3-butenyl group, a 1-methyl-3-propenyl group, 3-pentenyl group, a 1-methyl-3-butenyl group, a 4-hexenyl group, and a cyclohexenyl group), a halogen atom (a fluorine atom, a chlorine atom, a bromine atom, and an iodine atom), an alkynyl group (e.g., a propargyl group), a heterocyclic group (e.g., a pyridyl group, a thiazolyl group, an oxazolyl group, and an imidazolyl group), an alkylsulfonyl group (e.g., a methylsulfonyl group and an ethylsulfonyl group), an arylsulfonyl group (e.g., a phenylsulfonyl group and a naphthylsulfonyl group), an alkylsulfinyl group (e.g., a methylsulfinyl group), an arylsulfinyl group (e.g., a phenylsulfinyl group), a phosphono group, an acyl group (e.g., an acetyl group, a pivaloyl group, and a benzoyl group), a carbamoyl group (e.g., an aminocarbonyl group, a methylaminocarbonyl group, a dimethylaminocarbonyl group, a butylaminocarbonyl group, a cyclohexylaminocarbonyl group, a phenylaminocarbonyl group, and a 2-pyridylaminocarbonyl group), a sulfamoyl group (e.g., an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group, and a 2-pyridylaminosulfonyl group), a sulfonamide group (e.g., a methanesulfonamide group and a benzenesulfonamide), a cyano group, an alkoxy group (e.g., a methoxy group, an ethoxy group, and a propoxy group), an aryloxy group (e.g., a phenoxy group and a naphthyloxy group), a heterocyclic oxy group, a siloxy group, an acyloxy group (e.g., an acetyloxy group and a benzoyloxy group), a sulfonic acid group, a sulfonic acid salt, an aminocarbonyloxy group, an amino group (e.g., an amino group, an ethylamino group, a dimethylamino group, a butylamino group, a cyclopentylamino group, a 2-ethylhexylamino group, and a dodecylamino group), an anilino group (e.g., a phenylamino group, a chlorophenylamino group, a toluidino group, an anisidino group, a naphthylamino group, and a 2-pyridylamino group), an imide group, a ureido group (e.g., a methylureido group, an ethylureido group, a pentylureido group, a cyclohexylureido group, an octylureido group, a dodecylureido group, a phenylureido group, a naphthylureido group, and a 2-pyridylaminoureido group), an alkoxycarbonylamino group (e.g., a methoxycaronylamino group and a phenoxycarbonylamino group), an alkoxycarbonyl group (e.g., a methoxycarbonyl group, an ethoxycarbonyl group, and a phenoxycarbonyl group), an aryloxycarbonyl group (e.g., a phenoxycarbonyl group), a heterocyclic thio group, a thioureido group, a carboxyl group, a carboxylic acid salt, a hydroxyl group, a mercapto group, and nitro group. These substituents may further be substituted with any of the similar substituents.

In Formula (1), r represents an integer of at least 3. In plural -L-$R_1$'s, at least one of the $R_1$'s preferably an aromatic group, more preferably an aromatic hydrocarbon group, specifically preferably benzene.

In Formula (2), when n is 1, in -L-$R_1$, $R_1$ is preferably an aromatic group, more preferably an aromatic hydrocarbon group, specifically preferably benzene. When n represents an integer of at least 2, in plural -L-$R_1$'s, at least one of the $R_1$'s is preferably an aromatic group, more preferably an aromatic hydrocarbon group, specifically preferably benzene.

In Formula (3), when q is 1, in -L-$R_1$, $R_1$ is preferably an aromatic group, more preferably an aromatic hydrocarbon group, specifically preferably benzene. When q represents an integer of at least 2, in plural -L-$R_1$'s, at least one of the $R_1$'s is preferably an aromatic group, more preferably an aromatic hydrocarbon group, specifically preferably benzene.

In the present invention, G's in Formulas (1), (2) and (3) each may be the same or differ, but preferably the same. L's each may be the same or differ, but preferably the same. $R_1$'s each may be the same or differ, but preferably the same.

The present invention is characterized by containing at least 2 types of compounds represented by Formulas (1) and (2) in a cellulose ester film. But, at least 3 types of compounds represented by Formulas (1), (2) and (3) are preferably contained.

The added amounts of compounds represented by Formulas (1), (2) and (3) in the cellulose ester film of the present invention will now be described.

In a cellulose ester film, when the added amount of a compound represented by Formula (1) is designated as a (% by mass); the added amount of a compound represented by Formula (2) is designated as b (% by mass); and the added amount of a compound represented by Formula (3) is designated as c (% by mass), the added amount represented by a+b or a+b+c is preferably 0.5-50% by mass, more preferably 1.0-25% by mass, most preferably 3.0-15% by mass.

Next, in the cellulose ester film of the present invention, the mutual relationship among the added amounts of compounds represented by Formulas (1), (2) and (3) is described below.

In the present invention, when at least 2 types of compounds represented by Formulas (1) and (2) are contained in a cellulose ester film, following Expression (I)' is preferably satisfied and Expression (I) is more preferably satisfied.

$$0.10 \leq a/(a+b) \leq 0.90 \quad \text{Expression (I)'}$$

$$0.20 \leq a/(a+b) \leq 0.80 \quad \text{Expression (I)}$$

When at least 3 types of compounds represented by Formulas (1), (2) and (3) are contained in a cellulose ester film, the present invention is characterized by satisfying following Expression (II), but Expression (II)' is preferably satisfied.

$$0.20 \leq a/(a+b+c) \leq 0.80 \quad \text{Expression (II)}$$

$$0.30 \leq a/(a+b+c) \leq 0.70 \quad \text{Expression (II)'}$$

Unclear is the detail of producing effects of the present invention by containing, in a cellulose ester film, at least 2 types of compounds represented by Formulas (1) and (2) or at least 3 types of compounds represented by Formulas (1), (2) and (3). However, the consideration of the present inventors is as follows.

Generally, a cellulose ester, as described later in the description of cellulose esters, is produced as a mixture of those exhibiting a higher value and a lower value than the total substitution degree of acyl groups determined unambiguously as the average value. A cellulose ester used in the present invention is also such a mixture. Focusing attention on one glucose unit, the cellulose ester has a unit of the number of hydroxyl groups of 3 in one case and in the other case, having a unit of 2 or 1, even 0. Namely, the cellulose ester is in the state of a mixture of cellulose esters having various hydroxyl group numbers. With regard to such a cellulose ester, inadequate interaction is created only using a conventional single sugar derivative. It is critical that plural sugar derivatives differing in the number of hydroxyl groups contained are added to the cellulose ester. It is presumed that each of the derivatives can effectively interact with each of the cellulose esters (glucose units) differing in the number of hydroxyl groups. It is conceivable that enhancement of interaction of cellulose esters, being polymers, with sugar derivatives, being low molecular substances, resulted in various effects of the present invention.

Compounds represented by Formulas (1), (2) and (3) will now specifically be described that by no means limit the scope of the present invention. Herein, in the following specific examples, the numbers in parentheses shown under the examples of the substituents represented by R represent the number of substitutions, but substituted sites are not specifically limited.

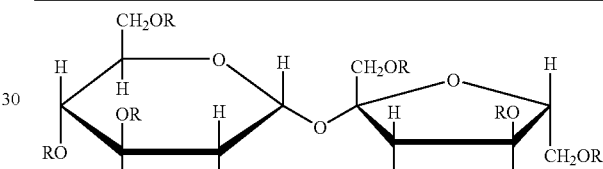

(Compound Example)    R (Substitution Number)

A-1

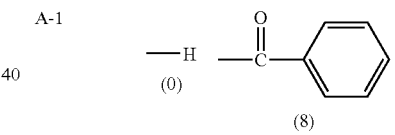

A-2

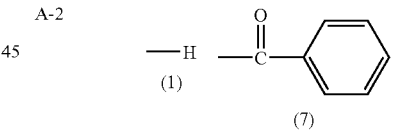

A-3

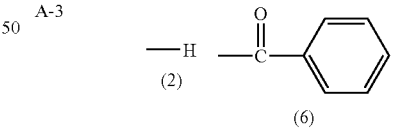

A-4

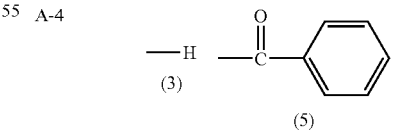

A-5

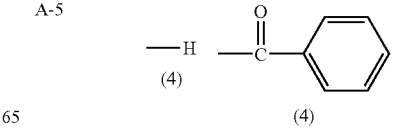

-continued
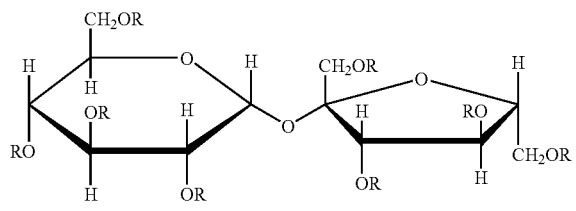
| (Compound Example) | R (Substitution Number) | | |
|---|---|---|---|
| A-6 | —H (5) | 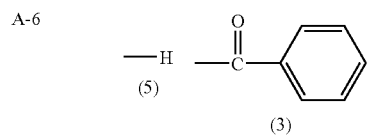 (3) | |
| A-7 | —H (6) | 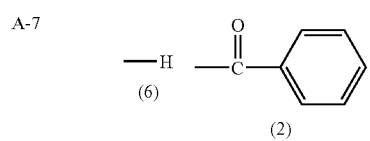 (2) | |
| A-8 | —H (7) | 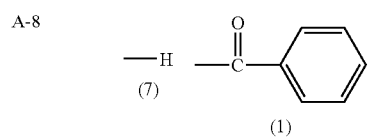 (1) | |
| A-9 | —H (0) | 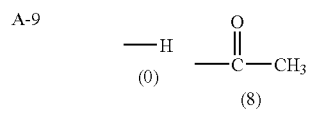 (8) | |
| A-10 | —H (1) | 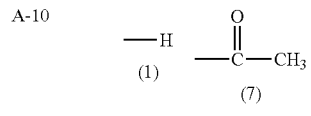 (7) | |
| A-11 | —H (2) | 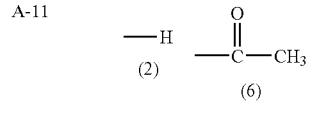 (6) | |
| A-12 | —H (0) | 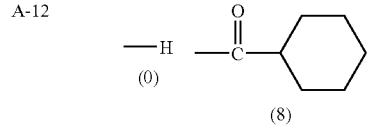 (8) | |
| A-13 | —H (1) | 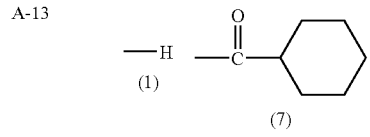 (7) | |
| A-14 | —H (0) | 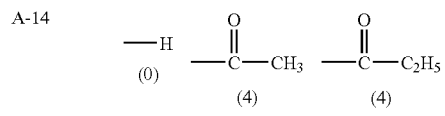 (4) (4) | |
| A-15 | —H (1) | 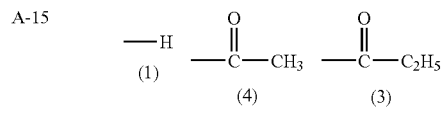 (4) (3) | |
-continued
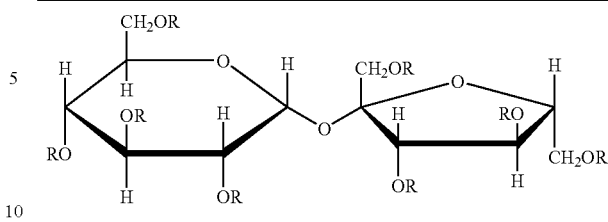
| (Compound Example) | R (Substitution Number) | | |
|---|---|---|---|
| A-16 | —H (0) | 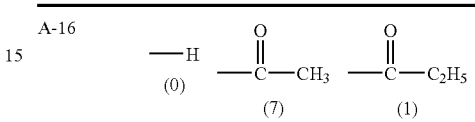 (7) (1) | |
| A-17 | —H (1) | 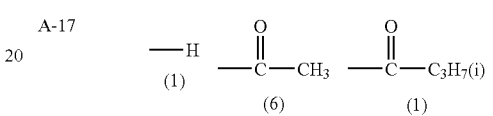 (6) (1) | |
| A-18 | —H (2) | 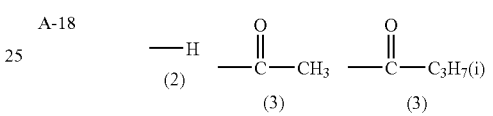 (3) (3) | |
| A-19 | —H (0) | 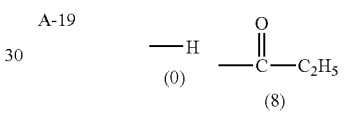 (8) | |
| A-20 | —H (1) | 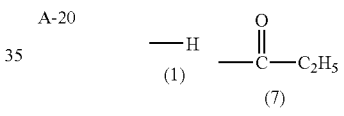 (7) | |
| A-21 | —H (2) | 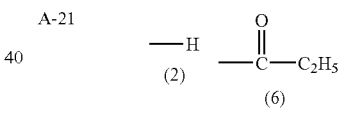 (6) | |
| A-22 | —H (1) | 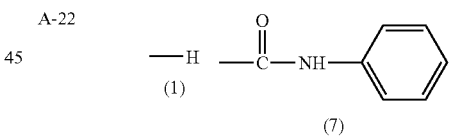 (7) | |
| A-23 | —H (0) | 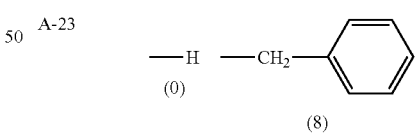 (8) | |
| A-24 | —H (2) | 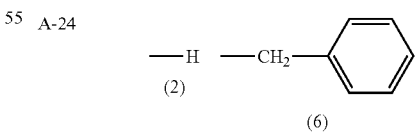 (6) | |
| A-25 | —H (0) | 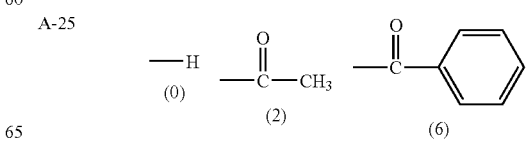 (2) (6) | |

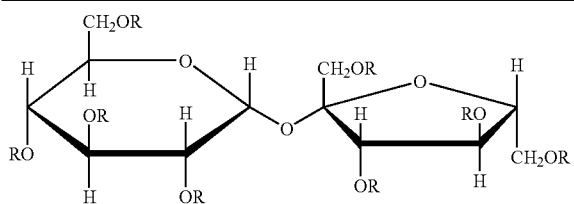

| (Compound Example) | R (Substitution Number) | | |
|---|---|---|---|
| A-26 | —H (1) | 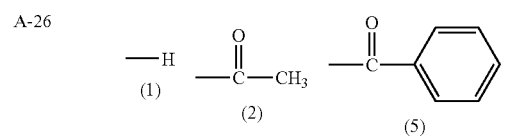 (2) acetyl | benzoyl (5) |
| A-27 | —H (0) | acetyl (7) | cyclohexanecarbonyl (1) |
| A-28 | —H (1) | cyclohexanecarbonyl (2) | benzoyl (5) |
| A-29 | —H (0) | cyclohexanecarbonyl (4) | benzoyl (4) |

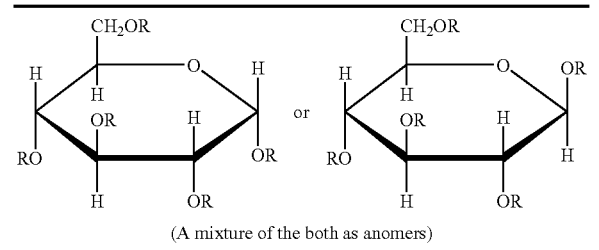

(A mixture of the both as anomers)

| (Compound Example) | R (Substitution Number) | | |
|---|---|---|---|
| B-1 | —H (0) | 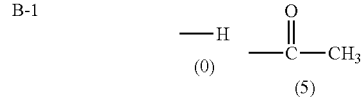 —C(=O)CH₃ (5) | |
| B-2 | —H (1) | —C(=O)CH₃ (4) | |
| B-3 | —H (2) | —C(=O)CH₃ (3) | |

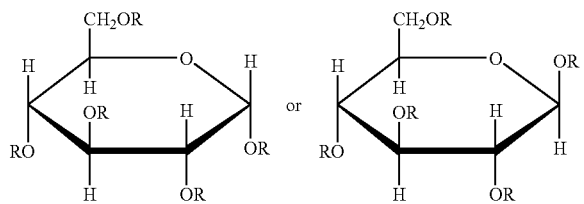

(A mixture of the both as anomers)

| (Compound Example) | R (Substitution Number) | |
|---|---|---|
| B-4 | —H (3) | —C(=O)CH₃ (2) |
| B-5 | —H (4) | —C(=O)CH₃ (1) |
| B-6 | —H (0) | —C(=O)Ph (5) |
| B-7 | —H (1) | —C(=O)Ph (4) |
| B-8 | —H (2) | —C(=O)Ph (3) |
| B-9 | —H (3) | —C(=O)Ph (2) |
| B-10 | —H (4) | —C(=O)Ph (1) |
| B-11 | —H (0) | —C(=O)CH₃ (1)   —C(=O)C₂H₅ (4) |
| 8-12 | —H (1) | —C(=O)CH₃ (1)   —C(=O)C₂H₅ (3) |
| B-13 | —H (0) | —CH₃ (5) |

-continued

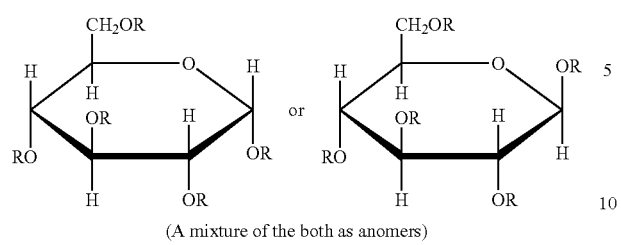

(A mixture of the both as anomers)

| (Compound Example) | R (Substitution Number) | |
|---|---|---|
| B-14 | —H (1) | —CH$_3$ (4) |
| B-15 | —H (0) | —C(=O)—C$_3$H$_7$(n) (5) |
| B-16 | —H (1) | —C(=O)—C$_3$H$_7$(n) (4) |
| B-17 | —H (2) | —C(=O)—C$_3$H$_7$(n) (3) |

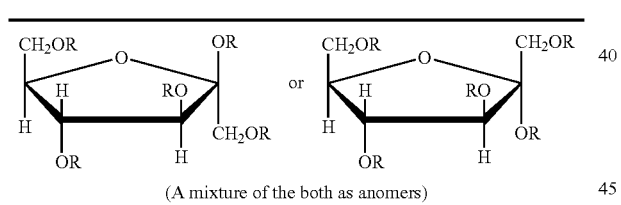

(A mixture of the both as anomers)

| (Compound Example) | R (Substitution Number) | |
|---|---|---|
| C-1 | —H (0) | —C(=O)—C$_6$H$_5$ (5) |
| C-2 | —H (1) | —C(=O)—C$_6$H$_5$ (4) |
| C-3 | —H (2) | —C(=O)—C$_6$H$_5$ (3) |

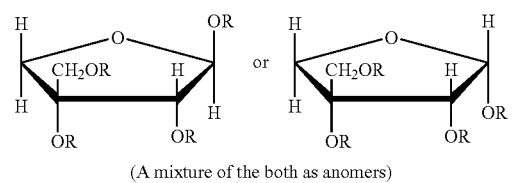

(A mixture of the both as anomers)

| (Compound Example) | R (Substitution Number) | |
|---|---|---|
| D-1 | —H (0) | —C(=O)—C$_6$H$_5$ (4) |
| D-2 | —H (1) | —C(=O)—C$_6$H$_5$ (3) |

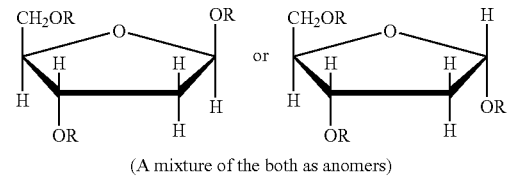

(A mixture of the both as anomers)

| (Compound Example) | R (Substitution Number) | |
|---|---|---|
| E-1 | —H (0) | —C(=O)—C$_6$H$_5$ (3) |
| E-2 | —H (1) | —C(=O)—C$_6$H$_5$ (2) |

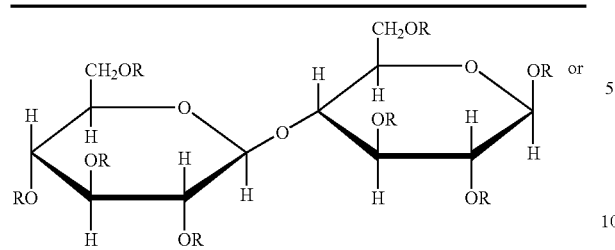
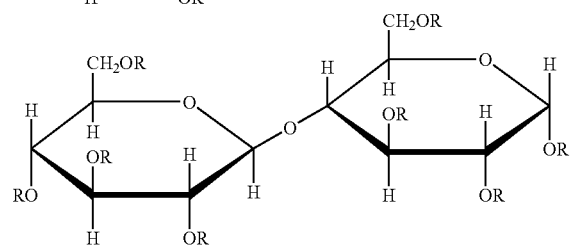
(A mixture of the both as anomers)
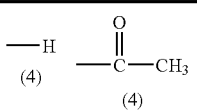
(A mixture of the both as anomers)
| (Compound Example) | R (Substitution Number) | | (Compound Example) | R (Substitution Number) | |
|---|---|---|---|---|---|
| F-1 | —H (0) | 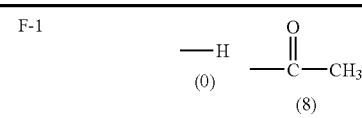 (8) | F-5 | —H (4) | 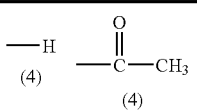 (4) |
| F-2 | —H (1) | 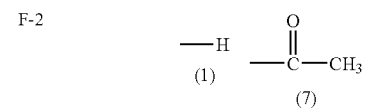 (7) | F-6 | —H (5) | 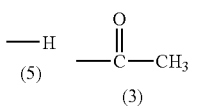 (3) |
| F-3 | —H (2) | 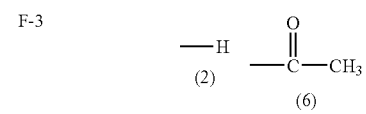 (6) | F-7 | —H (6) | 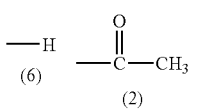 (2) |
| F-4 | —H (3) | 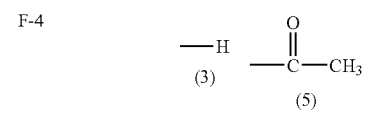 (5) | F-8 | —H (7) | 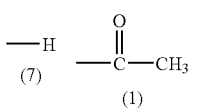 (1) |
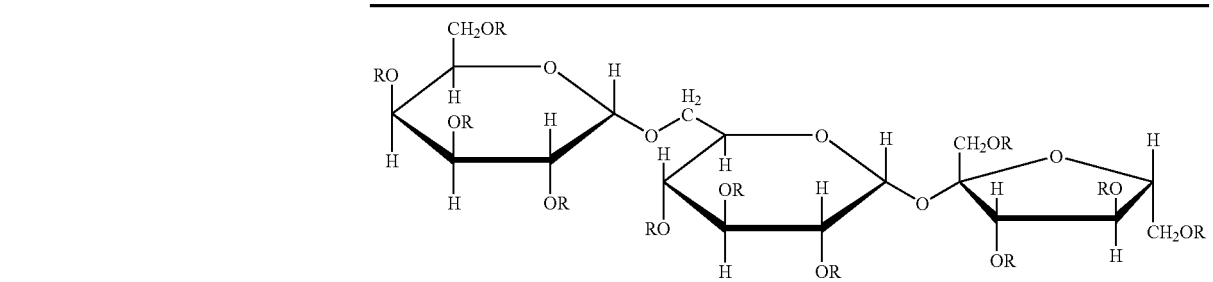
| (Compound Example) | R (Substitution Number) | |
|---|---|---|
| G-1 | —H (0) | 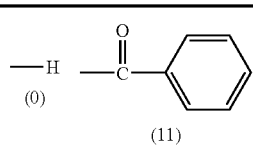 (11) |

-continued
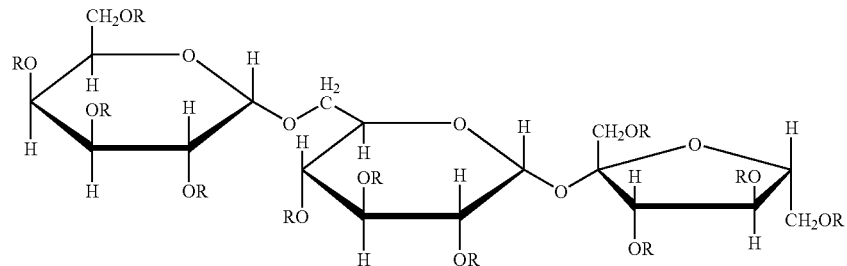
| (Compound Example) | R (Substitution Number) | |
|---|---|---|
| G-2 | —H (1) | 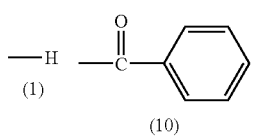 (10) |
| G-3 | —H (2) | 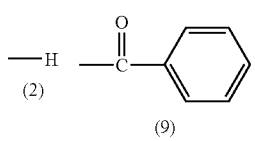 (9) |
| G-4 | —H (3) | 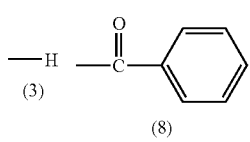 (8) |
| G-5 | —H (0) | 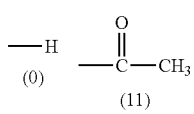 (11) |
| G-6 | —H (1) | 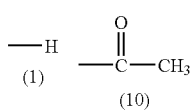 (10) |
| G-7 | —H (2) | 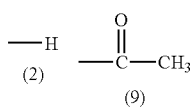 (9) |
| G-8 | —H (6) | 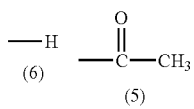 (5) |
| G-9 | —H (10) | 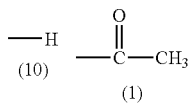 (1) |

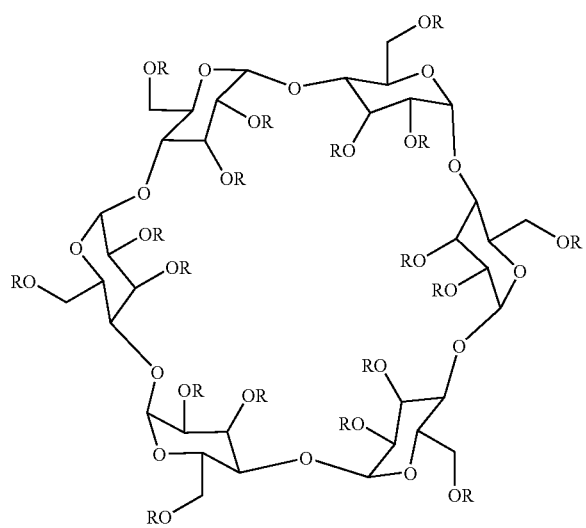

| (Compound Example) | R (Substitution Number) | |
|---|---|---|
| H-1 | —H (0) | 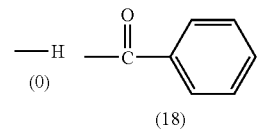 (18) |
| H-2 | —H (1) | (17) |
| H-3 | —H (2) | 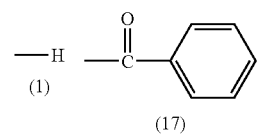 (16) |
| H-4 | —H (3) | 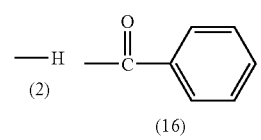 (15) |
| H-5 | —H (0) | 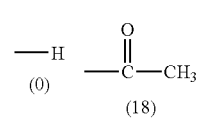 (18) |
| H-6 | —H (1) | (17) |
| H-7 | —H (0) | 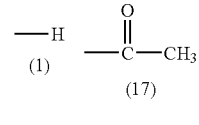 (9) (9) |

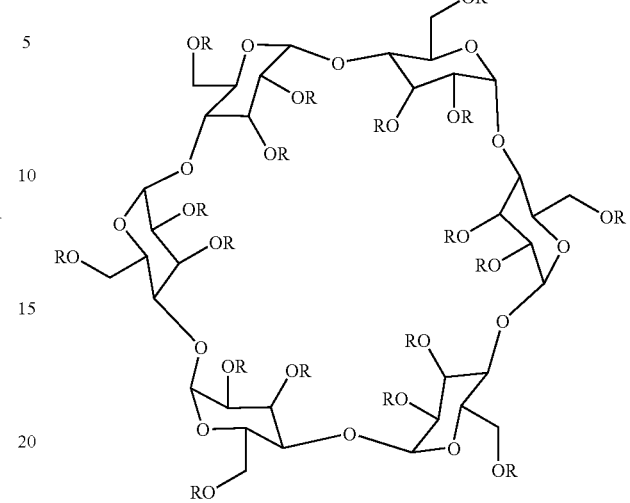

| (Compound Example) | R (Substitution Number) | | |
|---|---|---|---|
| H-8 | —H (1) | 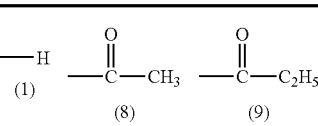 (8) | (9) |
| H-9 | —H (2) | 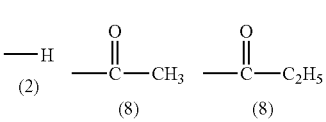 (8) | (8) |
| H-10 | —H (3) | 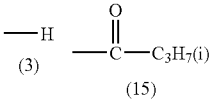 (15) | |
| H-11 | —H (6) | 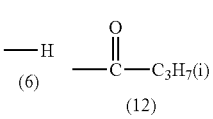 (12) | |

Synthesis Examples of Compounds Represented by Formulas (1), (2), and (3)

Compounds represented by Formulas (1), (2), and (3) will now specifically be described that by mo means limit the scope of the present invention. Incidentally, the compound of the present invention may be used as such without separation of plural sugar derivatives after the reaction termination as described in the following synthesis examples or may be used by newly mixing another sugar derivative after purification as a single sugar derivative using a separation technique such as column chromatography or recrystallization.

Synthesis of Exemplified Compounds A-1, A-2, and A-3

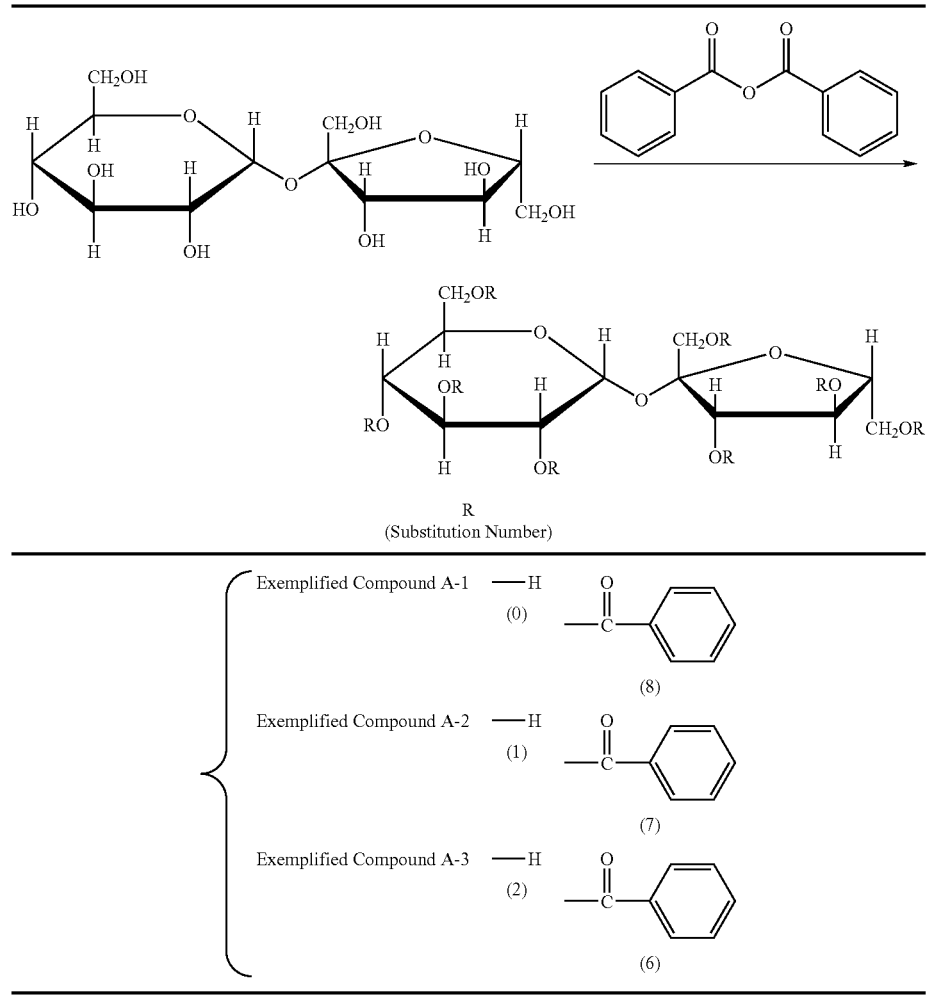

A four-necked flask fitted with a stirrer, a reflux cooler, a thermometer, and a nitrogen gas introducing tube was charged with 34.2 g (0.1 mol) of sucrose, 226.2 g (1.0 mol) of benzoic anhydride, 379.7 g (4.8 mol) of pyridine and then temperature elevation was carried out while nitrogen gas from the nitrogen gas introducing tube was bubbled with stirring to perform esterification reaction at 70° C. for 5 hours. Subsequently, the interior of the flask was depressurized to $4 \times 10^2$ Pa or less and the excess pyridine was distilled off at 60° C. Thereafter, the interior of the flask was depressurized to $1.3 \times 10$ Pa or less, followed by temperature elevation up to 120° C. to distill off most of the benzoic anhydride and the produced benzoic acid. Then, 1 L of toluene and 300 g of an aqueous solution of sodium carbonate of 0.5% by mass were added, followed by being stirred at 50° C. for 30 minutes and being left stand to fractionate the toluene layer. Lastly, 100 g of water was added to the fractionated toluene layer, followed by washing at normal temperature for 30 minutes to fractionate the toluene layer. Then, the toluene was distilled off under reduced pressure (at most $4 \times 10^2$ Pa) at 60° C. to obtain a mixture of Exemplified Compounds A-1, A-2 and A-3. The thus-obtained mixture was analyzed via HPCL and LC-MASS, whereby the ratios of A-1, A-2, and A-3 were found to be 51% by mass, 33% by mass, and 16% by mass, respectively. Herein, via column chromatography employing silica gel, a part of the obtained mixture was purified to obtain A-1, A-2, and A-3 of a purity of 100% each.

<<Cellulose Ester Film>>

A cellulose ester film of the embodiment of the present invention will now be detailed.

A cellulose ester film used in the present invention is produced via a solution casting method or a melt casting method. In the solution casting method, a solution (or a dope) prepared by dissolving a cellulose ester in a solvent is cast on a support and the solvent is evaporated to form a film. In the melt casting method, a substance (a melt) prepared by melting a cellulose ester by heating is cast on a support to form a film. In the melt casting method, the amount of an organic solvent used during film production can substantially be reduced, whereby a film featuring markedly increased environmental soundness is obtained, compared to the conventional solution casting method requiring a large amount of an organic solvent used. Therefore, in the present invention, a cellulose ester film is preferably produced via the melt casting method.

The melt casting method in the present invention refers to a method in which a cellulose ester is heated up to the temperature where fluidity is expressed and melted for film formation by use thereof; for example, a method in which a fluid cellulose ester is extruded from a dice for film formation. Incidentally, in a part of the process to prepare a melted cellulose ester, a solvent may be used, but in a melt film-forming process to carry out formation into a film, forming processing is conducted with no solvent.

A cellulose ester constituting a cellulose ester film is not specifically limited if being a cellulose ester able to be subjected to melt film formation. For example, an aromatic carboxylic acid ester is used. However, in view of characteristics of a film exhibiting optical characteristics, a lower fatty acid ester of cellulose is preferably used. In the resent invention, the lower fatty acid in such a lower fatty acid ester of cellulose refers to a fatty acid of a carbon number of at most 5, including, for example, cellulose acetate, cellulose propionate, cellulose butyrate, and cellulose pivalate as preferable lower fatty acid esters of cellulose. To balance dynamic characteristics and melt film-forming properties, a mixed fatty acid ester such as cellulose acetate propionate or cellulose acetate butyrate may be used.

Of these cellulose esters, cellulose acetate propionate and cellulose acetate butyrate are preferable, and cellulose acetate propionate is specifically preferably used.

Next, the substitution degree of acyl groups of a cellulose ester used in the present invention will now be described.

Three hydroxyl groups exist in cellulose in total and each one is present at the 2-position, the 3-position, and the 6-position in one glucose unit. Total substitution degree is a numeric value expressing how many acyl groups combine with one glucose unit on average. Accordingly, the maximum substitution degree is 3.0. These acyl groups may evenly substitute the 2-position, the 3-position, and the 6-position of the glucose unit or such substitution may exhibit some distribution.

A preferable substitution degree of acyl groups of a cellulose ester used in the present invention is one corresponding to a cellulose ester satisfying following Expressions (III)' and (IV)' at the same time, provided that the substitution degree of an acetyl group is X and the substitution degree of a propionyl group or a butyryl group is Z. Incidentally, the substitution degree of an acetyl group and the substitution degree of other acyl groups were those determined based on the method defined by ASTM-D817-96.

$$2.0 \leq X+Z \leq 3.0 \quad \text{Expression (III)'}$$

$$0.7 \leq Z \leq 3.0 \quad \text{Expression (IV)'}$$

Of these, cellulose acetate propionate is specifically preferably used, and cellulose acetate propionate satisfying following Expressions (III) and (IV) at the same time is specifically preferable.

$$2.44 \leq X+Y \leq 2.90 \quad \text{Expression (III)}$$

$$1.00 \leq Y \leq 1.50 \quad \text{Expression (IV)}$$

wherein X represents the substitution degree of an acetyl group and Y represents the substitution degree of a propionyl group.

Herein, by blending cellulose esters differing in acyl group substitution degree, the cellulose esters may be allowed to fall within the above range as a whole. The portions unsubstituted with the acyl group usually exist as hydroxyl groups. These can be synthesized via any of the well-known methods.

A cellulose ester used in the present invention preferably has a number average molecular weight (Mn) of 50000-150000, more preferably a number average molecular weight of 55000-120000, still more preferably a number average molecular weight of 60000-100000.

Further, as such a cellulose ester used in the present invention, those having a ratio of weight average molecular weight (Mw)/number average molecular weight (Mn) of 1.3-5.5 are preferably used. A cellulose ester with a ratio of 1.5-5.0 is specifically preferably used. But, a cellulose ester with a ratio of 1.7-4.0 is more preferably used and a cellulose ester with a ratio of 2.0-3.5 is still more preferably used.

Herein, Mn and Mw/Mn were calculated via gel permeation chromatography (GPC) based on the following procedures.

Determination conditions are as follows.
Solvent: Tetrahydrofuran
Apparatus: HCL-8220 (produced by Tosoh Corp.)
Column: TSKgel Super HM-M (produced by Tosoh Corp.)
Column temperature: 40° C.
Sample concentration: 0.1% by mass
Injection volume: 10 μl
Flow rate: 0.6 ml/minute
Calibration curve: A calibration curve, based on 9 samples of Standard Polystyrene PS-1 (produced by Polymer Laboratories Ltd.) featuring MWS of 2,560,000-580, was used.

A cellulose raw material for a cellulose ester used in the present invention may be either wood pulp or cotton linter. The wood pulp may be conifer pulp or broad-leaved tree pulp, but conifer pulp is preferable. Cotton linter is preferably used from the viewpoint of peeling properties during film formation. Cellulose esters produced therefrom can be used in appropriate combinations or individually.

Examples of possible use are as follows: the ratios of cotton linter-derived cellulose ester:wood pulp (conifer)-derived cellulose ester:wood pulp (broad-leaved tree)-derived cellulose ester are 100:0:0, 90:10:0, 85:15:0, 50:50:0, 20:80:0, 10:90:0, 0:100:0, 0:0:100, 80:10:10, 85:0:15, and 40:30:30.

A cellulose ester can be obtained, for example, by substituting hydroxyl groups of a raw material cellulose with at least one of an acetyl group, a propionyl group, and a butyl group within the above range via an ordinary method employing at least one of acetic anhydride, propionic anhydride, and butyric anhydride. Such a synthesis method of a cellulose ester is not specifically limited. For example, referring to JP-A No. 10-45804 and Japanese Translation of PCT International Application Publication No. 6-501040, synthesis thereof can be carried out.

The content of an alkaline earth metal in a cellulose ester used in the present invention is preferably in the range of 1-50 ppm. When the content is more than 50 ppm, lip adhesion stain tends to increase or breakage in the slitting section is liable to occur during or after heat stretching. Also in the case of less than 1 ppm, breakage tends to occur but this reason is unclearly understood. Allowing the content to be less than 1 ppm is not preferable also in the viewpoint of an excessively large load of the washing process. Further, the range of 1-30 ppm is preferable. Herein, the content of the alkaline earth metal refers to the total content of Ca and Mg, being able to be determined using an X-ray photoelectron spectrometer (XPS).

The content of the residual sulfuric acid in a cellulose ester used in the present invention is preferably in the range of 0.1-45 ppm in terms of sulfur element. It is conceivable that the residual sulfuric acid is contained in a salt form. It is not preferable that the content of the residual sulfuric acid exceeds 45 ppm, since deposits in the die lip section increase during heat melting, and also during slitting, breakage tends to occur during or after heat stretching. A smaller content is more preferable. However, the case of less than 0.1 ppm is not preferable, since the load in the washing process for a cellulose ester excessively increases, and in contrast, breakage tends to occur. Further, the content is preferably 1-30 ppm. The content of the residual sulfuric acid can be determined via the method based on ASTM-D817-96.

The content of a free acid in a cellulose ester used in the present invention is preferably 1-500 ppm. In cases of more than 500 ppm, deposits in the die lip section increase and also breakage tends to occur. It is difficult to allow the content to be less than 1 ppm by washing. The content is more preferably in the range of 1-100 ppm, whereby breakage tends not to occur. The range of 1-70 ppm is specifically preferable. The content of the free acid can be determined via the method based on ASTM-D817-96.

When a synthesized cellulose ester is further sufficiently washed, compared to the case of employment for a solution casting method, the content of the residual acid can be allowed to fall within the above range. Thereby, when a film is produced via a melt casting method, adhesion to the lip section is reduced, whereby a film exhibiting excellent flatness can be obtained, as well as excelling in dimensional change, mechanical strength, transparency, moisture permeability, and the Rt value and the Ro value to be described later. Further, in washing of the cellulose ester, there can be used, in addition to water, a poor solvent such as methanol or ethanol, or a mixed solvent of a poor solvent and a good solvent if resulting in a poor solvent. Thereby, inorganic substances and low molecular organic impurities other than the residual acid can be removed. Still further, the cellulose ester is preferably washed in the presence of an antioxidant such as a hindered amine or a phosphorous acid ester to enhance heat resistance and film-forming stability of the cellulose ester.

Further, to enhance heat resistance, mechanical physical properties, and optical physical properties of a cellulose ester, the cellulose ester is dissolved in a good solvent and then reprecipitated in a poor solvent to remove low molecular weight components of the cellulose ester and other impurities. At this time, such treatment is preferably carried out in the presence of an antioxidant in the same manner as in washing of the cellulose ester described above.

Still further, after reprecipitation of the cellulose ester, another polymer or a low molecular compound may be added.

Yet further, a film formed from a cellulose ester used in the present invention preferably incorporates minimal luminescent spot foreign substances. The luminescent spot foreign substances refer to spots which are viewed as lighting spots due to light leakage of a light source, in which a cellulose ester film is placed between two polarizing plates arranged in an orthogonal state (cross-nicol state); light of the light source is irradiated from one side and observation on the cellulose ester film is carried out from the other side. In this case, such polarizing plates used for the evaluation are desirably constituted of a protective film having no luminescent spot foreign substances, and those employing a glass plate to protect a polarizer are preferably used. Cellulose being not acetified or having a low acetification degree contained in the cellulose ester is considered to be one of the causes of such luminescent spot foreign substances. Such luminescent spot foreign substances can also be removed in such a manner that a cellulose ester having a minimal amount of luminescent spot foreign substances is used (namely, a cellulose ester having minimal distribution of the degree of substitution) and the melted cellulose ester is filtered; or in at least one of the late stage of synthesis of a cellulose ester and the step to obtain precipitates, a solution state is temporarily formed and then passed in the filtration process. A melted resin exhibits relatively high viscosity. Therefore, the latter method is more efficient.

When film thickness becomes smaller, less luminescent spot foreign substances per area exist. When the content of a cellulose ester contained in the film becomes smaller, less luminescent spot foreign substances tend to exist. Luminescent spot foreign substances having luminescent spots of a diameter of at least 0.01 mm are preferably present at 200 spots/cm$^2$ or less, more preferably at 100 spots/cm$^2$ or less, still more preferably at 50 spots/cm$^2$ or less, yet preferably at 30 spots/cm$^2$ or less, and yet more preferably at 10 spots/cm$^2$ or less. However, no presence is most preferable. Also with regard to luminescent spots of 0.005-0.01 mm, the presence rate is preferably 200 spots/cm$^2$ or less, more preferably 100 spots/cm$^2$ or less, still more preferably 50 spots/cm$^2$ or less, yet preferably 30 spots/cm$^2$ or less, and yet more preferably at 10 spots/cm$^2$ or less. However, no presence is most preferable.

When luminescent spot foreign substances are removed via melt filtration, a cellulose ester composition prepared by adding and mixing a plasticizer, an anti-deterioration agent, and an antioxidant is preferably filtered, compared to filtration of a cellulose ester singly melted, to increase removal efficiency for the luminescent spot foreign substances. Of course, when a cellulose ester is synthesized, reduction via filtration after dissolution in a solvent may be employed. Those mixed with a UV absorbent and other additives can be filtered. With regard to the filtration, a melt containing a cellulose ester is preferably filtered at a viscosity of at most 5000 Pa·s, more preferably at most 2000 Pa·s, still more preferably at most 1000 Pa·s, and yet preferably at most 800 Pa·s. As a filtering material, those conventionally known including glass fiber, cellulose fiber, filter paper, or a fluorine resin such as an ethylene tetrafluoride resin are preferably used. Of these, ceramics or metal is specifically preferably used. Absolute filtration accuracy of such a filter is preferably at most 50 μm, more preferably at most 30 μm, still more preferably 10 μm, and yet preferably at most 5 μm. These filters can be used in appropriate combinations. As the filtering material, either a surface type or a depth type can be used. However, the depth type filter is preferably used due to relatively less frequency of clogging.

In another embodiment, a cellulose ester as a raw material may be dissolved in a solvent at least once to use the cellulose ester after the solvent have been dried. In this case, the dissolution is carried out in a solvent together with at least one of a plasticizer, a UV absorbent, an anti-deterioration agent, an antioxidant, and a matting agent and thereafter, the dried cellulose ester is used. As the solvent, a good solvent such as methylene chloride, methyl acetate, or dioxolan used in a solution casting method can be used, and at the same time, a poor solvent such as methanol, ethanol or butanol may also be used. In the dissolution process, cooling to −20° C. or less or heating to 80° C. or more may be carried out. Use of such a cellulose ester makes it possible that each additive is allowed to be uniform at the time of the melt state and then optical characteristics are allowed to be uniform in some cases.

The cellulose ester film of the present invention may be those produced by appropriately mixing a polymer component other than a cellulose ester. Such a polymer component to be mixed preferably exhibits excellent compatibility with the cellulose ester. Transmittance of a formed film is preferably at least 80%, more preferably at least 90%, and still more preferably at least 92%.

Compounds represented by above Formulas (4)-(6) used in the present invention will now specifically be described that by no means limit the scope of the present invention.

Initially, compounds represented by Formula (4) used in the present invention will now specifically be described that by no means limit the scope of the present invention.

In Formula (4), $R_{21}$ and $R_{22}$ represent an alkyl group or a cycloalkyl group. The alkyl group or the cycloalkyl group is not specifically limited, including, for example, as the alkyl group, a methyl, an ethyl, a propyl, an isopropyl, a t-butyl, a pentyl, a hexyl, an octyl, a dodecyl, and a trifluoromethyl group; and as the cycloalkyl group, a cyclopentyl and a cyclohexyl group.

Any of these groups has a substituent. The substituent is not specifically limited, including, for example, an alkyl group (e.g., a methyl group, an ethyl group, a propyl group, an isopropyl group, a t-butyl group, a pentyl group, a hexyl group, an octyl group, a dodecyl group, and a trifluoromethyl group), a cycloalkyl group (e.g., a cyclopentyl group and a cyclohexyl group), an aromatic (aryl) group (e.g., a phenyl group and a naphthyl group), an acylamino group (e.g., an acetylamino group and a benzoylamino group), an alkylthio group (e.g., a methylthio group and an ethylthio group), an arylthio group (e.g., a phenylthio group and a naphthylthio group), an alkenyl group (e.g., a vinyl group, a 2-propenyl group, a 3-butenyl group, a 1-methyl-3-propenyl group, 3-pentenyl group, a 1-methyl-3-butenyl group, a 4-hexenyl group, and a cyclohexenyl group), a halogen atom (e.g., a fluorine atom, a chlorine atom, a bromine atom, and an iodine atom), an alkynyl group (e.g., a propargyl group), a heterocyclic group (e.g., a pyridyl group, a thiazolyl group, an oxazolyl group, and an imidazolyl group), an alkylsulfonyl group (e.g., a methylsulfonyl group and an ethylsulfonyl group), an arylsulfonyl group (e.g., a phenylsulfonyl group and a naphthylsulfonyl group), an alkylsulfinyl group (e.g., a methylsulfinyl group), an arylsulfinyl group (e.g., a phenylsulfinyl group), a phosphono group, an acyl group (e.g., an acetyl group, a pivaloyl group, and a benzoyl group), a carbamoyl group (e.g., an aminocarbonyl group, a methylaminocarbonyl group, a dimethylaminocarbonyl group, a butylaminocarbonyl group, a cyclohexylaminocarbonyl group, a phenylaminocarbonyl group, and a 2-pyridylaminocarbonyl group), a sulfamoyl group (e.g., an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group, and a 2-pyridylaminosulfonyl group), a sulfonamide group (e.g., a methanesulfonamide group and a benzenesulfonamide), a cyano group, an alkoxy group (e.g., a methoxy group, an ethoxy group, and a propoxy group), an aryloxy group (e.g., a phenoxy group and a naphthyloxy group), a heterocyclic oxy group, a siloxy group, an acyloxy group (e.g., an acetyloxy group and a benzoyloxy group), a sulfonic acid group, a sulfonic acid salt, an aminocarbonyloxy group, an amino group (e.g., an amino group, an ethylamino group, a dimethylamino group, a butylamino group, a cyclopentylamino group, a 2-ethylhexylamino group, and a dodecylamino group), an anilino group (e.g., a phenylamino group, a chlorophenylamino group, a toluidino group, an anisidino group, a naphthylamino group, and a 2-pyridylamino group), an imide group, a ureido group (e.g., a methylureido group, an ethylureido group, a pentylureido group, a cyclohexylureido group, an octylureido group, a dodecylureido group, a phenylureido group, a naphthylureido group, and a 2-pyridylaminoureido group), an alkoxycarbonylamino group (e.g., a methoxycaronylamino group and a phenoxycarbonylamino group), an alkoxycarbonyl group (e.g., a methoxycarbonyl group, an ethoxycarbonyl group, and a phenoxycarbonyl group), an aryloxycarbonyl group (e.g., a phenoxycarbonyl group), a heterocyclic thio group, a thioureido group, a carboxyl group, a carboxylic acid salt, a hydroxyl group, a mercapto group, and nitro group. These substituents may further be substituted with any of the similar substituents.

In Formula (4), $R_{23}$ represents an alkyl group, a cycloalkyl group, or an aryl group. The alkyl group or the cycloalkyl group is not specifically limited, including, for example, as the alkyl group, a methyl, an ethyl, a propyl, an isopropyl, a t-butyl, a pentyl, a hexyl, an octyl, a dodecyl, and a trifluoromethyl group; and as the cycloalkyl group, a cyclopentyl and a cyclohexyl group. As the aryl group, listed are, for example, a phenyl group and a naphthyl group.

$R_{23}$ may have a substituent. The substituent is not specifically limited. Groups similar to substituents, which any of the groups represented by above $R_{21}$ and $R_{22}$ may have, can be listed.

In Formula (4), $R_{24}$ represents a hydrogen atom or a phosphor atom. The phosphor atom is preferably bonded to an aryl group or an aryloxy group and more preferably bonded to an aryloxy group.

Specific examples of the compounds represented by Formulas (4) in the present invention are listed below that by no means limit the scope of the present invention.

(4)-1

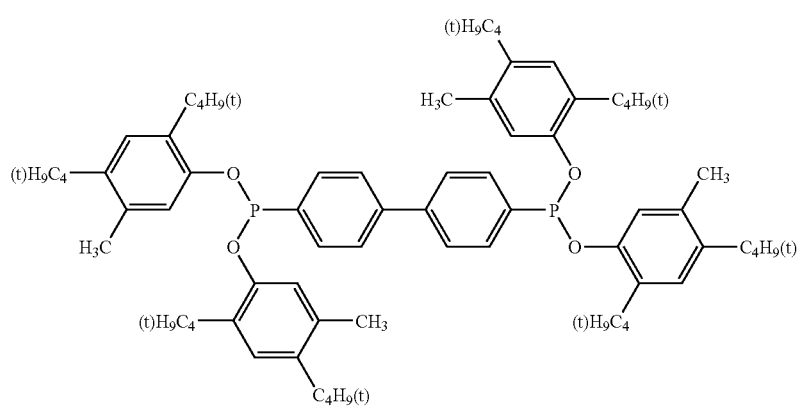

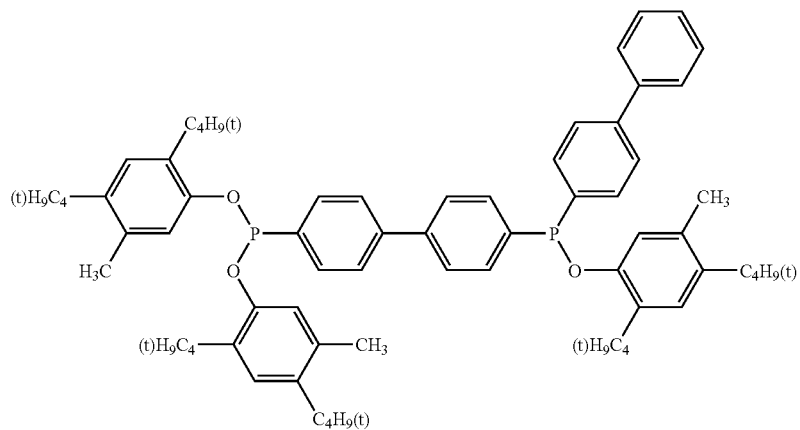
(4)-2
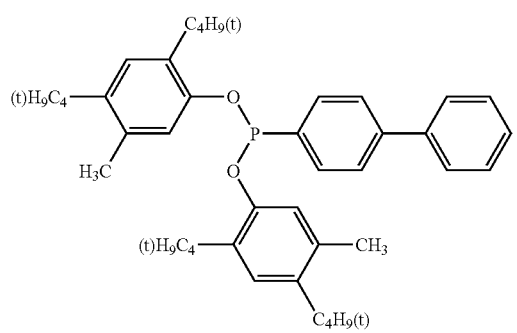
(4)-3
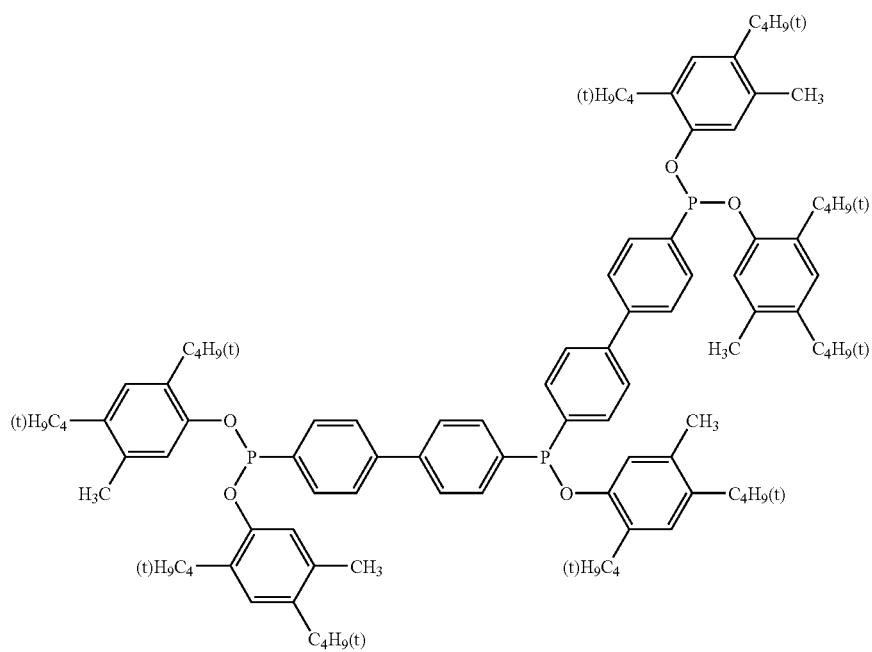
(4)-4

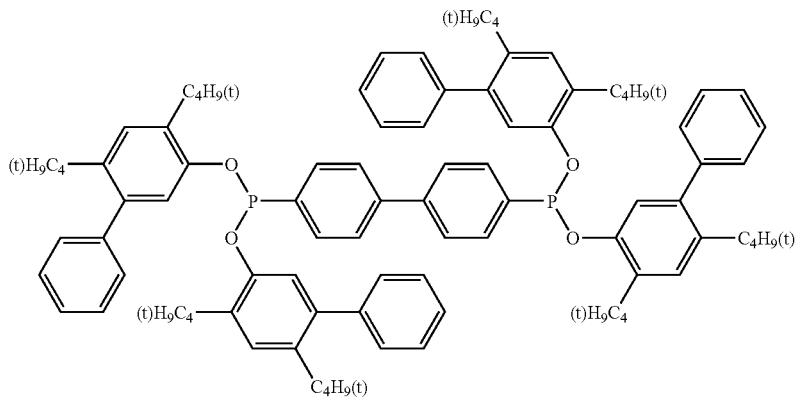
(4)-5
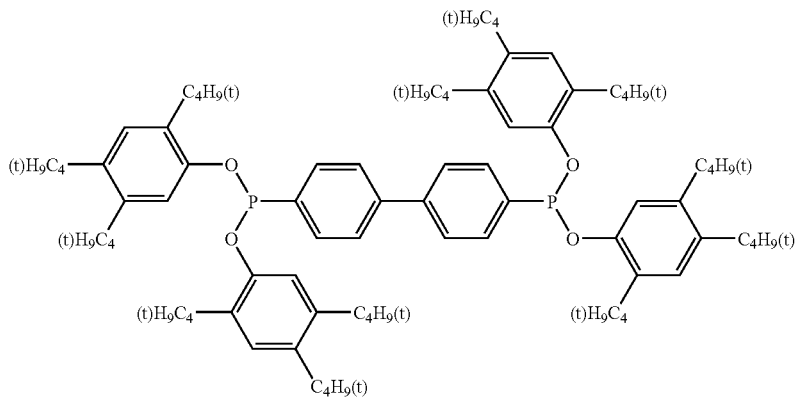
(4)-6
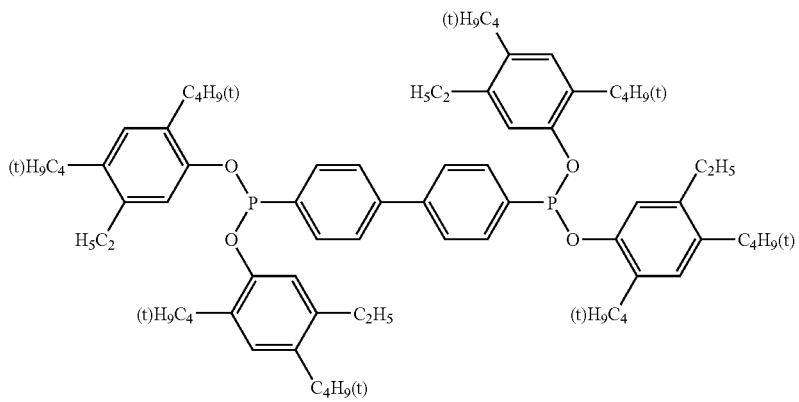
(4)-7
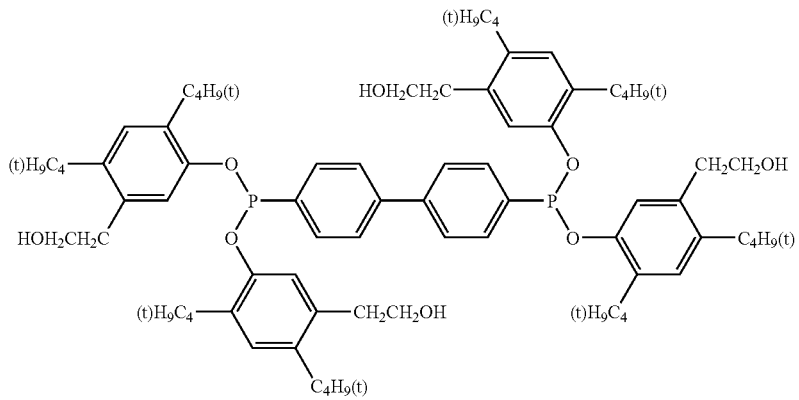
(4)-8

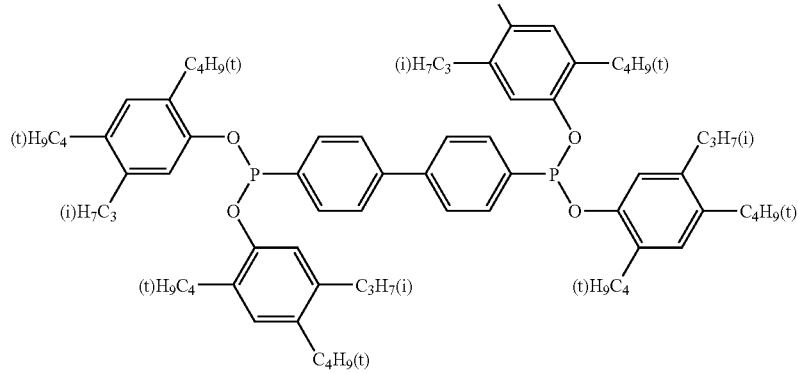
(4)-9
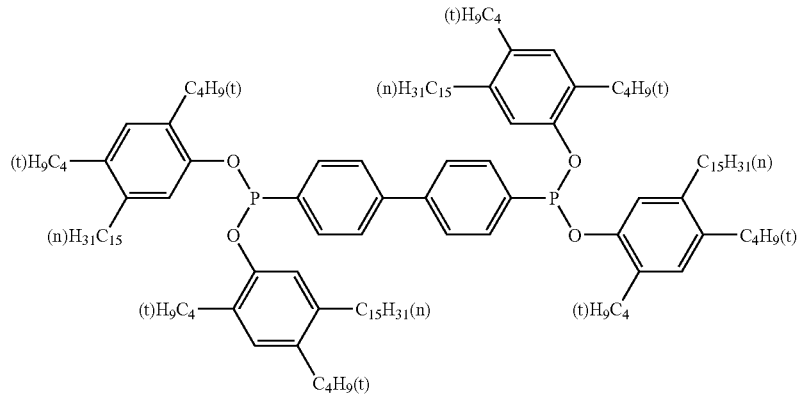
(4)-10
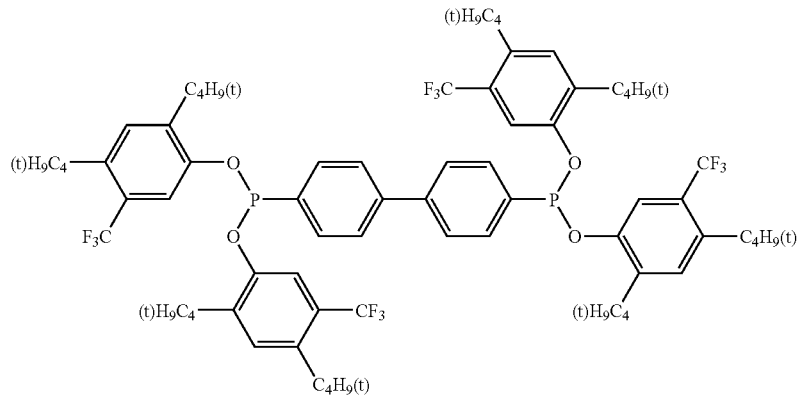
(4)-11
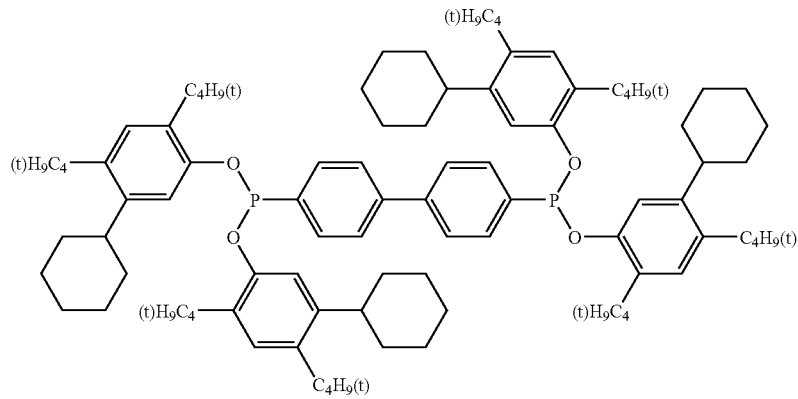
(4)-12

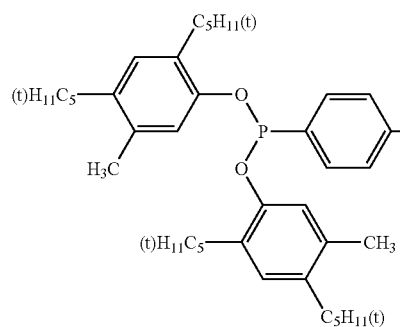 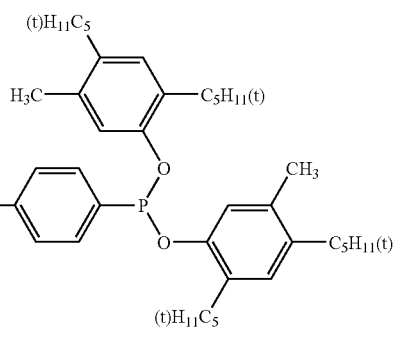
(4)-13
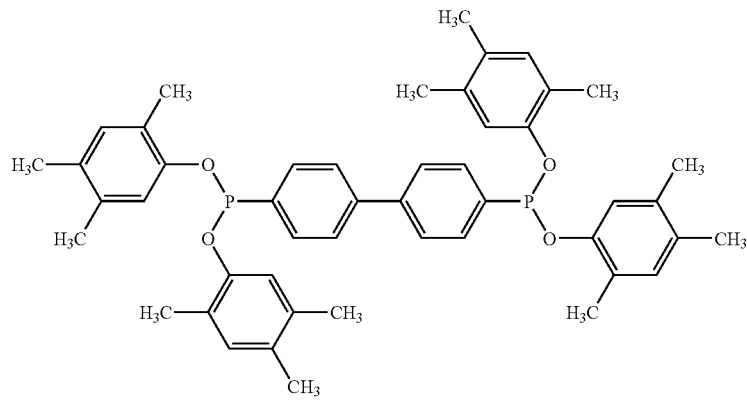
(4)-14
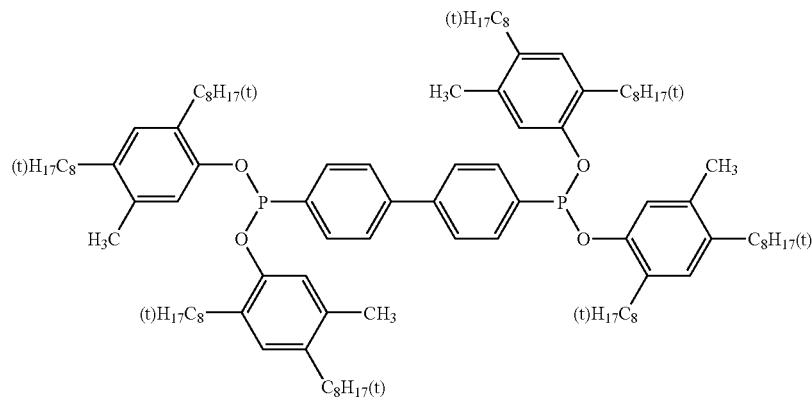
(4)-15

-continued
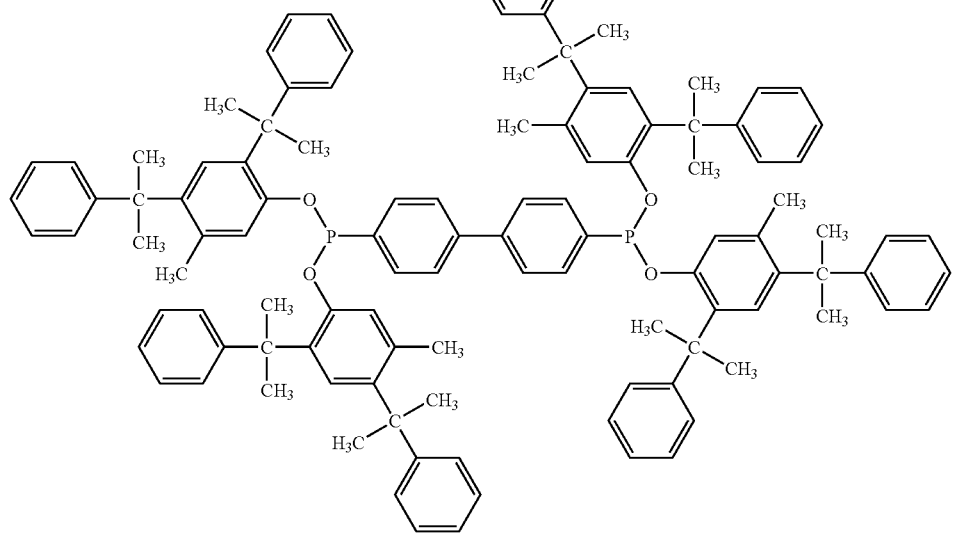
(4)-16
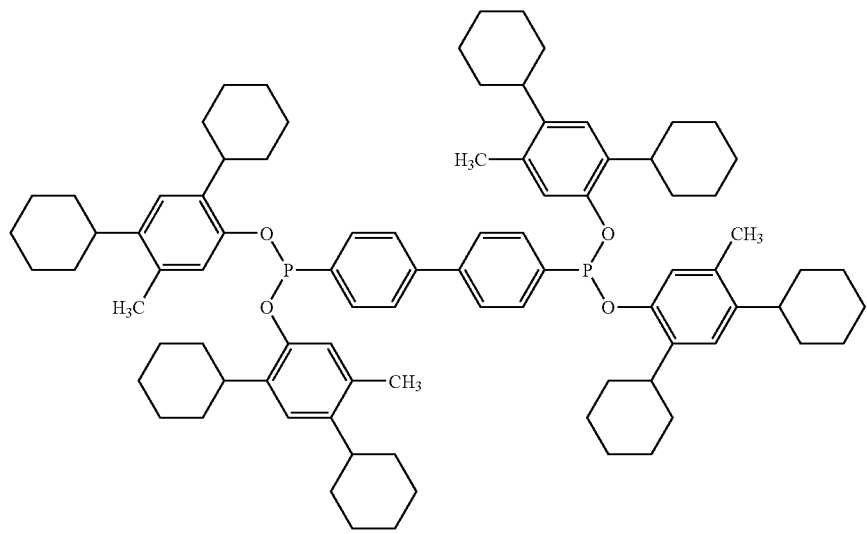
(4)-17
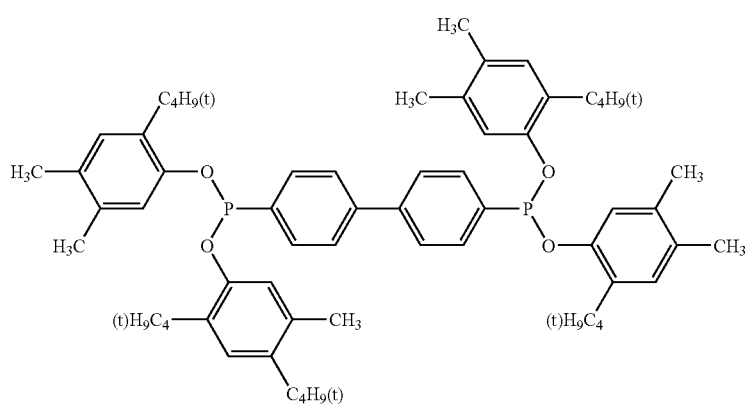
(4)-18

Next, compounds represented by Formula (5) used in the present invention will now specifically be described that by no means limit the scope of the present invention.

In Formula (5), $R_{32}$-$R_{35}$ each represent a hydrogen atom or a substituent independently. $R_{32}$ and $R_{33}$, $R_{33}$ and $R_{34}$, and $R_{34}$ and $R_{35}$ each may join to form a ring. $R_{36}$ represents a hydrogen atom or a substituent and s represents an integer of 1-4. When s is 1, $R_{31}$ represents a substituent. When s is an integer of 2-4, $R_{31}$ represents a linking group of a valence of 2-4.

When $R_{32}$-$R_{35}$ represent a substituent, the substituent is not specifically limited, including, for example, an alkyl group (e.g., a methyl group, an ethyl group, a propyl group, an isopropyl group, a t-butyl group, a pentyl group, a hexyl group, an octyl group, a dodecyl group, and a trifluoromethyl group), a cycloalkyl group (e.g., a cyclopentyl group and a cyclohexyl group), an aryl group (e.g., a phenyl group and a naphthyl group), an acylamino group (e.g., an acetylamino group and a benzoylamino group), an alkylthio group (e.g., a methylthio group and an ethylthio group), an arylthio group (e.g., a phenylthio group and a naphthylthio group), an alkenyl group (e.g., a vinyl group, a 2-propenyl group, a 3-butenyl group, a 1-methyl-3-propenyl group, 3-pentenyl group, a 1-methyl-3-butenyl group, a 4-hexenyl group, and a cyclohexenyl group), a halogen atom (e.g., a fluorine atom, a chlorine atom, a bromine atom, and an iodine atom), an alkynyl group (e.g., a propargyl group), a heterocyclic group (e.g., a pyridyl group, a thiazolyl group, an oxazolyl group, and an imidazolyl group), an alkylsulfonyl group (e.g., a methylsulfonyl group and an ethylsulfonyl group), an arylsulfonyl group (e.g., a phenylsulfonyl group and a naphthylsulfonyl group), an alkylsulfinyl group (e.g., a methylsulfinyl group), an arylsulfinyl group (e.g., a phenylsulfinyl group), a phosphono group, an acyl group (e.g., an acetyl group, a pivaloyl group, and a benzoyl group), a carbamoyl group (e.g., an aminocarbonyl group, a methylaminocarbonyl group, a dimethylaminocarbonyl group, a butylaminocarbonyl group, a cyclohexylaminocarbonyl group, a phenylaminocarbonyl group, and a 2-pyridylaminocarbonyl group), a sulfamoyl group (e.g., an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group, and a 2-pyridylaminosulfonyl group), a sulfonamide group (e.g., a methanesulfonamide group and a benzenesulfonamide), a cyano group, an alkoxy group (e.g., a methoxy group, an ethoxy group, and a propoxy group), an acyloxy group (e.g., a phenoxy group and a naphthyloxy group), a heterocyclic oxy group, a siloxy group, an acyloxy group (e.g., an acetyloxy group and a benzoyloxy group), a sulfonic acid group, a sulfonic acid salt, an aminocarbonyloxy group, an amino group (e.g., an amino group, an ethylamino group, a dimethylamino group, a butylamino group, a cyclopentylamino group, a 2-ethylhexylamino group, and a dodecylamino group), an anilino group (e.g., a phenylamino group, a chlorophenylamino group, a toluidino group, an anisidino group, a naphthylamino group, and a 2-pyridylamino group), an imide group, a ureido group (e.g., a methylureido group, an ethylureido group, a pentylureido group, a cyclohexylureido group, an octylureido group, a dodecylureido group, a phenylureido group, a naphthylureido group, and a 2-pyridylaminoureido group), an alkoxycarbonylamino group (e.g., a methoxycaronylamino group and a phenoxycarbonylamino group), an alkoxycarbonyl group (e.g., a methoxycarbonyl group, an ethoxycarbonyl group, and a phenoxycarbonyl group), an aryloxycarbonyl group (e.g., a phenoxycarbonyl group), a heterocyclic thio group, a thioureido group, a carboxyl group, a carboxylic acid salt, a hydroxyl group, a mercapto group, and nitro group. These substituents may further be substituted with any of the similar substituents.

In Formula (5), $R_{32}$-$R_{35}$ are preferably a hydrogen atom or an alkyl group.

In Formula (5), $R_{36}$ represents a hydrogen atom or a substituent. As the substituent represented by $R_{36}$, groups similar to substituents represented by $R_{32}$-$R_{35}$ can be listed. $R_{35}$ is preferably a hydrogen atom.

In Formula (5), s represents an integer of 1-4. When is 1, $R_{31}$ represents a substituent. As the substituent, groups similar to substituents represented by $R_{32}$-$R_{35}$ can be listed. When s is an integer of 2-4, $R_{31}$ represents a linking group of a valence of 2-4, respectively.

When $R_{31}$ represents a linking group of a valence of 2-4, there can be listed, as a divalent linking group, for example, a divalent alkylene group which may have a substituent, a divalent arylene group which may have a substituent, an oxygen atom, a nitrogen atom, a sulfur atom, or combinations of these linking groups.

As a trivalent linking group, there can be listed, for example, a trivalent alkylene group which may have a substituent, a trivalent arylene group which may have a substituent, a nitrogen atom, or combinations of these linking groups. As a tetravalent linking group, there can be listed, for example, a tetravalent alkylene group which may have a substituent, a tetravalent arylene group which may have a substituent, or combinations of these linking groups.

In Formula (5), s is preferably 1. In this case, $R_{31}$ is preferably a substituted or unsubstituted phenyl group. As a substituent, an alkyl group of a carbon atom number of 1-18 or an alkoxy group of a carbon atom number of 1-18 is preferable. An alkyl group of a carbon atom number of 1-8 or an alkoxy group of a carbon atom number of 1-8 is more preferable.

As a compound represented by Formula (5), for example, "HP-136" as a trade name is available on the market from Ciba Japan K.K.

Specific examples of compounds represented by Formula (5) in the present invention will now be listed that by no means limit the scope of the present invention.

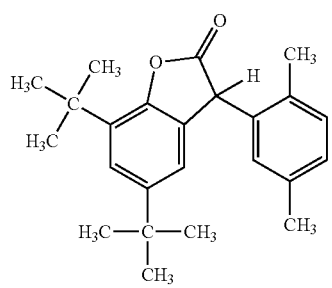

(5)-1

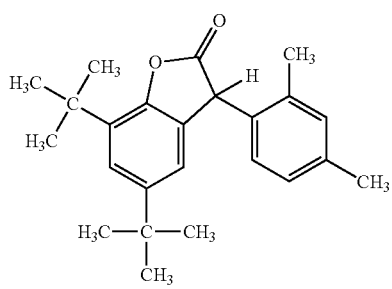

(5)-2

-continued
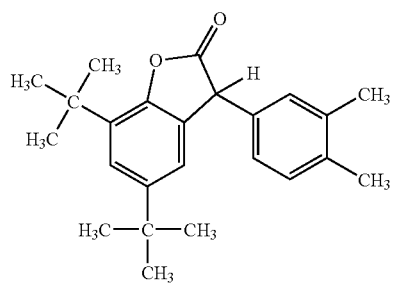 (5)-3
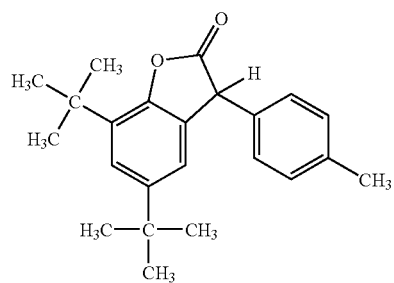 (5)-4
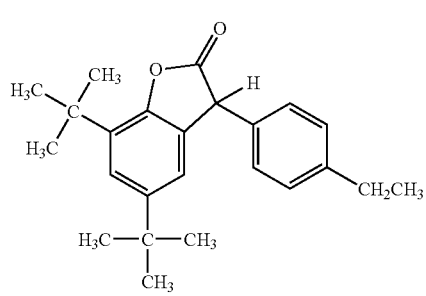 (5)-5
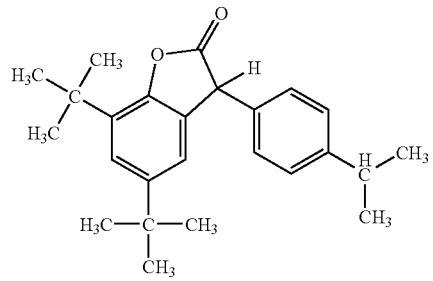 (5)-6
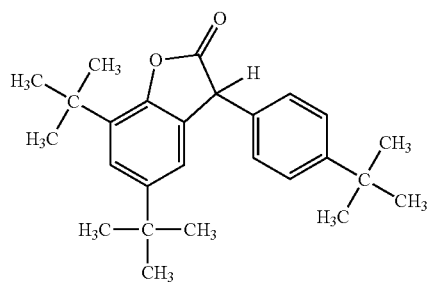 (5)-7
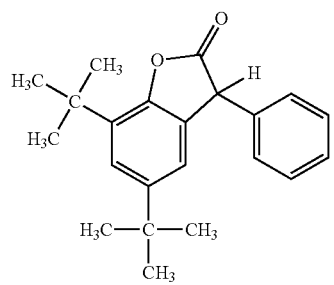 (5)-8
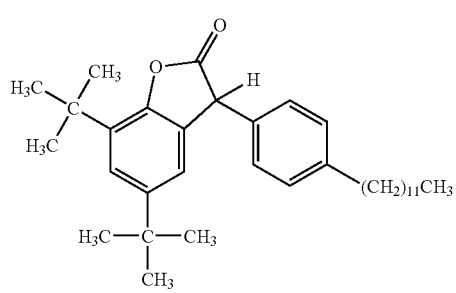 (5)-9
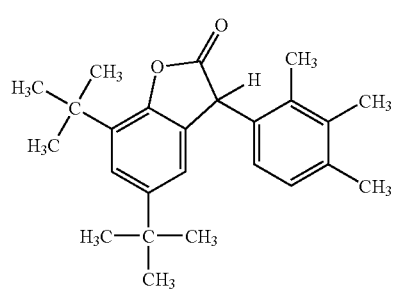 (5)-10
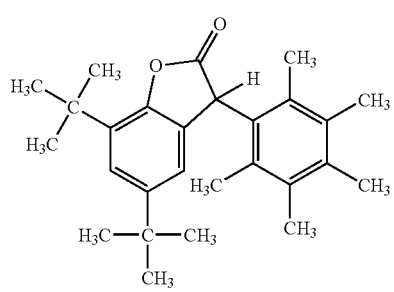 (5)-11
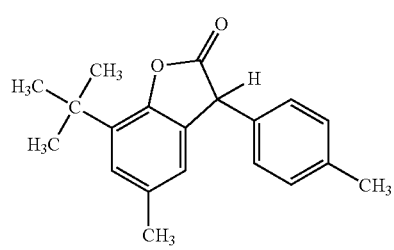 (5)-12

(5)-13
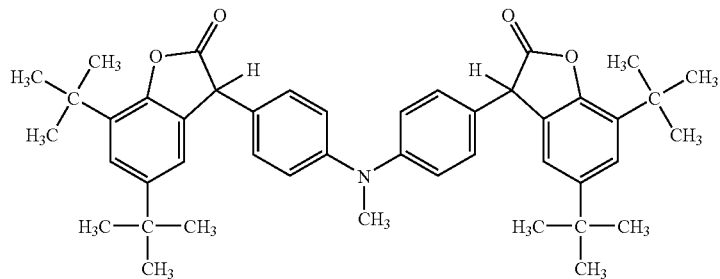
(5)-14
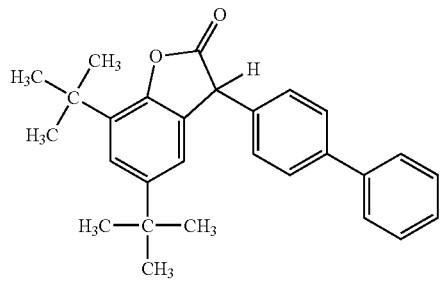
(5)-15
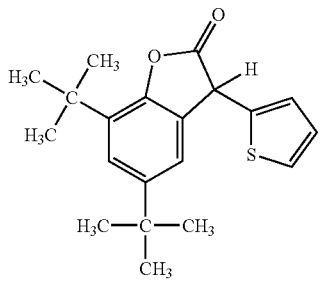
(5)-16
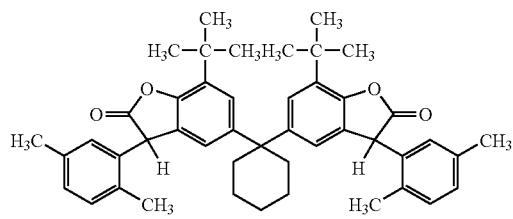
(5)-17
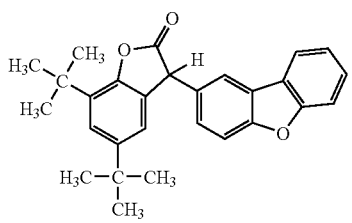
(5)-18
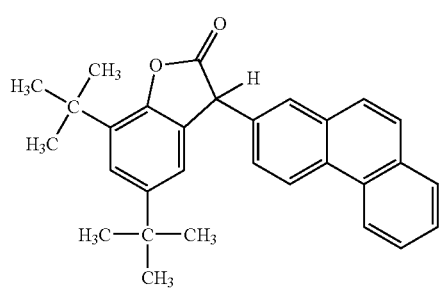
(5)-19
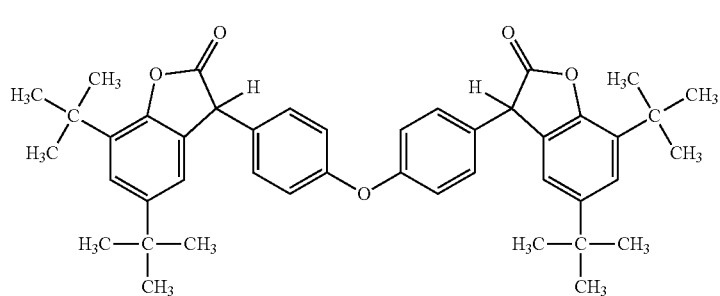

-continued
(5)-20
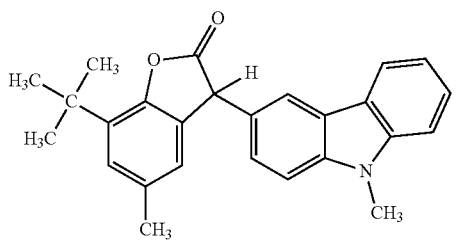
(5)-21
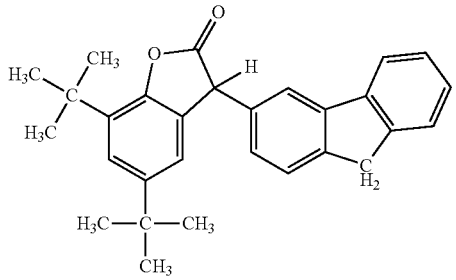
(5)-22
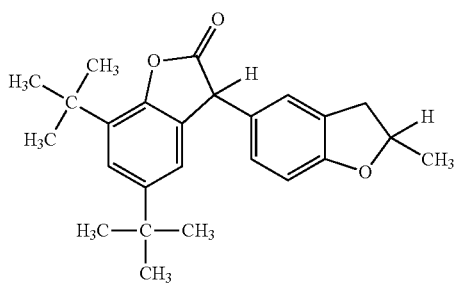
(5)-23
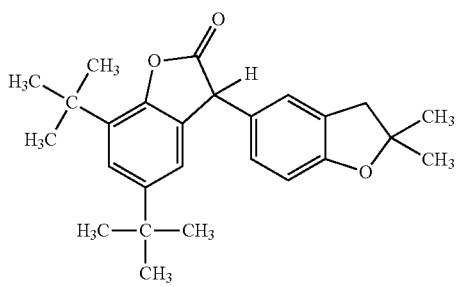
(5)-24
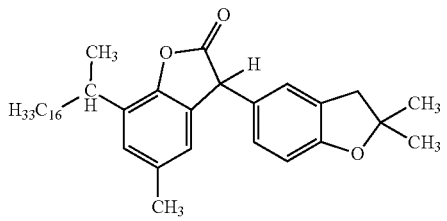
(5)-25
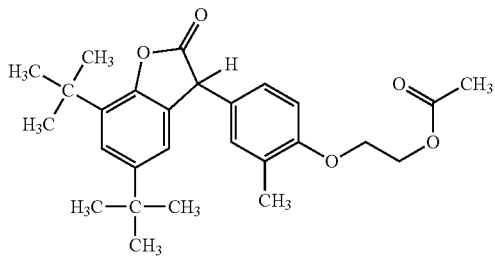
(5)-26
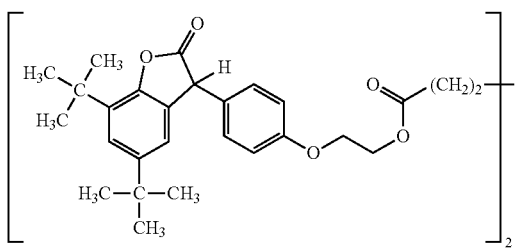
(5)-27
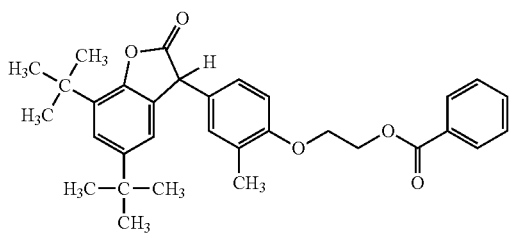
(5)-28
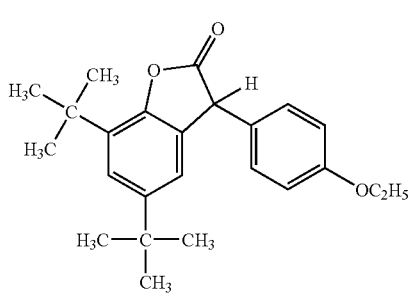
(5)-29
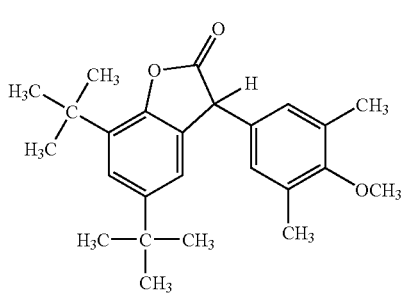

-continued
(5)-30
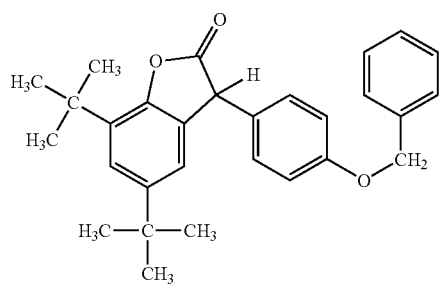
(5)-31
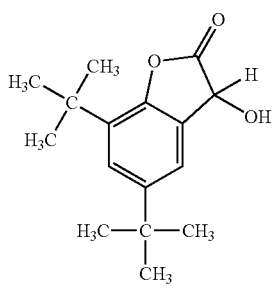
(5)-32
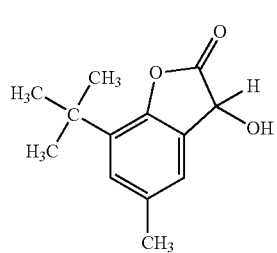
(5)-33
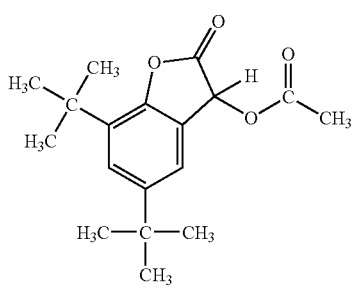
(5)-34
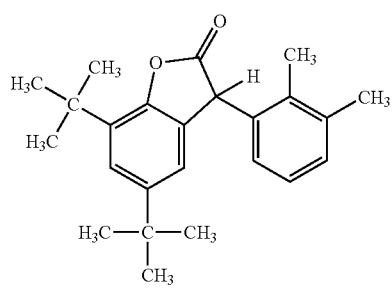
(5)-35
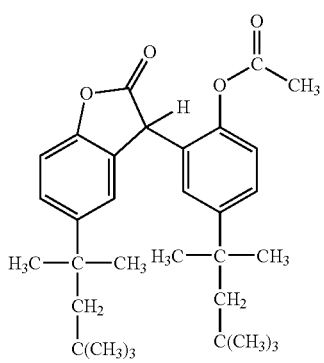
(5)-36
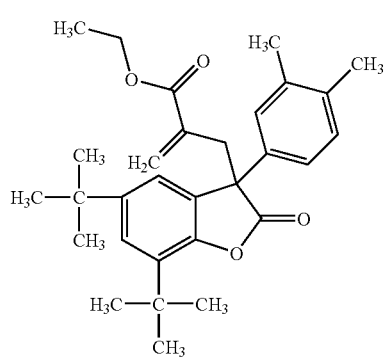
(5)-37
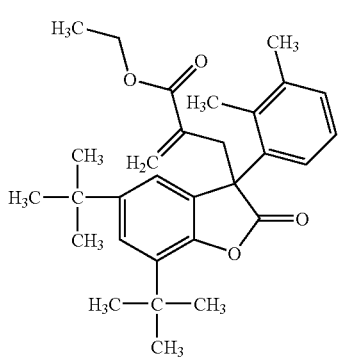
(5)-38
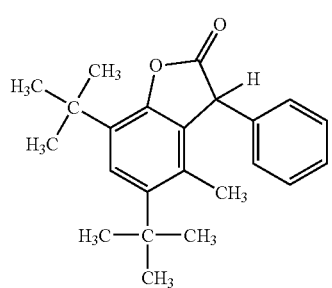

-continued
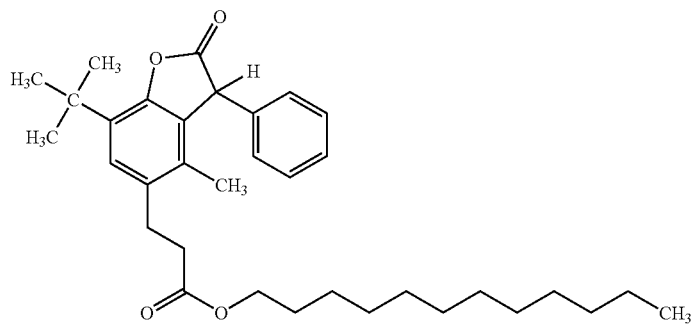
(5)-39
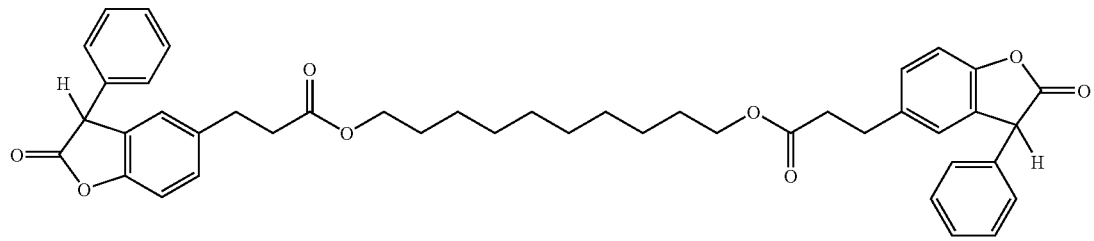
(5)-40
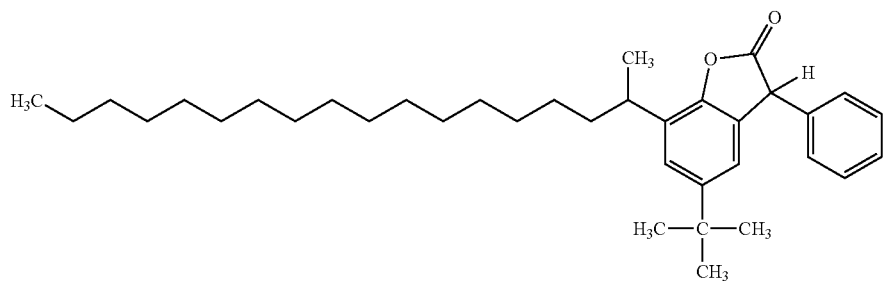
(5)-41
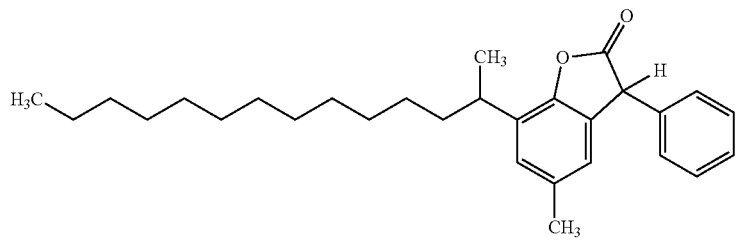
(5)-42
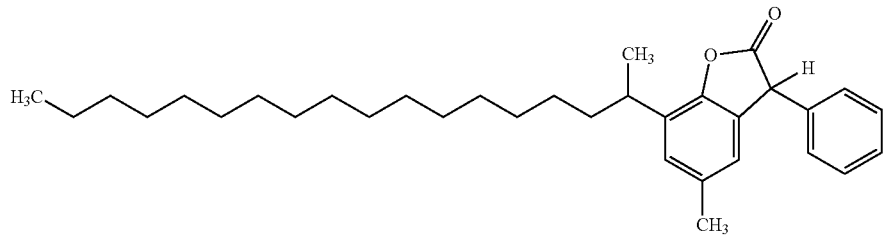
(5)-43
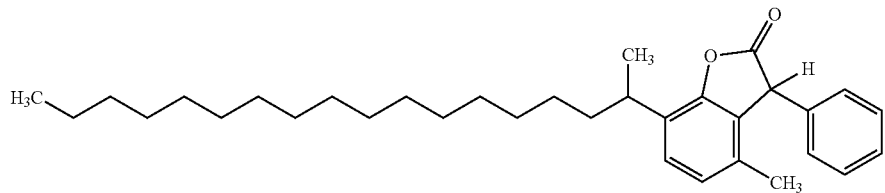
(5)-44

-continued
| | |
|---|---|
| (5)-45 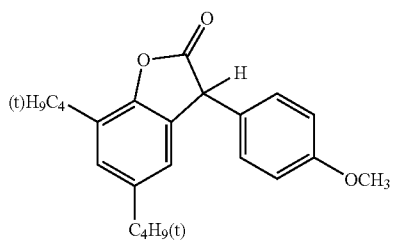 | (5)-46 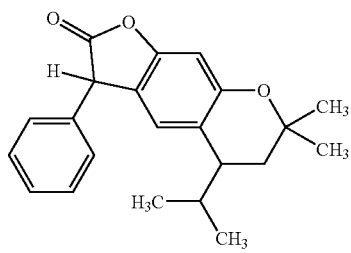 |
| (5)-47 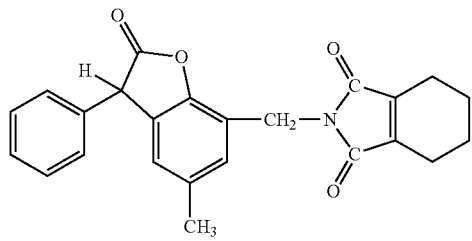 | (5)-48 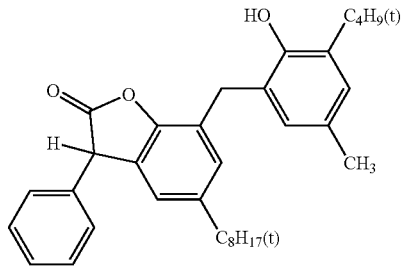 |
| (5)-49 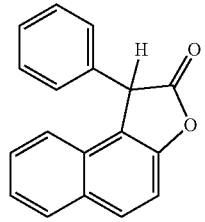 | (5)-50 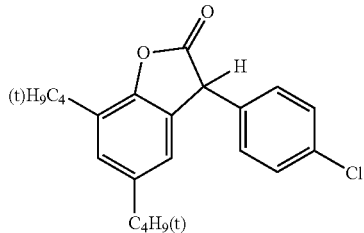 |
| (5)-51 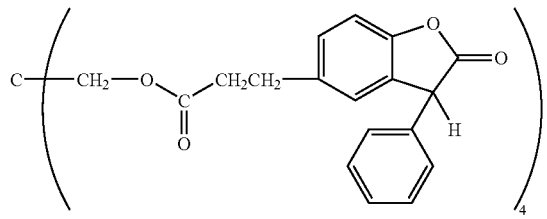 | |
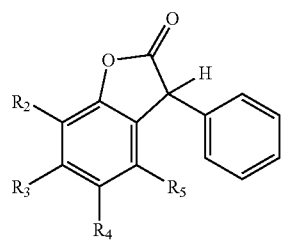
| Compound No. | R₂ | R₃ | R₄ | R₅ |
|---|---|---|---|---|
| (5)-52 | —CH₃ | —H | —C₄H₉(s) | —H |
| (5)-53 | —C₄H₉(s) | —H | —C₄H₉(t) | —H |
| (5)-54 | —C₄H₉(s) | —H | —C₅H₁₁(t) | —H |
| (5)-55 | —C₅H₁₁(t) | —H | —C₅H₁₁(t) | —H |
| (5)-56 | —C₄H₉(t) | —H | —C₅H₁₁(t) | —H |
| (5)-57 | —C₄H₉(s) | —H | —C₄H₉(s) | —H |
| (5)-58 | —C₄H₉(t) | —H | —(CH₂)₂CO₂C₈H₁₇(n) | —H |
| (5)-59 | —C₄H₉(t) | —H | —(CH₂)₂CO₂C₈H₁₇(i) | —H |
| (5)-60 | —C₄H₉(t) | —H | —(CH₂)₂CO₂(CH₂)₂OC₄H₉(n) | —H |
| (5)-61 | —C₁₂H₂₅ | —H | —CH₃ | —H |
| (5)-62 | —C₈H₁₇ | —H | —CH₃ | —H |

-continued
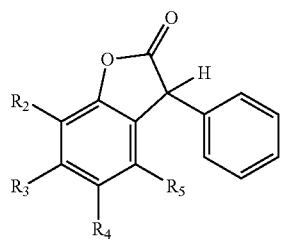
| Compound No. | $R_2$ | $R_3$ | $R_4$ | $R_5$ |
|---|---|---|---|---|
| (5)-63 | —$C_{16}H_{33}$ | —H | —$CH_3$ | —H |
| (5)-64 | —$C_{24}H_{49}$ | —H | —$CH_3$ | —H |
| (5)-65 | —$C_4H_9(t)$ | —H | —Cl | —H |
| (5)-66 | —$C_4H_9(t)$ | —H | —$OCH_3$ | —H |
| (5)-67 | —$C_4H_9(t)$ | —H | —O—$C_8H_{17}(n)$ | —H |
| (5)-68 | —C(CH₃)₂CH₂C(CH₃)₃ | —H | —C(CH₃)₂CH₂C(CH₃)₃ | —H |
| (5)-69 | —H | —H | —$OC_4H_9(n)$ | —H |
| (5)-70 | —H | —H | —$OCH_3$ | —H |
| (5)-71 | —H | —H | —$CH_3$ | —H |
| (5)-72 | —H | —H | —$C_4H_9(t)$ | —H |
| (5)-73 | —H | —H | —$C_5H_{11}(t)$ | —H |
| (5)-74 | —H | —H | —$C_8H_{17}(t)$ | —H |
| (5)-75 | —$C_4H_9(t)$ | —H | —$CH_3$ | —H |
| (5)-76 | —C(CH₃)₂CH₂C(CH₃)₃ | —H | —$C_8H_{17}(t)$ | —H |
| (5)-77 | —C(CH₃)₂CH₂C(CH₃)₃ | —H | —$C_9H_{19}$ | —H |
| (5)-78 | —C(CH₃)₂CH₂C(CH₃)₃ | —H | —$C_{12}H_{25}$ | —H |
| (5)-79 | —C(CH₃)₂CH₂C(CH₃)₃ | —H | —$(CH_2)_2CO_2C_8H_{17}(n)$ | —H |
| (5)-80 | —H | —H | —C(CH₃)₂CH₂C(CH₃)₃ | —H |

-continued

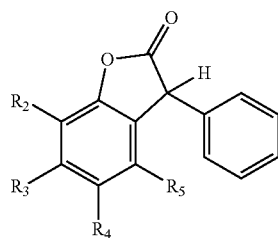

| Compound No. | R₂ | R₃ | R₄ | R₅ |
|---|---|---|---|---|
| (5)-81 | —H | —O—C₈H₁₇(n) | —H | —H |
| (5)-82 | —H | —O—C₈H₁₇(i) | —H | —H |
| (5)-83 | —H | —NHCOC₄H₉(n) | —H | —H |
| (5)-84 | —H | —O—C₈H₁₇(n) | —Cl | —H |
| (5)-85 | —CH₃ | —O—C₈H₁₇(n) | —H | —H |
| (5)-86 | —CH₃ | —O—C₈H₁₇(i) | —H | —Cl |
| (5)-87 | —H | —O—C₈H₁₇(n) | —H | —Cl |
| (5)-88 | —H | —N(CH₃)₂ | —H | —H |
| (5)-89 | —NH—C(=O)—C₆H₅ | —H | —C₈H₁₇(t) | —H |
| (5)-90 | —H | —CH₃ | —CH₃ | —H |
| (5)-91 | —H | —H | —(CH₂)₂OH | —H |
| (5)-92 | —H | —H | —(CH₂)₂OCOC₇H₁₅(n) | —H |
| (5)-93 | —H | —H | —(CH₂)₃OH | —H |
| (5)-94 | —C₄H₉(t) | —H | —(CH₂)₂OH | —H |
| (5)-95 | —C₄H₉(t) | —H | —(CH₂)₂OCOCH₃ | —H |
| (5)-96 | —H | —O(CH₂)₂OH | —C₄H₉(t) | —H |
| (5)-97 | —H | —H | —C₃H₇(i) | —H |
| (5)-98 | —H | —O(CH₂)₂OCH₃ | —H | —H |
| (5)-99 | —OC₂H₅ | —H | —H | —H |
| (5)-100 | —H | —H | —O—CH(C₆H₅) | —H |
| (5)-101 | —H | —H | —C₆H₅ | —H |
| (5)-102 | —Cl | —H | —Cl | —H |
| (5)-103 | —H | —Cl | —Cl | —H |
| (5)-104 | —C₄H₉(t) | —H | —H | —H |
| (5)-105 | —H | —H | —F | —H |
| (5)-106 | —H | —H | —CN | —H |
| (5)-107 | —CH₃ | —H | —CH₃ | —H |
| (5)-108 | —OCH₃ | —H | —C₂H₅ | —H |
| (5)-109 | —H | —H | —COCH₃ | —H |
| (5)-110 | —H | —H | —CO₂C₄H₉(n) | —H |
| (5)-111 | —H | —H | —O—C₆H₅ | —H |
| (5)-112 | —H | —H | —CH₂OH | —H |
| (5)-113 | —H | —H | —CH₂OH | —H |
| (5)-114 | —H | —H | —SO₂C₈H₁₇(i) | —H |
| (5)-115 | —H | —C₁₅H₃₁(n) | —H | —H |
| (5)-116 | —C₉H₁₉ | —H | —C₉H₁₉ | —H |
| (5)-117 | —CF₃ | —H | —H | —H |
| (5)-118 | —CH(H)C₆H₅ | —H | —Cl | —H |

-continued
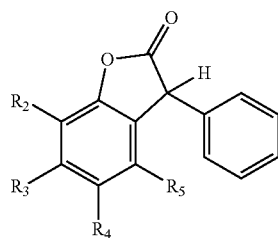
| Compound No. | R₂ | R₃ | R₄ | R₅ |
|---|---|---|---|---|
| (5)-119 | —H | —H | cyclohexyl | —H |
| (5)-120 | —H | —C₄H₉(t) | —H | —C₄H₉(t) |
| (5)-121 | —H | —H | —NHC(O)—C₆H₄—C(CH₃)₃ | —H |
| (5)-122 | —H | —H | —H | —H |
| (5)-123 | —H | —C₄H₉(t) | —H | —H |
| (5)-124 | —H | —CH₃ | —H | —CH₃ |
| (5)-125 | —H | —H | —(CH₂)₂CO₂C₁₈H₃₅(n) | —H |
| (5)-126 | —C₄H₉(t) | —H | —H | —C₄H₉(t) |
| (5)-127 | —H | —CH₃ | —H | —H |
| (5)-128 | —C₆H₅ | —H | —H | —H |
| (5)-129 | —H | —OCH₃ | —H | —H |
| (5)-130 | —H | —OH | —H | —H |
| (5)-131 | —H | —OCOC₁₇H₃₅ | —H | —H |
| (5)-132 | —H | —OH | —C(O)C₆H₅ | —H |
| (5)-133 | —C₈H₁₇(t) | —H | —C₈H₁₇(t) | —H |
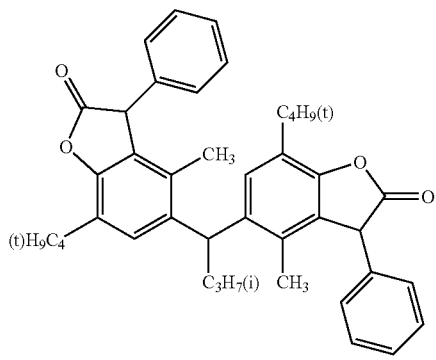
(5)-134
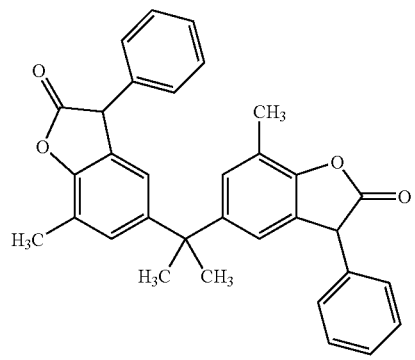
(5)-135

-continued
(5)-136
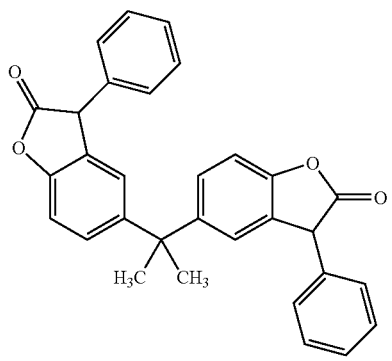
(5)-137
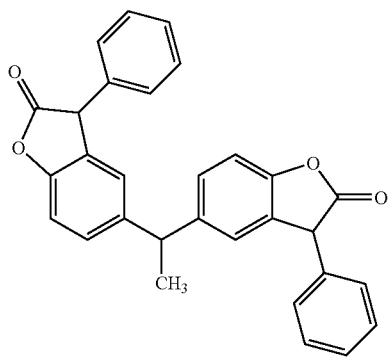
(5)-138
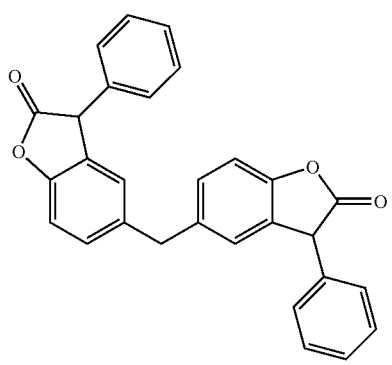
(5)-139
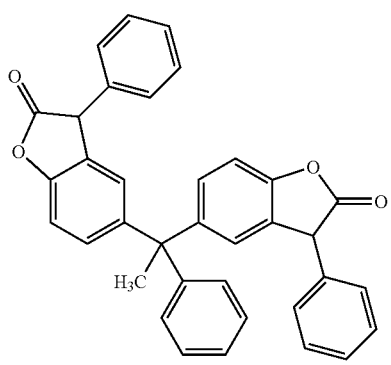
(5)-140
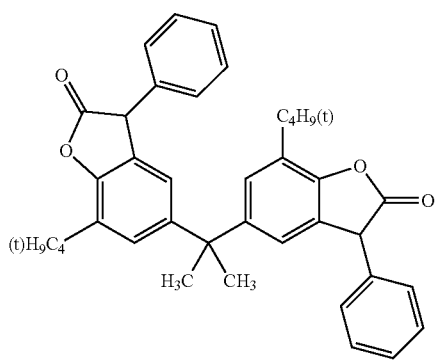
(5)-141
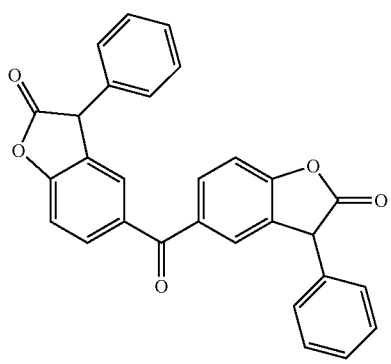
(5)-142
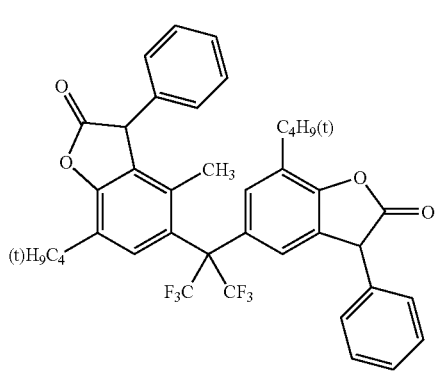
(5)-143
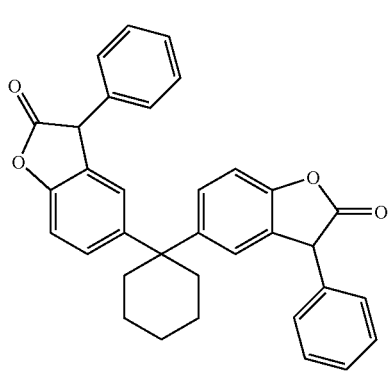

-continued
(5)-144
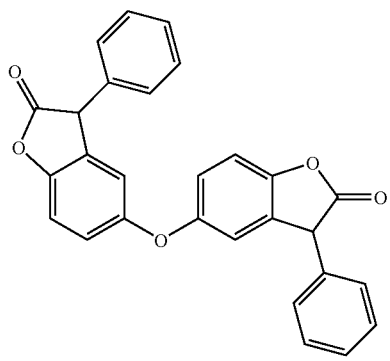
(5)-145
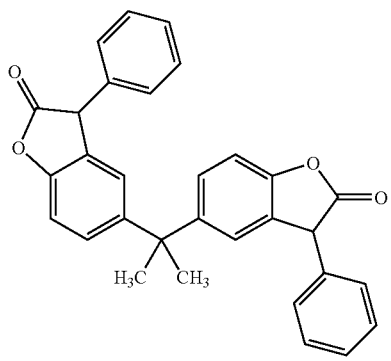
(5)-146
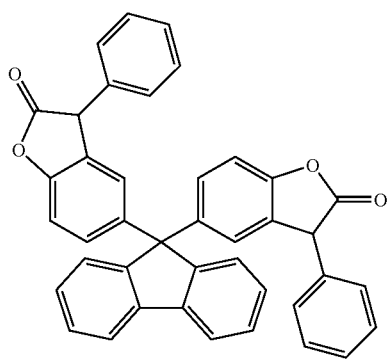
(5)-147
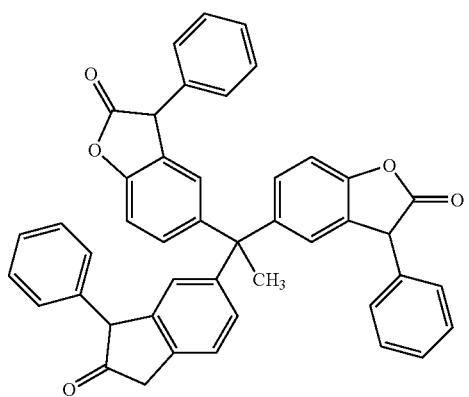
(5)-148
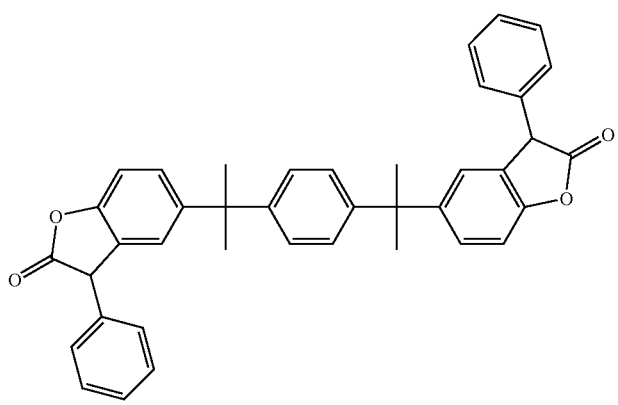

-continued (5)-149

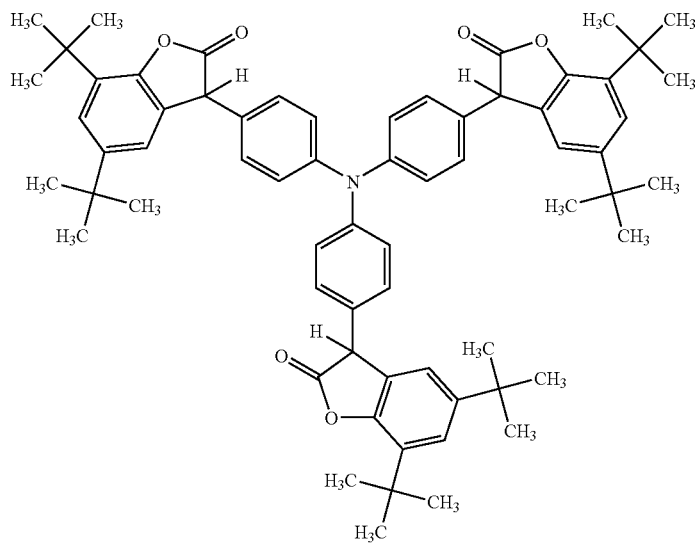

(5)-150

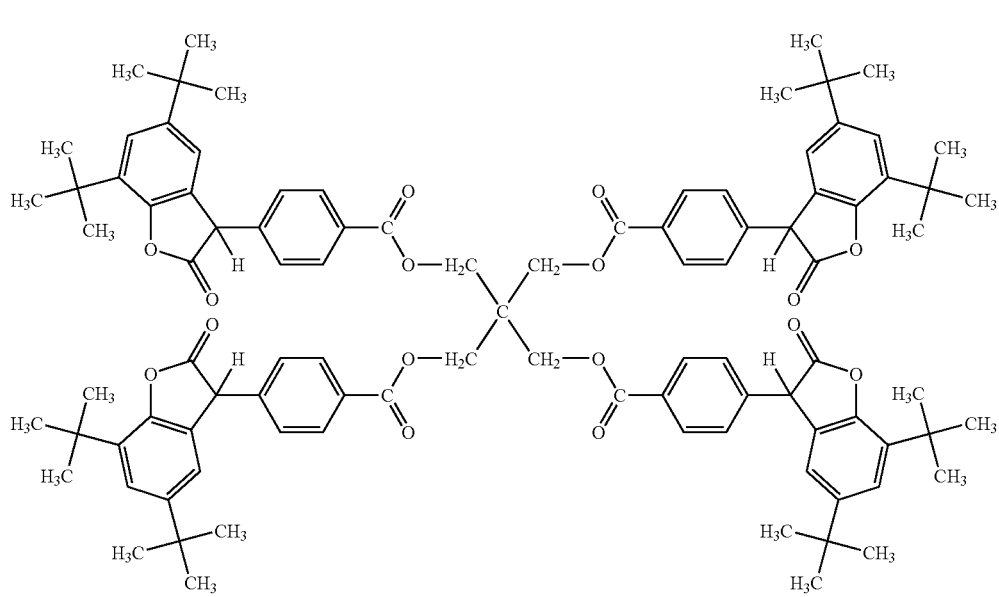

Next, compounds represented by above Formula (6) used in the present invention will, now specifically described that by no means limit the scope of the present invention.

In Formula (6), represents a hydrogen atom or an alkyl group of a carbon atom number of 1-10, preferably a hydrogen atom or an alkyl group of a carbon atom number of 1-4, and specifically preferably a hydrogen atom or a methyl group.

$R_{42}$ and $R_{43}$ each represent an alkyl group of a carbon atom number of 1-8 independently and may be straight-chained, or may have a branched or cyclic structure. $R_{42}$ and $R_{43}$ preferably have a structure represented by "*—$C(CH_3)_2$—R'" (the symbol * represents a linking site to an aromatic ring and R' represents an alkyl group of a carbon atom number of 1-5). $R_{42}$ is more preferably a tert-butyl group or a tert-amyl group. $R_{43}$ is more preferably a tent-butyl group, a tert-amyl group, or a tert-octyl group.

As compounds represented by Formula (6), for example, "SumilizerGM" and "SumilizerGS" as trade names are available on the market from Sumitomo Chemical Co., Ltd.

Specific examples of the compounds represented by Formula (6) will now be exemplified that by no means limit the scope of the present invention.

(6)-1

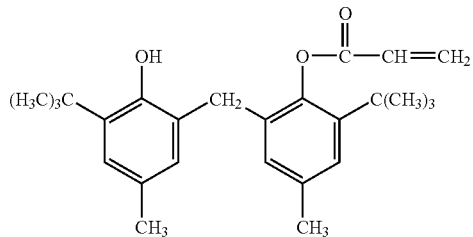

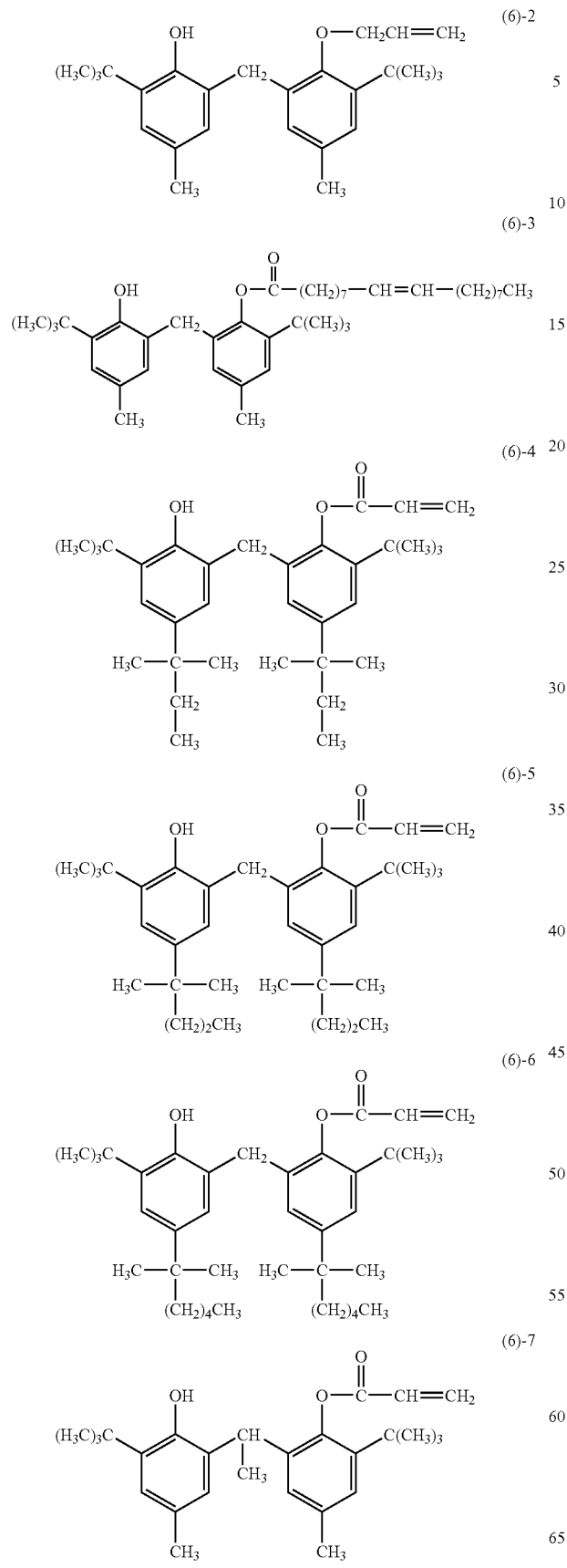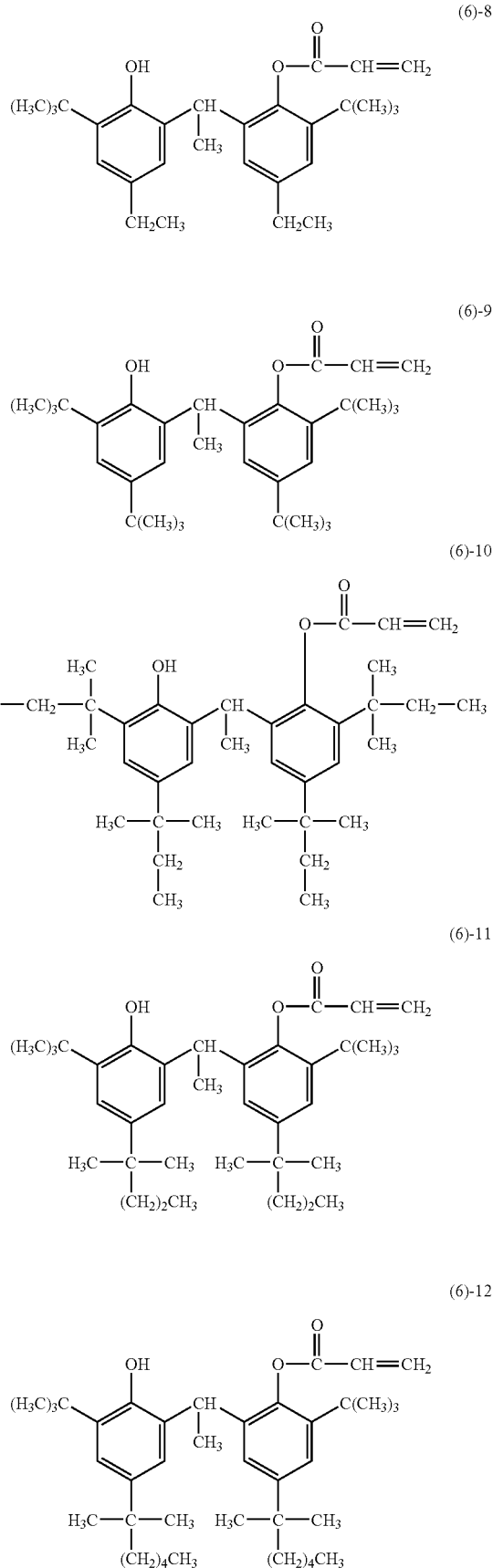

(6)-13

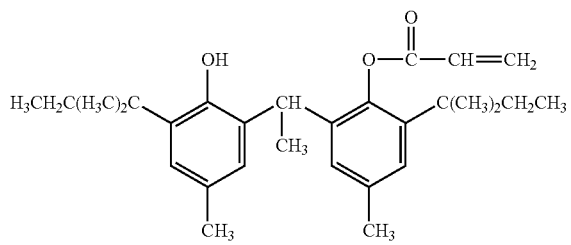

(6)-14

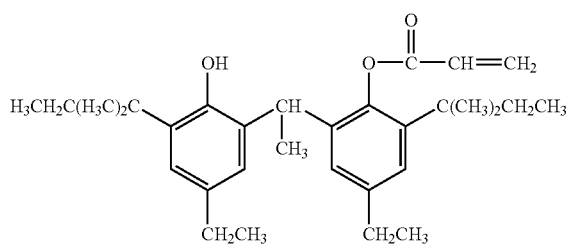

(6)-15

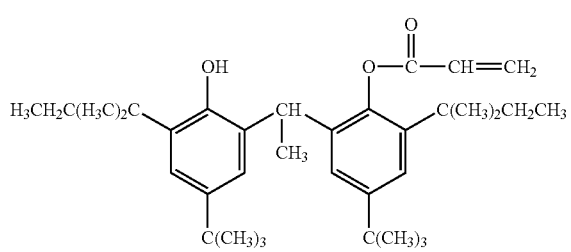

(6)-16

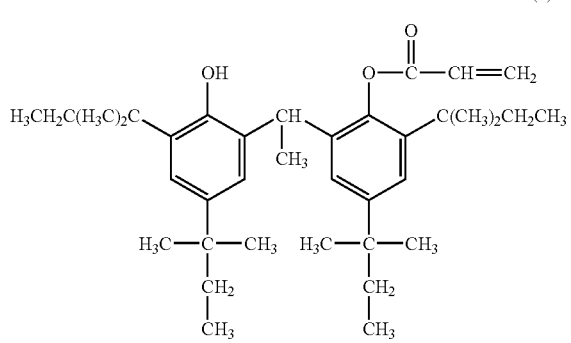

(6)-17

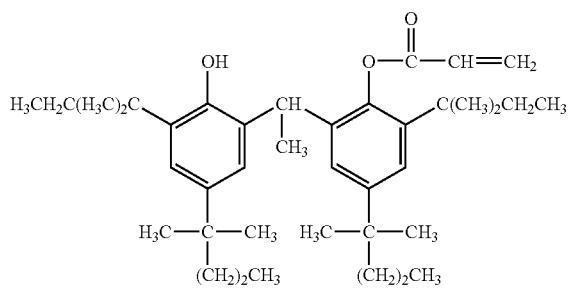

(6)-18

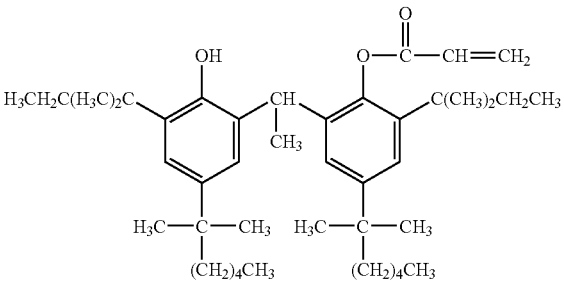

<<Antioxidants>>

Decomposition of a cellulose ester serving as a substrate of the cellulose ester film of the present invention is accelerated not only by heat but by oxygen. Therefore, the cellulose ester film of the present invention preferably contains an antioxidant as a stabilizer.

Especially, under such a high temperature ambience that melt film formation is carried out, decomposition of a film forming material is accelerated by heat and oxygen. Therefore, an antioxidant is preferably contained.

Further, a cellulose ester film of the preferred embodiment in the present invention is also preferably washed in the presence of an antioxidant during suspension washing using a poor solvent. As antioxidants to be employed, any compounds can be used with no limitation, as long as the compounds inactivate radicals generated in the cellulose ester; or prevent deterioration of the cellulose ester resulting from addition of oxygen to radicals generated in the cellulose ester.

An antioxidant used in suspension washing of a cellulose ester may remain in the cellulose ester after washing. The residual amount is preferably 0.01-2000 ppm, more preferably 0.05-1000 ppm, still more preferably 0.1-100 ppm.

As antioxidants useful in the present invention, any compounds can be used, as long as the compounds prevent deterioration of a film forming material by oxygen. Of these, useful antioxidants include a phenol-based compound, a hindered amine-based compound, a phosphor-based compound, a sulfur-based compound, an acrylate-based compound, a benzofranone-based compound, and an oxygen scavenger. Of these, a phenol-based compound, a phosphor-based compound, an acrylate-based compound, and a benzofranone-based compound are specifically preferable. By blending these compounds, coloration and strength decrease of a formed body caused by heat and heat oxidation deterioration can be prevented with no decrease in transparency and heat resistance. These antioxidants each can be used individually or in combinations of at least 2 types.

(Phenol-Based Compounds)

Phenol-based compounds are well-known, which are described, for example, in columns 12-14 of U.S. Pat. No. 4,839,405 specification, including 2,6-dialkylphenol-derived compounds. Of these compounds, as a preferable compound, a compound represented by following Formula (A) is preferable.

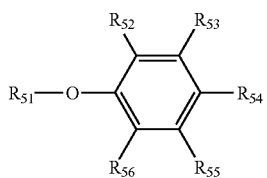

Formula (A)

wherein $R_{51}$-$R_{56}$ represent a hydrogen atom or a substituent. As the substituent, listed are a halogen atom (e.g., a fluorine atom and a chlorine atom), an alkyl group (e.g., a methyl group, an ethyl group, an isopropyl group, a hydroxyethyl group, a methoxymethyl group, a trifluoromethyl group, and a t-butyl group), a cycloalkyl group (e.g., a cyclopentyl group and a cyclohexyl group), an aralkyl group (e.g., a benzyl group and a 2-phenetyl group), an aryl group (e.g., a phenyl group, a naphthyl group, a p-tolyl group, and a p-chlorophenyl group), an alkoxy group (e.g., a methoxy group, an ethoxy group, an isopropoxy group, and a butoxy group), an aryloxy group (e.g., a phenoxy group) a cyano group, an acylamino group (e.g. an acetylamino group and a propionylamino group), an alkylthio group (e.g., a methylthio group, an ethylthio group, and a butylthio group), an arylthio group (e.g., a phenylthio group), a sulfonylamino group (e.g., a methanesulfonylamino group and a benzenesulfonylamino group), a ureido group (e.g., a 3-methylureido group, a 3,3-dimethylureido group, and a 1,3-dimethylureido group), a sulfamoylamino group (e.g., a dimethylsulfamoylamino group), a carbamoyl group (e.g., a methylcarbamoyl group, an ethylcarbamoyl group, and a dimethylcarbamoyl group), a sulfamoyl group (e.g., an ethylsulfamoyl group and a dimethylsulfamoyl group), an alkoxycarbonyl group (e.g., a methoxycarbonyl group and an ethoxycarbonyl group), an aryloxycarbonyl group (e.g., a phenoxycarbonyl group), a sulfonyl group (e.g., a methanesulfonyl group, a butanesulfonyl group, and a phenylsulfonyl group), an acyl group (e.g. an acetyl group, a propanoyl group, and a butyroyl group), an amino group (e.g., a methylamino group, an ethylamino group, and a dimethylamino group), a cyano group, a hydroxy group, a nitro group, a nitroso group, an amine oxide group (e.g., a pyridine-oxide group), an imide group (e.g., a phthalimide group), a disulfide group (e.g., a benzenedisulfide group and benzothiazolyl-2-disulfide group), a carboxyl group, a sulfa group, a heterocyclic group (e.g., a pyrrole group, a pyrrolidyl group, a pyrazolyl group, an imidazolyl group, a pyridyl group, a benzimidazolyl group, a benzothiazolyl group, and a benzoxazolyl group). These substituents may further be substituted.

Further, $R_{51}$ represents a hydrogen atom. $R_{52}$ and $R_{56}$ are preferably a phenyl-based compound with a t-butyl group. Specific examples of such a phenyl group include n-octadecyl 3-(3,5,-di-t-butyl-4-hydroxyphenol)-propionate, n-octadecyl 3-(3,5,-di-t-butyl-4-hydroxyphenol)-acetate, n-octadecyl 3,5-di-t-butyl-4-hydrobenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenyl)-propionate, dodecyl β-(3,5-di-t-butyl-4-hydroxyphenyl)-propionate, ethyl α-(4-hydroxy-3,5-di-t-butylphenyl)-isobutyrate, octadecyl α-(4-hydroxy-3,5-di-t-butylphenyl)-isobutyrate, octadecyl α-(4-hydroxy-3,5-di-t-butyl-4-hydroxyphenyl)-propionate, 2-(n-oethylthio)ethyl 3,5-di-t-butyl-4-hydroxyphenylacetate, 2-(n-octylthio)ethyl 3,5-di-t-butyl-4-hydroxyphenylacetate, 2-(n-octadecylthio)ethyl 3,5-di-t-butyl-4-hydroxyphenylacetate, 2-(n-octadecylthio) ethyl 3,5-di-t-butyl-4-hydroxybenzoate, 2-(2-hydroxyethylthio)ethyl 3,5-di-t-butyl-4-hydroxybenzoate, diethyl glycol bis-(3,5-di-t-butyl-4-hydroxyphenyl)propionate, 2-(n-octadecylthio)ethyl 3-(3,5-di-t-butyl-4-hydroxyphenyl) propionate, stearamido N,N-bis-[ethylene 3-(3,5-di-t-butyl-4-hydroxyphenyl)propionate], n-butylimino N,N-bis-[ethylene 3-(3,5-di-t-butyl-4-hydroxyphenyl)propionate], 2-(2-stearoyloxyethylthio)ethyl 3,5-di-t-butyl-4-hydroxybenzoate, 2-(2-stearoyloxyethylthio)ethyl 7-(3-methyl-5-t-butyl-4-hydroxyphenyl)heptanoate, 1,2-propylene glycol bis-[3-(3,5-di-t-butyl-4-hydroxyphenyl)propionate], ethylene glycol bis-[3-(3,5-di-t-butyl-4-hydroxyphenyl)propionate], neopentylglycol bis-[3-(3,5-di-t-butyl-4-hydroxyphenyl)propionate], ethylene glycol bis-(3,5-di-t-butyl-4-hydroxyphenylacetate), glycerine-1-n-octadecanoate-2,3-bis-(3,5-di-t-butyl-4-hydroxyphenylacetate), pentaerythritol-tetrakis-[3-(3',5'-di-t-butyl-4-4'-hydroxyphenyl)propionate], 1,1,1-trimethylol ethane-tris-3-[3-(3,5-di-t-butyl-4-hydroxyphenyl)propionate], sorbitol hexa-[3-(3,5-di-t-butyl-4-hydroxyphenyl)propionate], 2-hydroxyethyl 7-(3-methyl-5-t-butyl-4-hydroxyphenyl)propionate 2-stearoyloxyethyl 7-(3-methyl-5-t-butyl-4-hydroxyphenyl)heptanoate, 1,6-n-hexanediol-bis[(3',5'-di-t-butyl-4-hydroxyphenyl)propionate], pentaerythritol-tetrakis-(3,5-di-t-butyl-4-hydroxycinnamate), and bis-[3,3-bis-(4'-hydroxy-3'-t-butylphenyl)butanoic acid]-glycol ester. As these types of such phenol compounds, "Irganox1076" and "Irganox1010" as trade names are available on the market from Ciba Japan K.K. and "Hostanox O3" from Clariant Japan Co.

(Hindered Amine-Based Compounds)

As one of the antioxidants useful in the present invention, a hindered amine-based compound represented by following Formula (B) is preferable.

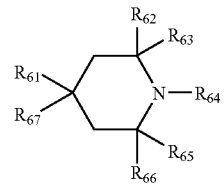

Formula (B)

wherein $R_{61}$-$R_{67}$ represent a hydrogen atom or a substituent. This substituent is identical with the substituent represent by any of $R_{51}$-$R_{56}$ of above Formula (A). $R_{64}$ is preferably a hydrogen atom or a methyl group. $R_{67}$ is preferably a hydrogen atom. And $R_{62}$, $R_{63}$, $R_{65}$, and $R_{66}$ are preferably a methyl group.

Specific examples of the hindered amine-based compound include bis(2,2,6,6-tetramethyl-4-piperidyl) sebacate, bis(2,2,6,6-tetramethyl-4-piperidyl) succinate, bis(1,2,2,6,6-pentamethyl-4-piperidyl) sebacate, bis(N-octyloxy-2,2,6,6-tetramethyl-4-piperidyl) sebacate, bis(N-benzyloxy-2,2,6,6-tetramethyl-4-piperidyl) sebacate, bis(N-cyclohexyloxy-2,2,6,6-tetramethyl-4-piperidyl) sebacate, bis(1,2,2,6,6-pentamethyl-4-piperidyl) 2-(3,5-di-t-butyl-4-hydroxybenzyl)-2-butylmalonate, bis(1-acryloyl-2,2,6,6-tetramethyl-4-piperidyl) 2,2-bis(3,5-di-t-butyl-4-hydroxybenzyl)-2-butylmalonate, bis(1,2,2,6,6-pentamethyl-4-piperidyl) decanedioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)

propionamide, tetrakis(2,2,6,6-tetramethyl-4-piperidyl) 1,2,3,4-butanetetracarboxylate, and tetrakis(1,2,2,6,6-pentamethyl-4-piperidyl) 1,2,3,4-butanetetracarboxylate.

Further, polymer type compounds are employable. Specific examples thereof include, with no limitation, high molecular weight HALS in which plural piperidine rings are bonded together via a triazine skeleton such as N,N',N'',N''',N''''-tetrakis-[4,6-bis-{butyl-(N-methyl-2,2,6,6-tetramethylpiperidine-4-yl)amino}-triazine-2-yl]-4,7-diazadecane-1,10-diamine, a polycondensation compound of dibutylamine, 1,3,5-triazine-N,N'-bis(2,2,6,6-tetramethyl-4-piperidyl)-1,6-hexamethylenediamine, and N-(2,2,6,6-tetramethyl-4-piperidyl)butylamine, a polycondensation compound of dibutylamine, 1,3,5-triazine, and N,N'-bis(2,2,6,6-tetramethyl-4-piperidyl)butylamine, poly[{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], a polycondensation compound of 1,6-hexanediamine-N,N'-bis(2,2,6,6-tetramethyl-4-piperidyl) and morphorine-2,4,6-trichloro-1,3,5-triazine, or poly[(6-morphorino-s-triazine-2,4-diyl){(2,2,6,6-tetramethyl-4-piperidyl)imino}-hexamethylene{(2,2,6,6-tetramethyl-4-piperidyl)imino}]; and compounds joining a piperidine ring via an ester bond such as a polymer of dimethyl succinate and 4-hydroxy-2,2,6,6-tertamethyl-1-piperidine ethanol or a mixed esterified compound of 1,2,3,4-butanetetracarboxylic acid, 1,2,2,6,6-pentamethyl-4-piperidinol, and 3,9-bis(2-hydroxy-1,1-dimethyl)-2,4,8,10-tetraoxasupiro[5,5]undecane.

Of these, preferable are those having a number average molecular weight (Mn) of 2,000-5,000, which are a polycondensation compound of dibutylamine, 1,3,5-triazine, and N,N'-bis(2,2,6,6-tetramethyl-4-piperidyl)butylamine; poly[{(1,1,3,3-tetramethylbutyl)amino-1,3,5-triazie-2,4-diyl}{2,2,6,6-tetramethyl-4-piperidyl)imino]hexamethylene{(2,2,6,6-tetramethyl-4-piperidyl)-imino}], and a polymer of dimethyl succinate and 4-hydroxy-2,2,6,6-tetramethyl-1-piperidine ethanol.

As hindered amine compounds of these types, for example, "Tinuvi144" and "Tinuvin770" as trade names are available on the market from Ciba Japan K.K. and "ADK STAB LA-52" from Adeka Corp.

(Phosphor-Based Compounds)

As one of the antioxidants useful in the present invention, preferable is any of the compounds having a partial structure represented by following Formula (C-1), (C-2), (C-3), (C-4), or (C-5) in the molecule.

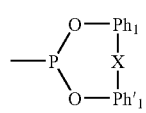

Formula (C-1)

wherein $Ph_1$ and $Ph'_1$ represent a substituent. This substituent is identical with the substituent represented by any of $R_{51}$-$R_{56}$ of above Formula (A). $Ph_1$ and $Ph'_1$ more preferably represent a phenylene group. Hydrogen atoms of the phenylene group may be substituted with a phenyl group, an alkyl group of a carbon atom number of 1-8, a cycloalkyl group of a carbon atom number of 5-8, an alkylcycloalkyl group of a carbon atom number of 6-12, or an aralkyl group of a carbon atom number of 7-12. $Ph_1$ and $Ph'_1$ each may be the same or differ. X represents a single bond, a sulfur atom, or —$CHR_a$—. $R_a$ represents a hydrogen atom, an alkyl group of a carbon atom number of 1-8, or a cycloalkyl group of a carbon atom number of 5-8. Further, these may be substituted with a substituent identical with the substituent represented by any of $R_{51}$-$R_{56}$ of Formula (A).

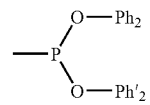

Formula (C-2)

wherein $Ph_2$ and $Ph'_2$ represent a substituent. This substituent is identical with the substituent represented by any of $R_{51}$-$R_{56}$ of above Formula (A). $Ph_2$ and $Ph'_2$ more preferably represent a phenyl group or a biphenyl group. Hydrogen atoms of the phenyl group or the biphenyl group may be substituted with an alkyl group of a carbon atom number of 1-8, a cycloalkyl group of a carbon atom number of 5-8, an alkylcycloalkyl group of a carbon atom number of 6-12, or an aralkyl group of a carbon atom number of 7-12. $Ph_2$ and $Ph'_2$ each may be the same or differ. Further, these may be substituted with a substituent identical with the substituent represented by any of $R_{51}$-$R_{56}$ of Formula (A).

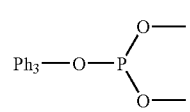

Formula (C-3)

wherein $Ph_3$ represents a substituent. This substituent is identical with the substituent represented by any of $R_{51}$-$R_{56}$ of above Formula (A). $Ph_3$ more preferably represents a phenyl group or a biphenyl group. Hydrogen atoms of the phenyl group or the biphenyl group may be substituted with an alkyl group of a carbon atom number of 1-8, a cycloalkyl group of a carbon atom number of 5-8, an alkylcycloalkyl group of a carbon atom number of 6-12, or an aralkyl group of a carbon atom number of 7-12. Further, these may be substituted with a substituent identical with the substituent represented by any of $R_{51}$-$R_{56}$ of Formula (A).

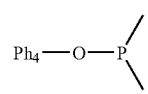

Formula (C-4)

wherein $Ph_4$ represents a substituent. This substituent is identical with the substituent represented by any of $R_{51}$-$R_{56}$ of above Formula (A). $Ph_4$ more preferably represents an alkyl group of a carbon atom number of 1-20 and a phenyl group. The alkyl group or the phenyl group may be substituted with a substituent identical with the substituent represented by any of $R_{51}$-$R_{56}$ of Formula (A).

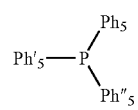

wherein $Ph'_5$, $Ph'_5$, and $Ph''_5$ represent a substituent. This substituent is identical with the substituent represented by any of $R_{51}$-$R_{56}$ of above Formula (A). $Ph_5$, $Ph'_5$, and $Ph''_5$ more preferably represent an alkyl group of a carbon atom number of 1-20 or a phenyl group. The alkyl group or the phenyl group may be substituted with a substituent identical with the substituent represented by any of $R_{51}$-$R_{56}$ of Formula (A).

As specific examples of phosphor-based compounds, listed are monophosphite compounds such as triphenylphosphite, diphenylisodecylphosphite, phenyldiisodecylphosphite, tris(nonylphenyl)phosphite, tris(dinonylphenyl)phosphite, tris(2,4-di-t-butylphenyl)phosphite, 10-(3,5-di-t-butyl-4-hydroxybenzyl)-9,10-dihydro-9-oxa-10-phosphaphenathlene-10-oxide, 6-[3-(3-t-butyl-4-hydroxy-5-methylphenyl)propoxy]-2,4,8,10-tetra-t-butyldibenz[d,f][1.3.2]dioxaphosphepin, or tridecyl phosphite; diphosphite-based compounds such as 4,4'-butylidene-bis(3-methyl-6-t-butylphenyl-di-tridecylphosphite) or 4,4'-isopropylidene-bis(phenyl-di-alkyl(C12-C15)phosphite); phosphonite compounds such as triphenylphosphonite, tetrakis(2,4-di-tert-butylphenyl) [1,1-biphenyl]4,4'-diylbisphosphonite, or tetrakis(2,4-di-tert-butyl-5-methylphenyl)[1,1-biphenyl]-4,4'-diylbisphosphonite; phosphinite compounds such as triphenylphosphinite or 2,6-dimethylphenyldiphenylphosphinite; and phosphine compounds such as triphenylphosphine or tris(2,6-dimethoxyphenyl)phosphine.

As phosphor-based compounds of these types, for example, "SumilizerGP" as a trade name is available on the market from Sumitomo Chemical Co., Ltd. and "ADK STAB PEP-24G," "ADK STAB PEP-36," and "ADK STAB 3010" from Adeka Corp., as well as "IRGAFOS P-EPQ" from Ciba Japan K.K. and "GSY—P101" from Sakai Chemical Industry Co., Ltd.

(Sulfur-Based Compounds)

As one of the antioxidants useful in the present invention, a sulfur-based compound represented by following Formula (D) is preferable.

$$R_{71}-S-R_{72} \quad \text{Formula (D)}$$

wherein $R_{71}$ and $R_{72}$ represent a substituent. This substituent is identical with the substituent represented by any of $R_{51}$-$R_{56}$ of above Formula (A).

As specific examples of sulfur-based compounds, listed are dilauryl 3,3-thiodipropionate, dimyristyl 3,3'-thiodipropionate, distearyl 3,3-thiodipropionate, lauryl stearyl 3,3-thiodipropionate, pentaerythritol-tetrakis(β-lauryl-thio-propionate), and 3,9-bis(dodecylthioethyl)-2,4,8,10-tetraoxaspiro[5,5]undecane.

As sulfur-based compounds of these types, for example, "Sumilizer TPL-R" and "Sumilizer TP-D" as trade names are available on the market from Sumitomo Chemical Co., Ltd.

Any impurities such as residual acids, inorganic salts, or organic low molecular compounds carried over from during production or generated during storage are preferably removed from antioxidants, similarly to the above cellulose ester, and the purities of the antioxidants are preferably at least 99%. The residual acids and water are preferably in the range of 0.01-100 ppm, whereby in melt film formation for a cellulose ester, heat deterioration is inhibited, and film forming stability, as well as optical and mechanical physical properties of the film, is enhanced.

In the present invention, such antioxidants each are preferably added at 0.01-10% by mass based on a cellulose ester, more preferably 0.1-5% by mass, still more preferably 0.2-2% by mass. These may be used in combinations of at least 2 types.

Excessively small amounts of antioxidants added produce low stabilizing action during melting, whereby no effects can be expressed. Further, excessively small amounts of the antioxidants added result in a decrease in transparency as the film from the viewpoint of compatibility with a cellulose ester, as well as resulting in a fragile film, which is unfavorable.

<<Acid Scavengers>>

Under a high temperature ambience such that melt film formation is carried out, decomposition of a cellulose ester is accelerated also by an acid. Therefore, in the cellulose ester film of the present invention, an acid scavenger serving as a stabilizer is preferably contained. As acid scavengers useful in the present invention, any compounds which inactivate an acid via reaction with the acid can be used with no limitation. Of these, epoxy group-containing compounds as described in U.S. Pat. No. 4,137,201 specification are preferable. Such epoxy compounds as acid scavengers are well-known in the relevant technological field, including various types of glycidyl ethers of polyglycols, specifically, polyglycols derived via condensation of ethylene oxide at a rate of about 8-40 mol/polyglycol; glycidyl ether of glycerol; metal epoxy compounds (e.g., those having been conventionally used in vinyl chloride polymers compositions or with the vinyl chloride polymers); epoxidized ether condensation products; glycidyl ethers of bisphenol A (namely, 4,4'-dihydroxydiphenyldimethylmethane); epoxidized unsaturated fatty acid esters (specifically, ethers of fatty acids having about 2-22 carbon atoms and alkyl groups having 4 (e.g., butyl epoxystearate); epoxidized plant oils which can be represented and exemplified by compositions of various epoxidized long-chain fatty acid triglycerides (e.g., epoxidized soybean oil and epoxidized linseed oil); and other unsaturated natural oils (these are occasionally referred to as epoxidized natural glycerides or unsaturated fatty acids, and these fatty acids usually have 12-22 carbon atoms). Further, there can be preferably used, as commercially available epoxy group-containing epoxide resin compounds, EPON 8150 and other epoxidized ether oligomer condensation products represented by following Formula (E).

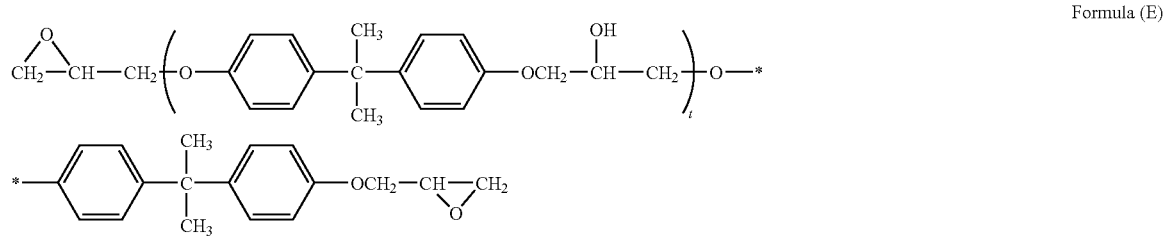

Formula (E)

wherein t represents an integer of 0-12. Other usable acid scavengers include those described in paragraphs 87-105 of JP-A No. 5-194788.

The added amount of acid scavengers is preferably 0.1-10% by mass, more preferably 0.2-5% by mass, and still more preferably 0.5-2% by mass. These may be used in combinations of at least 2 types.

Further, acid scavengers may also be referred to as acid removers, acid trapping agents, or acid catchers. In the present invention, these names can be used with no difference in name.

<<Metal Inactivators>>

Metal inactivators refer to compounds inactivating metal ions which act as initiators or catalysts in oxidation reaction, including hydrazide-based compounds, oxalic acid diamide-based compounds, and triazole-based compounds. For example, listed are N,N'-bis[3-(3,5-di-t-butyl-4-hydroxyphenyl)propionyl]hydrazine, 2-hydroxyethyl oxalic acid amide, 2-hydroxy-N-(1H-1,2,4-triazole-3-yl)benzamide, and N-(5-tert-butyl-2-ethoxypheyl)-N'-(2-ethylphenyl)oxalic acid amide.

In the present invention, metal inactivators may be used. Metal inactivators used are preferably added at a rate of 0.0002-20 by mass based on a cellulose ester according to the present invention, more preferably 0.0005-2% by mass, and still more preferably 0.001-1% by mass. These may be used in combinations of at least 2 types.

<<UV Absorbents>>

Preferable are UV absorbents having an excellent ability of absorbing UV radiation of a wavelength of at most 370 nm from the viewpoint of preventing deterioration of a polarizer and a display device due to UV radiation, and preferable are those minimizing absorption of visible light of a wavelength of at least 400 nm from the viewpoint of liquid crystal display performance. UV absorbents preferably used in the present invention include, for example, oxybenzophenone-based compounds, benzotriazole-based compounds, salicylic acid ester-based compounds, benzophenone-based compounds, cyanoacrylate-based compounds, nickel complex-based compounds, and triazine-based compounds. Of these, preferable are benzophenone-based compounds, as well as benzotriazole-based compounds and triazine-based compounds which result in minimal coloration. Further, usable are UV absorbents described in JP-A Nos. 10-182621 and 8-337574, as well as polymer UV absorbents described in JP-A Nos. 6-148430 and 2003-113317.

Specific examples of benzotriazole UV absorbents include, with no limitation, 2-(2'-hydroxy-5'-methylphenyl) benzotriazole, 2-(2'-hydroxy-3',5'-di-tert-butylphenyl)benzotriazole, 2-(2'-hydroxy-3'tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl) benzotriazole, 2,2-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2-(2'hydroxy-3'-tert-butyl-5'-(2-octyloxycarbonylethyl)-phenyl)-5-chlorobenzotriazole, 2-(2'-hydroxy-3'-(1-methyl-1-phenylethyl)-5'-(1,1,3,3-tetramethylbutyl)-phenyl)benzotriazole, 2-(2H-benzotriazole-2-yl)-6-(straight-chained or branched dodecyl)-4-methylphenol, and a mixture of octyl-3-[3-tert-butyl-4-hydroxy-5-(chloro-2H-benzotriazole-2-yl)phenyl]propionate and 2-ethylhexyl-3-[3-tert-butyl-4-hycroxy-5-(5-chloro-2H-benzotriazole-2-yl)phenyl]propionate.

As such commercially available products, listed are TINUVIN 171, TINUVIN 900, TINUVIN 928, and TINUVIN 360 (all produced by Ciba Japan K.K.), LA 31 (produced by Adeka Coip.), and RUVA-100 (produced by Otsuka Chemical Co., Ltd.).

Specific examples of benzophenone compounds include, with no limitation, 2,4-dihydroxybenzophenone, 2,2'-dihydroxy-4-methoxybenzopheneone, 2-hydroxy-4-methoxy-5-sulfobenzophenone, and bis(2-methoxy-4-hydroxy-5-benzoylphenylmethane).

In the present invention, the added amount of UV absorbents is preferably 0.1-5% by mass based on a cellulose ester, more preferably 0.2-3% by mass, and still more preferably 0.5-2% by mass. These may be used in combinations of at least 2 types.

Further, a part of a polymer may be substituted with a benzotriazole structure or a triazine structure, or a polymer may regularly be substituted therewith. Also, such a structure may be introduced into a part of the molecular structure of another additive such as a plasticizer, an antioxidant, or an acid scavenger.

Well-known UV absorbing polymers are not specifically limited, including, for example, a polymer prepared via single polymerization of RUVA-93 ((produced by Otsuka Chemical Co., Ltd.) and a polymer prepared via copolymerization of RUVA-93 and another monomer. Specifically, listed are PUVA-30M prepared via copolymerization of RUVA-93 and methyl methacrylate at a ratio of 3:7 (mass ratio), and PUVA-50M at a ratio of 5:5 (mass ratio). Further, polymers as described in JP-A No. 2003-113317 are listed.

<<Plasticizers>>

In a cellulose ester film according to the present invention, at least 1 type of plasticizer may be added, in addition to at least 2 types of compounds represented by above Formula (1) differing in the number of hydroxyl groups.

In the present invention, as other plasticizers, preferable are ester-based plasticizers containing polyols and monocarboxylic acids; and ester-based plasticizers containing polycarboxylic acids and monohydric alcohols, since enhanced affinity to a cellulose ester is expressed.

Examples of polyols serving as raw materials of ester-based plasticizers preferably used in the present invention include, with no limitation, for example, adonitol, arabitol, ethylene glycol, glycerin, diglycerin, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanedial, 1,6-hexanediol, hexanetriol, galactitol, mannitol, 3-methylpentane-1,3,5-triol, pinacol, sorbitol, trimethylolpropane, ditrimethylolpropane, trimethylolethane, pentaerythritol, dipentaerythritol, and xylitol. Ethylene glycol, glycerin, and trimethylolpropane are specifically preferable.

As ethylene glycol ester-based plasticizers, one of the polyol ester-based plasticizers, specifically listed are ethylene glycol alkyl ester-based plasticizers such as ethylene glycol diacetate or ethylene glycol dibutyrate; ethylene glycol cycloalkyl ester-based plasticizers such as ethylene glycol dicyclopropyl carboxylate or ethylene glycol dicyclohexyl carboxylate; and ethylene glycol aryl ester-based plasticizers such as ethylene glycol dibenzoate and ethylene glycol di-4-methylbenzoate. These alkylate groups, cycloalkylate groups, and arylate groups may be the same or differ and may further be substituted. Any mixture of the alkylate groups, cycloalkylate groups, and arylate groups is usable. Further, these substituents may be bonded to each other via covalent bonding. Still further, ethylene glycol portions may be substituted. Also, a part of a polymer may be substituted with a partial structure of an ethylene glycol ester or a polymer may regularly be substituted therewith. Such a structure may be introduced into a part of the molecular structure of an additive such as an antioxidant, an acid scavenger, or a UV absorbent.

As glycerin ester-based plasticizers, one of the polyol ester-based plasticizers, specifically listed are glycerin alkyl esters such as triacetin, tributyrin, glycerin diacetate caprylate, or glycerin oleate propionate; glycerin, cycloalkyl esters such as glycerin tricycropropyl carboxylate or glycerin tricyclohexyl carboxylate; glycerin aryl esters such as glycerin tribenzoate or glycerin 4-methylbenzoate; diglycerin alkyl esters such as diglycerin tetraacetylate, diglycerin tetrapropionate, diglycerin acetate tricaprylate, or diglycerin tetralaurate; diglycerin cycloalkyl esters such as diglycerin tetracyclobutyl carboxylate or diglycerin tetracyclopentyl carboxylate; and diglycerin aryl esters such as diglycerin tetrabenzoate or diglycerin 3-methylbenzoate. These alkylate groups, cycloalkyl carboxylate groups, and arylate groups may be the same or differ and may further be substituted. Any mixture of the alkylate groups, cycloalkyl carboxylate groups, and arylate groups is usable. Further, these substituents may be bonded to each other via covalent bonding. Still further, glycerin or diglycerin portions may be substituted. Also, a part of a polymer may be substituted with a partial structure of glycerin or diglycerin or may regularly be substituted therewith. Such a structure may be introduced into a part of the molecular structure of an additive such as an antioxidant, an acid scavenger, or a UV absorbent.

As other polyol ester-based plasticizers, there can specifically be listed the polyol ester-based plasticizers described in paragraphs 30-33 of JP-A No. 2003-12823.

These alkylate groups, cycloalkyl carboxylate groups, and arylate groups may be the same or differ and may further be substituted. Any mixture of the alkylate groups, cycloalkyl carboxylate groups, and arylate groups is usable. Further, these substituents may be bonded to each other via covalent bonding. Still further, polyol portions may be substituted. Also, a part of a polymer may be substituted with a partial structure of a polyol or may regularly be substituted therewith. Such a structure may be introduced into a part of the molecular structure of an additive such as an antioxidant, an acid scavenger, or a UV absorbent.

Of these ester-based plasticizers containing polyols and monocarboxylic acids, alkylpolyol aryl esters are preferable. Specifically, listed are ethylene glycol dibenzoate, glycerin tribenzoate, and diglycerin tetrabenzoate described above, as well as Exemplified Compound 16 described in paragraph 31 of JP-A No. 2003-12823.

As dicarboxylic acid ester-based plasticizers, one of the polycarboxylic acid ester-based plasticizers, specifically listed are alkyldicarboxylic acid alkyl ester-based plasticizers such as didodecyl malonate or dioctyl adipate, or dibutyl sebacate; alkyldicarboxylic acid cycloalkyl ester-based plasticizers such as dicyclopentyl succinate or dicyclohexyl adipate; alkyldicarboxylic acid aryl ester-based plasticizers such as diphenyl succinate or di-4-methylphenyl glutarate; cycloalkyldicarboxylic acid alkyl ester-based plasticizers such as dihexyl 1,4-cyclohexanedicarboxylate or didecyl bicyclo[2.2.1]heptane-2,3-dicarboxylate; cycloalkyldicarboxylic acid cycloalkyl ester-based plasticizers such as dicyclohexyl 1,2-cyclobutanedicarboxylate or dicyclopropyl 1,2-cyclohexyldicarboxylate; cycloalkyldicarboxylic acid aryl ester-based plasticizers such as diphenyl 1,1-cyclopropyldicarboxylate or di-2-naphthyl 1,4-cyclohexanedicarboxylate; aryl dicarboxylic acid alkyl ester-based plasticizers such as diethyl phthalate, dimethyl phthalate, dioctyl phthalate, dibutyl phthalate, or di-2-ethylhexyl phthalate; aryldicarboxylic acid cycloalkyl ester-based plasticizers such as dicyclopropyl phthalate or dicyclohexyl phthalate; and aryldicarboxylic acid aryl ester-based plasticizers such as diphenyl phthalate or di-4-methylphenyl phthalate. These alkoxy groups and cycloalkoxy groups may be the same or differ, and may further have one substituent. These substituents may further be substituted. Any mixture of alkyl groups and cycloalkyl groups is usable. These substituents may be bonded to each other via covalent bonding. Further, the aromatic ring of phthalic acid may be substituted, and a polymer such as a dimer, a trimer, or a tetramer is usable. Still further, a part of a polymer may be substituted with a partial structure of a phthalic acid ester or a polymer may regularly be substituted therewith. Such a structure may be introduced into a part of the molecular structure of an additive such as an antioxidant, an acid scavenger, or a UV absorbent.

As other polycarboxylic acid ester-based plasticizers, specifically listed are alkylpolycarboxylic acid alkyl ester-based plasticizers such as tridodecyl tricarbalate or tributyl mesobutane-1,2,3,4-tetracarboxylate; alkylpolycarboxylic aid cycloalkyl ester-based plasticizers such as tricyclohexyl tricarbalate or tricyclopropyl 2-hydroxy-1,2,3-propanetricarboxylate; alkylpolycarboxylic acid aryl ester-based plasticizers such as triphenyl 2-hydroxy-1,2,3-propanetricarboxylate or tetra-3-methylphenyl tetrahydrofuran-2,3,4,5-tetracarboxylate; cycloalkylpolycarboxylic acid alkyl ester-based plasticizers such as tetrahexyl 1,2,3,4-cyclobutaneteracarboxylate or tetrabutyl 1,2,3,4-cyclopentanetetracarboxylate; cycloalkylpolycarboxylic cycloalkyl ester-based plasticizers such as tetracyclopropyl 1,2,3,4-cyclobutanetetracarboxylate or tricyclohexyl 1,3,5-cyclohexyltricarboxylate; cycloalkylpolycarboxylic acid aryl ester-based plasticizers such as triphenyl 1,3,5-cyclohexyltricarboxylate or hexa-4-methylphenyl 1,2,3,4,5,6-cyclohexylhexacarboxylate; arylpolycarboxylic acid alkyl ester-based plasticizers such as tridodecyl benznene-1,2,4-tricarboxylate or tetraoctyl benzene-1,2,4,5-tetracarboxylate; arylpolycarboxylic acid cycloalkyl ester-based plasticizers such as tricyclopentyl benzne-1,3,5-tricarboxylate or tetracyclohexyl benzene-1,2,3,5-tetracarboxylate; and arylpolycarboxylic acid aryl ester-based plasticizers such as triphenyl benzene-1,3,5-tetracarboxylate or hexa-4-methylphenyl benzene-1,2,3,4,5,6-hexacarboxylate. These alkoxy groups and cycloalkoxy groups may be the same or differ, and may further have one substituent. These substituents may further be substituted, Any mixture of alkyl groups and cycloalkyl groups is usable. These substituents may be bonded to each other via covalent bonding. Further, the aromatic ring of phthalic acid may be substituted, and a polymer such as a dimer, a trimer, or a tetramer is usable. Still further, a part of a polymer may be substituted with a partial structure of a phthalic acid ester or a polymer may regularly be substituted therewith. Such a structure may be introduced into a part of the molecular structure of an additive such as an antioxidant, an acid scavenger, or a UV absorbent.

Of these ester-based plasticizers containing polycarboxylic acids and monohydric alcohols, alkyldicarboxylic acid alkyl eaters are preferable. Specifically, dioctyl adipate described above is exemplified.

As other plasticizers preferably used in the present invention, polymer plasticizers are listed.

Such polymer plasticizers include, specifically, aliphatic hydrocarbon-based polymers, alicyclic hydrocarbon-based polymers, acrylic polymers such as polyethyl acrylate, polymethyl methacrylate, copolymers of methyl methacrylate and 2-hydroxyethyl methacrylate, or copolymers of methyl acrylate, methyl methacrylate, and 2-hydroxyethyl methacrylate; vinyl-based polymers such as polyvinyl isobutyl ether or poly(N-vinylpyrrolidone); styrene-based polymers such as polystyrene or poly(4-hydroxystyrene); polyesters such as polybutylene succinate, polyethylene terephthalate, or polyethylene naphthalate; polyethers such as polyethylene oxide or polypropylene oxide; polyamide; polyurethane; and polyurea. The number average molecular weight thereof is preferably 1000-500000, specifically preferably 5000-200000. These polymer plasticizers may be homopolymers containing one type of repeating unit or copolymers having plural repeating structures. Further, the polymers may be used in combinations of at least 2 types thereof.

The added amount of other plasticizers is commonly 0.1-50 parts by mass based on 100 parts by mass of a cellulose ester, preferably 1-30 parts by mass, more preferably 3-15 parts by mass.

In a cellulose ester film according to the present invention, as other plasticizers, ester-based plasticizers containing polyols and monocarboxylic acids or ester-based plasticizers containing polycarboxylic acids and monohydric alcohols are preferably contained at 1-25% by mass, and may be used together with appropriate plasticizers other than these.

In a cellulose ester film according to the present invention, as other plasticizers, ester-based plasticizers containing polyols and monocarboxylic acids are more preferable. Ester-based plasticizers containing alcohols of a valence of at least 3 and monocarboxylic acids are most preferable, since these plasticizers exhibit such characteristics that compatibility with a cellulose ester is excellent and addition can be performed at high added rate, whereby no bleeding out is generated even in combinations with other plasticizers or additives, resulting in easy combinations with other types of plasticizers or additives if appropriate.

Herein, a cellulose ester film according to the present invention produces adverse effects to optical applications when colored. Therefore, the degree of yellow (yellow index, YI) is preferably at most 3-0, more preferably at most 1.0. The degree of yellow can be determined based on JIS-K7103.

<<Matting Agents>>

Matting agents can be added in a cellulose ester film according to the present invention to provide slipping properties and optical and mechanical functions. As such matting agents, fine particles of inorganic compounds or fine particles of organic compounds are listed.

As the shapes of the matting agents, a spherical shape, a rod shape, an acicular shape, a layer shape, or a plate shape is preferably used. The matting agents include, for example, metal oxides such as silicon dioxide, titanium dioxide, aluminum oxide, zirconium oxide, calcium carbonate, kaolin, talc, fired calcium silicate, hydrated calcium silicate, aluminum silicate, magnesium silicate, or calcium phosphate; inorganic fine particles such as phosphoric acid salts, silicic acid salts, or carbonic acid salts; and cross-linked polymer fine particles. Of these, silicon dioxide is preferable due to a resulting decrease in film haze. These fine particles are preferably surface-treated to reduce the film haze.

Surface treatment is preferably carried out using halosilanes, alkoxysilanes, silazane, or siloxane. As the average particle diameter of fine particles increases, slipping effects are enhanced. On the other hand, as the average particle diameter decreases, the resulting transparency enhanced. Further, the average particle diameter of the primary particles of fine particles is in the range of 0.01-1.0 µm. The average particle diameter of the primary particles of the fine particles is preferably 5-50 nm, more preferably 7-14 nm. These fine particles are preferably used to produce unevenness of 0.01-1.0 µm on the cellulose ester film surface.

As silicon dioxide fine particles, listed are AEROSIL 200, 200V, 300, R972, R972V, R974, R202, R812, OX50, TT600, and NAXSO (produced by Nihon Aerosil Co., Ltd.); and KE-P10, KE-P30, KE-P100, and KE-P150 (produced by Nippon Shokubai Co., Ltd.). Of these, preferable are AEROSIL 200V and R972V, NAX 50, KE-P30, and KE-P100. These fine particles may be used in combinations of at least 2 types.

When combined, at least 2 types can be used by mixing at any appropriate ratio. Fine particles differing in average particle diameter and material, for example, AEROSIL 200V and R972V can be used in the range of a mass ratio of 0.1:99.9-99.9-0.1.

These matting agents are added via kneading as a preferable method. Further, in another method, matting agents having previously been dispersed in a solvent are mixed and dispersed with cellulose ester and/or plasticizers and/or antioxidants and/or UV absorbents, and then solids are obtained via evaporation of the solvent or precipitation for use in the production process of a cellulose ester melt, which is preferable from the viewpoint of uniform dispersion of the matting agents in the cellulose ester.

The above matting agents can be added to improve mechanical, electrical, and optical characteristics of the film.

Incidentally, as the added amount of these fine particles increases, slipping properties of the resulting film are enhanced, while haze increases. Therefore, the content thereof is preferably 0.001-5% by mass based on a cellulose ester, more preferably 0.005-1% by mass, still more preferably 0.01-0.5% by mass.

The haze value of a cellulose ester film according to the present invention is preferably less than 1.0%, but more preferably less than 0.5%, since adverse effects are produced as an optical material at a haze value of more than 1.0%. The haze value can be determined based on JIS-K7136.

Film constituent materials are required to have a minimal amount of volatile components or to generate no such components therefrom in the melt and film formation processes, which is to reduce or avoid defects inside the film or flatness degradation of the film surface due to bubbling during heat melting.

The content of volatile components of the film constituent materials when melted is at most 1% by mass, preferably at most 0.5%, still more preferably at most 0.2% by mass, and yet preferably at most 0.1% by mass. In the present invention, a differential thermogravimetric analyzer (TG/DTA200, produced by Seiko Instruments Inc.) is used to determine heat weight reduction from 30° C.-250° C. and then the obtained amount is designated as the content of the volatile components.

Volatile components, represented by the above moisture and the solvent, of film constituent components to be used are preferably eliminated before film formation or during heating. As an eliminating method, a well-known drying method is applicable and a method such as a heating method, a vacuum method, or a heating-vacuum method is employable. Any method thereof may be performed in air or under an ambience where nitrogen gas is selected as an inert gas. Any of these well-known methods is preferably carried out in the temperature range in which no film constituent materials are decomposed in view of the resulting quality of the film.

Generation of volatile components can be reduced by drying prior to film formation. A cellulose ester can singly be dried, or of the cellulose ester and film constituent materials, dividing into at least 1 kind of mixture or compatible substance other than the cellulose ester can be carried out to perform drying. Drying temperature is preferably at least 70° C. When a substance having glass transition point is present in materials to be dried, the materials tend to be fused and then handling difficulty may occur via heating to a drying temperature higher than the glass transition point. Therefore, the drying temperature is preferably at most the glass transition point. When plural substances have glass transition points, the lowest glass transition point is designated as the standard. The drying temperature is preferably 70° C.-(glass transition point-5)° C., more preferably 110° C.-(glass transition point-20)° C. Drying duration is preferably 0.5-24 hours, more preferably 1-18 hours, still more preferably 1.5-12 hours. When the drying temperature is excessively decreased, the elimination rate of volatile components is lowered, resulting also in excessively long drying duration. Further, the drying process may be divided into at least 2 stages. For example, the drying process may include a preliminary drying process to store materials and an immediately previous drying process carried out somewhere from just before to one week before film formation.

<<Melt Casting Method>>

The cellulose ester film of the present invention is preferably formed via a melt casting method. A melt casting forming method via heat melting with no solvent (e.g., methylene chloride) used in a solution casting method can further specifically be classified into a melt extrusion forming method, a press forming method, an inflation method, an injection forming method, a blow forming method, and a stretching forming method. Of these, a melt extrusion method is preferable in order to form a polarizing plate protective film exhibiting excellent mechanical strength and surface accuracy. In view of physical properties of an obtained cellulose ester film, melting temperature is preferably 120-280° C., more preferably 230-275° C., still more preferably 240-270° C., and most preferably 245-265° C.

Namely, a raw material cellulose ester formed into powders or pellets is subjected to hot air drying or vacuum drying, and then is heated and melted together with film constituent materials to express fluidity. Thereafter, the resulting melted mixture is extruded into a sheet through a T-die, and is brought into close contact with a cooling drum or an endless belt, for example, using an electrostatic application method for cooling-solidification to obtain an unstretched sheet. The temperature of the cooling drum is preferably kept at 90-150° C.

It is preferable that the film peeled from the cooling drum is re-heated and subjected to single step or multi-step stretching in the longitudinal direction using one or plural groups of rolls and/or a heating apparatus such as an infrared heater, followed by cooling. In this case, when the glass transition point of the film of the present invention is designated as Tg, the film is preferably heated at (Tg−30)-(Tg+100)° C., more preferably at (Tg−20)-(Tg+80)° C. and stretched either in the moving direction (the longitudinal direction: MD) or in the transverse direction (TD). It is preferable to carry out transverse stretching in the temperature range of (Tg−20)-(Tg+20)° C., followed by heat fixation. Further, after the stretching process, relaxation treatment is also preferably carried out.

The Tg of a cellulose ester film can be controlled based on the type and ratio of film constituent materials. In the use of the present invention, the Tg of the film is preferably at least 120° C., more preferably at least 135° C. The reason therefor is as follows. In cases in which the cellulose ester film of the present invention is used for a liquid crystal display device, when the Tg of the above film is less than the above temperature, the orientation state of molecules fixed in the film is adversely affected by effects of the used ambience temperature and backlight heat, resulting in a high possibility where the retardation value and the dimensional stability and shape as a film vary to a large extent. On the other hand, when the Tg of the film is excessively high, it is difficult to conduct production due to approaching the decomposition temperature of film constituent materials, whereby occurrence of volatile components or coloration may result via decomposition of materials themselves used in film formation. Therefore, the Tg is preferably at most 200° C., more preferably at most 170° C. In this case, the Tg of a film is determined based on the method described in JIS K7121.

In the case of transverse stretching (width direction: TD), it is preferable to carry out transverse stretching in a stretching zone divided into at least two zones while successively raising temperature in the range of temperature difference of 1-50° C., since the distribution of physical properties in the width direction is reduced. Further, after the transverse stretching, the resulting film is preferably kept in the range of at most the final transverse stretching temperature and at least Tg −40° C. for 0.01-5 minutes to allow the distribution of the physical properties in the width direction to be further reduced.

Heat fixation is carried out at the final transverse stretching temperature or higher and in the temperature range of at least Tg-20° C. commonly for 0.5-300 seconds. During this operation, heat fixation is preferably carried out in a zone divided into at least two while successively raising temperature in the range of temperature difference of 1-100° C.

A heat-fixed film is commonly coaled to Tg or lower, and is wound after the clip holding portions on both sides of the film are cut off. During the process, relaxation treatment is preferably carried out by 0.1-10% at the final heat fixation temperature or lower and in the temperature range of at least Tg in the transverse and/or longitudinal direction. Further, with regard to cooling, gradual cooling is preferably conducted from the final heat fixation temperature to Tg at a cooling rate of at most 100° C. per second. Methods to perform cooling and relaxation treatment are not specifically limited and any appropriate well-known methods can be employed. In view of enhancing the dimensional stability of the film, these treatments are preferably performed at a plurality of temperature ranges under successive cooling. Herein, the cooling rate refers to a value obtained based on (T1−T2)/t, provided that T1 represents the final heat fixation temperature and t represents the time required until the film temperature reaches T2 from the final heat fixation temperature.

More optimal conditions in heat fixation conditions, as well as cooling and relaxation conditions differ depending on the cellulose ester constituting a film. Therefore, physical properties of an obtained biaxially stretched film are determined and then these conditions may be determined via appropriate adjustments to provide preferable characteristics.

The stretching factor of a cellulose ester film is preferably 1.01-3.00 in the longitudinal and width directions, more preferably 1.01-2.50, and still more preferably 1.01-2.00. Thereby, a cellulose ester film exhibiting excellent optical isotropy and, simultaneously exhibiting excellent flatness can be produced. In the film forming process, such width holding or transverse stretching is preferably carried out using a tenter, which may be either a pin or a clip tenter.

Herein, in the case of production of a retardation film, the stretching factors in the longitudinal and width directions are allowed to differ and then stretching is carried out so that one of the stretching factors is larger than that of the other to obtain an optically anisotropic film. Herein, the ratio of the stretching factor in the width direction to that in the longitudinal direction is preferably 1.1-2.0, more preferably 1.1-1.5.

In cases in which the cellulose ester film of the present invention is used as a polarizing plate protective film, the thickness of the protective film is preferably 10-500 μm. Especially, the thickness is preferably 10-100 μm, more preferably 20-80 μm, specifically preferably 40-80 μm. When the thickness of the cellulose ester film is larger than the above range, for example, in the case of use as a polarizing plate protective film, a polarizing plate after polarizing plate processing becomes excessively thick, resulting in no suitability specifically with respect to thinness and reduced weight in notebook-type personal computers and mobile electronic devices. In contrast, it is unfavorable that the thickness is below the above range, since it becomes difficult to express retardation as a retardation film, and further, moisture permeability of the film increases, whereby the capability of protecting a polarizer from moisture decreases.

Incidentally, in a solution casting method, an increase in film thickness markedly increases drying load. However, in the present invention, a film of large film thickness can be produced with high productivity due to no requirement of any drying process. Thereby, an advantage is produced in which it is easier than before to increase film thickness based on intended purposes to provide required retardation and to realize moisture permeability reduction. Further, effects are produced in which even a film of small film thickness can be produced with high productivity by stretching such a thick film.

Further, the thickness variation of a cellulose ester film support is preferably in the range of ±3%, more preferably ±1%, still more preferably ±0.1%.

The width of the cellulose ester film of the present invention is preferably 1-4 m, specifically preferably 1.4-4 m.

Using a cellulose ester film in which at least 2 types of compounds differing in the number of hydroxyl groups represented by above Formula (1) of the present invention are used as plasticizers, an optical film exhibiting excellent flatness can be obtained, which therefore can be applied to a relatively wide cellulose ester film. Especially, a film of a width of 1.4-4 m is preferably used, but specifically preferably 1.4-2 m. The width exceeding 4 m results in conveyance problems.

Winding length is preferably 500-5000 m, more preferably 1000-5000 m. Further, knurling of a height of 0-25% with respect to the film thickness on both edges in the width direction is preferably carried out for winding.

In order to realize stable production of such an extremely long-length film, it is critical that no volatile components are blended in materials to be cast. The film forming temperature in a melt casting method markedly differs from that in a solution casting method. Therefore, when volatile components are present in materials to be cast, these additives are volatilized during film formation and adhere to the film forming apparatus, resulting in various troubles, which is unfavorable in view of realizing flatness and transparency of the film to utilize its functions as a film or a polarizing plate protective film. Especially, adhesion onto the die results in a factor of streaking on the film surface, whereby flatness degradation is occasionally induced. Therefore, when film constituent materials are subjected to film formation processing, from the viewpoint of avoiding the generation of volatile components during heat melting, it is unfavorable that components volatilizing at a lower range than the casting temperature for film formation exist.

As the above volatile components, listed are moisture absorbed into any of the film constituent materials, mixed gases such as oxygen or nitrogen, and solvents and impurities mixed prior to procurement of materials or during synthesis, as well as volatilized materials via evaporation, sublimation, or decomposition by heating. The solvents, described herein, differ from a solvent to prepare a solution of a resin for solution casting, being those contained in the film constituent materials in minute amounts. Therefore, the selection of film constituent materials is critical to avoid the generation of volatile components.

In the present invention, with regard to film constituent materials used for melt casting, volatile components as represented by the above moisture and solvents are preferably eliminated prior to film formation or during heating. As this eliminating method, a drying method is applicable, including a method such as a heating method, a vacuum method, or a heating-vacuum method. Drying may be carried out in air or under an ambience where an inert gas such as nitrogen or argon is selected. In these inert gases, the content of water or oxygen is preferably low and substantially no presence is preferable. Any of these well-known drying methods is preferably carried out in the temperature range in which no film constituent materials are decomposed, in view of film quality. For example, the residual moisture or solvents after elimination in the drying process are preferably allowed to be at 3% by mass or less based on the total mass of every film constituent material, more preferably at 1% by mass or less.

Especially, a cellulose ester resin having a moisture content of less than 0.5% by mass is preferably used. These characteristic values can be determined based on ASTM-D817-96. A cellulose ester further heat-treated for moisture reduction to 0.1-1000 ppm is preferably used.

Film constituent materials are dried prior to film formation to reduce the generation of volatile materials. A resin can singly be dried, or of the resin and film constituent materials, dividing into at least one kind of mixture or compatible substance other than the resin can be carried out to perform drying. Drying temperature is preferably at least 80° C. and also at most Tg's or the melting temperatures of materials to be dried. Also from the viewpoint of avoiding fusion among the materials, the drying temperature is more preferably 100–(Tg-5)° C., still more preferably 110–(Tg-20)° C. Drying duration is preferably 0.5-24 hours, more preferably 1-18 hours, and still more preferably 1.5-12 hours. When the drying temperature is below the ranges, the elimination rate of volatile materials decreases or an excessively long time is required for drying in some cases. Further, when any of the materials to be dried exhibits Tg, drying, in which the temperature is higher than the Tg, may result in difficulty in handling due to fusion among the materials. Drying is preferably carried out at atmospheric pressure or less. Especially, the drying is preferably conducted under reduced pressure ranging from vacuum-½ atmospheric pressure. Such drying is preferably carried out while materials such as a resin are appropriately stirred. To carry out required drying for a shorter time, a fluidized bed system is preferable in which in a drying container, drying is performed while dry air or nitrogen is fed from the bottom.

The drying process may be divided into at least 2 stages. For example, film formation may be carried out using materials which are stored in a preliminary drying process and subjected to immediately previous drying carried out somewhere from just before to one week before film formation.

The in-plane retardation value (Ro) and the retardation value (Rt) in the thickness direction of a cellulose ester film according to the present invention, in the case of use as a polarizer protective film, are preferably $0 \leq Ro$ and $Rt \leq 70$ nm, respectively, more preferably $0 \leq Ro \leq 30$ nm and $0 \leq Rt \leq 50$ nm, and still more preferably $0 \leq Ro \leq 10$ nm and $0 \leq Rt \leq 30$ nm. In the case of use as a retardation film, these values are preferably $30 \leq Ro \leq 100$ nm and $70 \leq Rt \leq 400$ nm, respectively, more preferably $35 \leq Ro \leq 65$ nm and $90 \leq Rt \leq 180$ nm. Further, Rt variation and distribution widths are preferably less than ±50%, more preferably less than ±30%, and still more preferably less than ±20%. The widths are further more preferably less than ±15%, yet preferably less than ±10%, yet more preferably less than ±5%, and specifically preferably less than ±1%. However, no Rt variation is most preferable.

Incidentally, retardation values Ro and Rt can be determined based on following Expressions.

$$Ro=(nx-ny)\times d$$

$$Rt=((nx-ny)/2-nz)\times d$$

wherein d (nm) represents the film thickness; and as refractive indexes, nx represents the maximum refractive index in the in-plane direction of the film, being also referred to as the refractive index in the delayed phase axis direction, ny represents the refractive index in the direction at right angles to the delayed phase axis on the film plane, and nz represents the refractive index of the film in the thickness direction.

Incidentally, such retardation values (Ro) and (Rt) can be determined using an automatic birefringence meter. These values can be determined, for example, using KOBRA-21ADH (produced by Oji Scientific Instruments Co.) at a wavelength of 590 nm under an ambience of 23° C. and 55% RH.

Further, the delayed phase axis preferably falls within ±1° in the width direction of the film or ±1° in the longitudinal direction, more preferably in ±0.7° in the width direction or in the longitudinal direction, and still more preferably within ±0.5° in the width direction or in the longitudinal direction.

Since no solvents are substantially used in the film forming process of the cellulose ester film of the present invention, the amounts of the residual organic solvents contained in the wound cellulose ester film after film formation is consistently less than 1% by mass. Thereby, a cellulose ester film exhibiting more stable flatness and Rt than heretofore can be provided. Especially, even in a wound film having a long length of 100 m or more, a cellulose ester film exhibiting stable flatness and Rt has been able to be provided. The winding length of the above cellulose ester film is not specifically limited and even 1500, 2500, and 5000 m rolls are preferably used.

The amount of the residual organic solvents can be determined via head space gas chromatography. Namely, a cellulose ester of a known amount is heated at 120° C. for 20 minutes in a tightly sealed container and then organic solvents contained in the gas phase in the tightly sealed container are quantitatively analyzed using a gas chromatograph. Based on the result, the residual organic solvent amount (%) can be calculated.

Further, in cases in which a film contains moisture, the amount (g) of the moisture contained in the cellulose ester film is determined using another method. Subsequently, the content (%) of the residual organic solvents can be determined, based on the value obtained by subtracting the mass (g) of the moisture from the mass difference (g) of the cellulose ester film between prior to and after the above heating treatment.

It is difficult to allow the amount (%) of residual organic solvents in a cellulose ester film produced via a solution casting method to be at most 0.1% by mass. For this purpose, a long drying process is required. However, according to the above method, a cellulose ester film having a markedly low content of residual organic solvents can be obtained inexpensively, and also a cellulose ester film exhibiting excellent characteristics as an optical film can be obtained.

Heat melting of film constituent materials results in marked decomposition reaction. Due to this decomposition reaction, coloration and deterioration occasionally occur. Further, this decomposition reaction also occasionally generates unfavorable volatile components at the same time.

Film constituent materials are stored as at least one pallet to prevent modification and moisture absorption of the materials. With this, a melt can be produced. Pelletization can enhance mixing properties and compatibility of the film constituent materials when melted and also contributes to achieve optical uniformity of the resulting film. Uniform mixing of constituent materials, other than a cellulose resin, with the above resin prior to melting makes it possible to contribute to provide uniformly melting properties during heat melting.

When the cellulose ester film of the present invention is used as a polarizing plate protective film which forms a polarizing plate in a liquid crystal display device, the polarizing plate on at least one side is preferably the polarizing plate of the present invention, and the polarizing plate of the present invention is preferably used on both sides.

Herein, as a conventional polarizing plate protective film, a cellulose ester film to be described later is used.

In the cellulose ester film of the present invention, to enhance display device quality and to provide various functions, other functional layers can also be arranged. For example, there may also be coated well-known functional layers such as an antistatic layer, a transparent electrically conductive layer, a hard coat layer, an anti-reflection layer, an anti-staining layer, a lubricating layer, an easily-adhesive layer, an anti-glare layer, or a gas barrier layer. Further, an optically anisotropic layer formed of a liquid crystal or polyimide can be coated. Optimal optical compensation can be made via combinations of a polarizing plate protective film with such an optically anisotropic layer. In this case, various surface treatments such as corona discharge treatment, plasma treatment, or chemical solution treatment can be carried out if appropriate.

Further, in the cellulose ester film of the present invention, a cellulose ester film in a multi-layered structure can be produced by co-extruding compositions containing cellulose ester resins differing in the concentrations of additives such as the aforementioned plasticizer, UV absorbent, and matting agent. For example, a cellulose ester film structured as a skin layer/core layer/skin layer can be produced. For example, it is possible to incorporate fine particles such as a matting agent in the skin layer at a larger amount or only in the skin layer. Further, a plasticizer and UV absorbent can be incorporated in the core layer at larger amounts than in the skin layer, or may be incorporated only in the core layer. Further, the types of plasticizer and UV absorbent can be changed in the core layer and in the skin layer. For example, it is possible to incorporate a law volatile plasticizer and/or UV absorbent in the skin layer, and to add a plasticizer exhibiting excellent plasticity or a. UV absorbent exhibiting high UV absorptivity in the core layer. The glass transition points of the skin layer and the core layer may differ, and the glass transition point of the core layer can be allowed to be lower than that of the skin layer. Further, the viscosity of a melt containing a cellulose ester may differ in the skin layer and the core layer during melt casting. The following relationship is acceptable: viscosity of the skin layer>viscosity of the core layer or viscosity of the core layer≧viscosity of the skin layer.

A long-length cellulose ester film of the present invention is produced via a melt casting method. Thereby, differing from a solution casting method, no solvents to be volatilized exist, whereby the melt casting method is an excellent technology in view of minimal dimensional changes. In the present invention, a long-length film is obtained by continuous stretching treatment of a film produced via melt casting.

When dimensional variation of a cellulose ester film is increased, the image quality of a liquid crystal display is degraded due to the variation of the optical axis of a polarizer over time. Therefore, when the dimension of the film having been allowed to stand at 23° C. and 55% RH for 24 hours is determined as a standard, the dimensional variation value of the film under an ambience of 80° C. and 90%. RH is preferably less than ±0.2%, more preferably less than ±0.1%, and still more preferably less than ±0.05%.

<<Polarizing Plate>>

When a cellulose ester film according to the present invention is used as a polarizing plate protective film, a production method of a polarizing plate is not specifically limited and any appropriate common method is usable. The rear side of the cellulose ester film of the present invention is subjected to alkali-saponification treatment, and then the thus-treated cellulose ester film is preferably bonded to at least one side of a polarizer, having been prepared by being immersed and stretched in an iodine solution, using an aqueous solution of a completely saponified polyvinyl alcohol. Also for the other side, either the cellulose ester film of the present invention or another polarizing plate protective film is usable. As the polarizing plate protective film used on the other side, instead of the cellulose ester film of the present invention, any appropriate commercially available cellulose ester film can be used. Such a commercially available cellulose ester film includes, for example, KC8UX2M, KC4UX, KC5UX, KC4UY, KC8UY, KC12UR, KC8UCR-3, KC8UCR-4, KC4FR-1, KC8UY-HA, and KC8UX-RHA (all produced by Konica Minolta Opto, Inc.). Alternatively, it is also preferable to use a polarizing plate protective film doubling as an optical compensating film having an optically anisotropic layer formed by orienting a liquid crystal compound such as a discotic liquid crystal, a rod-shaped liquid crystal, or a cholesteric liquid crystal. For example, such an optically anisotropic layer can be formed by the method described in JP-A No. 2003-98348. By combination thereof with the cellulose ester film of the present invention, a polarizing plate exhibiting excellent flatness and having a stable viewing angle enlarging effect can be obtained. Alternatively, a film of a cyclic olefin resin, an acrylic resin, a polyester resin, or a polycarbonate resin, other than a cellulose ester film, may be used as a polarizing plate protective film for the other side. Polarizing plate processing may be carried out via the easy adhesion processing described in JP-A No. 6-94915 or 6-118232, instead of the above alkali treatment.

In the polarizing plate of the present invention, on the surface of the opposite side to a polarizing plate protective film employing the cellulose ester film of the present invention when viewed from a polarizer, a polarizing plate protective film formed of a cellulose derivative is preferably used and a general TAC film is usable. The polarizing plate protective film located far from the liquid crystal cell can be provided with another functional layer in view of quality enhancement of the display device.

For example, usable is a film containing, as a component, a well-known functional layer for a display for the purpose of anti-reflection, anti-glare, abrasion resistance, dust adhesion prevention, or brightness enhancement; or adhesion thereof to the surface of the polarizing plate of the present invention is acceptable. However, there is no limitation thereto.

Generally, in a retardation film, a minimal variation of the above retardation Ro or Rt is required to realize stable optical characteristics. Especially, in a birefringence-mode liquid crystal display device, the variation of any of these occasionally results in a cause to induce image non-uniformity.

A long-length polarizing plate protective film produced via a melt casting film forming method based on the present invention is constituted mainly of a cellulose ester, whereby an alkali treatment process can be utilized by use of saponification specified for such a cellulose ester. Thereby, when a resin constituting a polarizer is polyvinyl alcohol, bonding to the polarizing plate protective film can be carried out using an aqueous solution of a completely saponified polyvinyl alcohol, similarly to a conventional polarizing plate protective film. Thereby, the present invention excels in applicability of a conventional polarizing plate processing method, specifically in obtaining a long-length roll polarizing plate.

A production effect produced by the present invention becomes further pronounced specifically in a long-length wound film of at least 100 m. As the film is elongated to 1500 m, 2500 m, and 5000 m, the production effect is more expressed.

For example, in production of a polarizing plate protective film, the roll length is 10-5000 m, preferably 50-4500 m in view of productivity and transportability. In this case, as the width of the film, the polarizer width or the width suitable for the production line can be selected. A film having a width of 0.5-4.0 m, preferably 0.6-3.0 m may be produced and wound as a roll for polarizing plate processing. Alternatively, a film having a width at least twice as large as the target is produced and wound as a roll, followed by being slit to obtain a roll of the targeted width, and then such a roll may be used for polarizing plate processing.

In production of a polarizing plate protective film, a functional layer such as an antistatic layer, a hard coat layer, a lubricating layer, an adhesive layer, an anti-glare layer, or a barrier layer may be coated prior to and/or after film stretching. In this case, various surface treatments such as corona discharge treatment, plasma treatment, or chemical solution treatment can be carried out if appropriate.

With regard to the dimensional stability of a cellulose ester film according to the present invention, the dimensional variation value at 80° C. and 90% RH is less than ±2.0%, preferably ±1.0%, more preferably ±0.5%, based on the film dimension left stand at 23° C. and 55% RH for 24 hours.

In cases in which a cellulose ester film according to the present invention is used as a retardation film for a polarizing plate, when the variation of the retardation film itself falls within the above range, the absolute value and the orientation angle of retardation as the polarizing plate does not deviate from the initial setting, which is preferable from the viewpoint of display quality.

A polarizer being a main component of a polarizing plate is an element passing only light of a polarized wave plane from a predetermined direction. A typical polarizer currently known is a polyvinyl alcohol-based polarizing film, which includes those prepared by dyeing a polyvinyl alcohol-based film with iodine and those dyed with a dichroic dye. As the polarizer, those prepared as described below are used a polyvinyl alcohol aqueous solution is subjected to film formation, and then the resulting film is uniaxially stretched and then dyed, or is dyed and then uniaxially stretched; and thereafter, durability treatment is preferably carried out using a boron compound. The film thickness of the polarizer is 5-40 µm, preferably 5-30 µm, specifically preferably 5-20 µm. A polarizing plate is formed by bonding one side of the cellulose ester film of the present invention to the surface of the polarizer. Bonding is preferably performed using a water based adhesive containing a completely saponified polyvinyl alcohol as the main component.

A polarizer is stretched in the uniaxial direction (commonly in the longitudinal direction). Accordingly, when being placed under a high temperature/humidity ambience, a polarizing plate contracts in the stretching direction (commonly in the longitudinal direction) and elongates in the direction at right angles to stretching (commonly in the width direction). As the film thickness of a polarizing plate protective film decreases, the elongation and contraction rate of a polarizing plate increases, and specifically, the magnitude of contraction of a polarizer increases in the stretching direction. Generally, a polarizer and a polarizing plate protective film are bonded together in such a manner that the stretching direction of the former coincides with the casting direction (the MD direction) of the latter. Therefore, in the case of realizing a thin polarizing plate protective film, it is critical to regulate the elongation and contraction rate specifically in the casting direction. The cellulose ester film of the present invention exhibits excellent dimensional stability, being, thereby, suitably used as such a polarizing plate protective film.

Namely, wavy unevenness does not increase even in a durability test under a 60° C. and 90% RH condition, and even a polarizing plate having an optical compensating film on the rear side can realize excellent visibility with no variation of viewing angle characteristics after the durability test.

A polarizing plate is constituted of a polarizer and a protective film to protect the both sides thereof and further can be constituted in such a manner that a protective film is bonded to one side of the polarizing plate and a separate film is bonded to the opposite side. The protective film and the separate film are used to protect a polarizing plate in shipping and product inspection of the polarizing plate. In this case, the protective film is bonded to protect the surface of the polarizing plate, and applied on one surface thereof opposite to the other surface bonded to a liquid crystal plate. Further, the separate film is used to cover an adhesive layer bonded to the liquid crystal plate, and applied on one surface side of the polarizing plate to be bonded to the liquid crystal cell.

<<Liquid Crystal Display Device>>

A polarizing plate provided with a polarizing plate protective film (including the case of doubling as a retardation film) using the cellulose ester film of the present invention can express enhanced display quality, compared to a common polarizing plate, being suitable for applications specifically to a multi-domain-type liquid crystal display device, more preferably to a multi-domain-type liquid crystal display with a birefringence mode (for example, also referred to as a MVA-type liquid crystal display device) and a lateral electric field switching mode-type liquid crystal display device (also referred to as an IPS mode-type liquid crystal display device).

By using the polarizing plate of the present invention for liquid crystal display devices, a wide variety of liquid crystal display devices exhibiting excellent visibility can be produced. A polarizing plate employing the cellulose ester film of the present invention can be used for liquid crystal display devices with various drive modes such as STN, TN, OCB, HAN, VA (MVA and PVA), IPS, and OCB, preferably for a VA (MVA and PVA)-type liquid crystal display device and an IPS mode-type liquid crystal display device. Especially, even with regard to a large-size liquid crystal display device with a display of 30 diagonal inches or more, there can be obtained a liquid crystal display device exhibiting a minimal variation in the usage environment, reduced light leakage, and excellent visibility with respect to color non-uniformity and front contrast.

In a liquid crystal display device employing a polarizing plate provided with a retardation film, when the cellulose ester film of the present invention is a retardation film, a sheet of the polarizing plate is arranged for a liquid crystal cell or two sheets thereof are arranged on both sides of the crystal cell. In this case, the polarizing plate protective film side applied to constitute the polarizing plate is used so as to face the side of the liquid crystal cell of a liquid crystal display device, which, thereby, can contribute to enhance display quality. A polarizing plate employing the cellulose ester film of the present invention in such a constitution can optically compensate a liquid crystal cell, and can provide a liquid crystal display device exhibiting enhanced display quality and excellent viewing angle characteristics.

<<Anti-Reflection>>

The cellulose ester film of the present invention also preferably serves as an anti-reflection film by providing a hard coat layer and an anti-reflection layer on the surface.

As the hard coat layer, an actinic radiation curable resin layer or a heat curable resin layer is preferably used. The hard coat layer may be provided directly on the support or on another layer such as an antistatic layer or a subbing layer.

When an actinic radiation curable resin layer is provided as a hard coat layer, an actinic radiation curable resin, capable of being cured via exposure to radiation such as UV radiation, is preferably contained.

In view of optical design, the refractive index of the hard coat layer is preferably in the range of 1.45-1.65. Further, from the viewpoint of providing the anti-reflection film with adequate durability and impact resistance, as well as from the viewpoint of appropriate flexibility and economics during production, the film thickness of the hard coat layer is preferably in the range of 1 μm-20 μm, more preferably 1 μm-10 μm.

The actinic radiation curable resin layer refers to a layer containing, as a main component, a resin cured via crosslinking reaction by being exposed to actinic radiation such as UV radiation or electron beams ("actinic radiation" in the present invention is defined to include all electromagnetic waves such as electron beams, neutron beams, X-rays, alpha rays, UV radiation, visible light, or infrared radiation). As typical examples of such an actinic radiation curable resin, a UV radiation curable resin and an electron beam curable resin are cited. However, a resin may optionally be employed which can be cured via exposure to radiation other than UV radiation and electron beams. As the UV radiation curable resin, there can be listed, for example, a UV radiation curable acrylic urethane-based resin, a UV radiation curable polyester acrylate-based resin, a UV radiation curable epoxy acrylate-based resin, a UV radiation curable polyol acrylate-based resin, and a UV radiation curable epoxy resin.

There can be listed a UV radiation curable acrylic urethane-based resin, a UV radiation curable polyester acrylate-based resin, a UV radiation curable epoxy acrylate-based resin, a UV radiation curable polyol acrylate-based resin, and a UV radiation curable epoxy resin.

Further, a photoreaction initiator and a photosensitizer can also be contained. Specifically, there can be listed acetophenone, benzophenone, hydroxybenzophenone, Michler's ketone, α-amyloxim ester, and thioxanthone, as well as derivatives thereof. When a photoreaction agent is used in the synthesis of an epoxy acrylate-based resin, it is optionally possible to use a sensitizer such as n-butylamine, triethylamine, or tri-n-butylphosphine. The content of a photoreaction initiator or photosensitizer contained in a UV radiation curable resin composition is preferably 2.5-6% by mass based on the composition except volatilized solvent components after coating and drying.

Resin monomers include, for example, as a monomer having one unsaturated double bond, a common monomer such as methyl acrylate, ethyl acrylate, butyl acrylate, vinyl acetate, benzyl acrylate, cyclohexyl acrylate, or styrene. Further, there can be listed, as a monomer having at least two unsaturated double bonds, ethylene glycol diacrylate, propylene glycol diacrylate, divinylbenzene, 1,4-cyclohexane diacrylate, and 1,4-cyclohexyldimethyl diacrylate, as well as trimethylolpropane triacrylate and pentaerythritol tetraacrylate as described above.

Further, a UV absorbent may be contained in a UV radiation curable resin composition to the extent that actinic radiation curing of the UV radiation curable resin composition is not hindered. As the UV absorbent, a similar UV absorbent usable for the substrate can be used.

To enhance heat resistance of a cured layer, a selected antioxidant which does not inhibit actinic radiation curing reaction can be used. For example, there can be listed a hindered phenol derivative, a thiopropionic acid derivative, and a phosphite derivative. Specific examples include, for example, 4,4'-thiobis(6-t-3-methylphenol), 4,4'-butylidenebis(6-t-butyl-3-methylphenol), 1,3,5-tris(3,5-di-t-butyl-4-hydroxybenzyl)isocyanurate, 2,4,6-tris(3,5-di-t-butyl-4-hydroxybenzyl)mesitylene, and di-octadecyl-4-hydroxy-3,5-di-t-butylbenzyl phosphate.

As the UV radiation curable resin, there can be suitably selected and used, for example, ADEKA OPTOMER KR and BY Series such as KR-400, KR-410, KR-550, KR-566, KR-567, or BY-320B (all produced by Asahi Denka Kogyo Co., Ltd.); KOEIHARD such as A-101-KK, A-101-WS, C-302, C-4,0-N, C-501, M-101, M-102, T-102, D-102, NS-101, FT-102Q8, MAG-1-P20, AG-106, or M-101-C (all produced by Koei Chemical Co., Ltd.); SEIKABEAM such as PHC2210(S), PHCX-9(K-3), PHC2213, DP-10, DP-20, DP-30, P1000, P1100, P1200, P1300, PI400, P1500, P1600, or SCR900 (all produced by Dainichi Seika Industry Co., Ltd.); KRM7033, KRM7039, KRM7130, KRM7131, UVE-CRYL29201, and UVECRY129202 (all produced by Daicel UCH Co., Ltd.); RC-5015, RC-5016, RC-5020, RC-5031, RC-5100, RC-5102, RC-5120, RC-5122, RC-5152, RC-5171, RC-5180, and RC-5181 (all produced by DIC Corp.); ORLEX No. 340 CLEAR (produced by Chugoku Marine Paints, Ltd.); SUNRAD H-601 (produced by Sanyo Chemical Industries, Ltd.); SP-1509 and SP-1507 (produced by Showa Hipolymer Co., Ltd.); RCC-15C (produced by Grace Japan K.K.); and ARONIX M-6100, M-8030, and M-8060 (all produced by Toagosei Co., Ltd.), as well as any other commercially available products.

In a coating composition of an actinic radiation curable resin layer, the solid concentration is preferably from 10-95% by mass, and a suitable concentration is selected depending on the coating method.

As a radiation source to form a cured layer via actinic radiation curing reaction of an actinic radiation curable resin, any radiation source which generates DV radiation can be used. Specifically, the radiation sources described in the above radiation item can be used. Exposure conditions vary depending on each of the lamps. However, the exposure amount is preferably in the range of 20 mJ/cm$^2$-10000 mJ/cm$^2$, more preferably 50 mJ/cm$^2$-2000 mJ/cm$^2$. From the near ultraviolet region to the visible region, it is possible to use a sensitizer exhibiting the maximum absorption in the region.

A solvent which is used during coating of an actinic radiation curable resin layer is appropriately selected and used, for example, from hydrocarbons (toluene and xylene); alcohols (methanol, ethanol, isopropanol, butanol, and cyclohexanol); ketones (acetone, methyl ethyl ketone, and methyl isobutyl ketone); ketone alcohols (diacetone alcohol); esters (methyl acetate, ethyl acetate, and methyl lactate); glycol ethers, and other organic solvents. Appropriate mixtures thereof can also be used. There is preferably used an appropriate organic solvent, described above, containing propylene glycol monoalkyl ether (the alkyl group has a carbon atom number of 1-4) or propylene glycol monoalkyl ether acetate (the alkyl group has a carbon atom number of 1-4) preferably in an amount of at least 5% by mass, more preferably 5-80% by mass.

As a coating method of an actinic radiation curable resin composition coating liquid, usable are methods known in the art employing coaters such as a gravure coater, a spinner coater, a wire bar coater, a roll coater, a reverse coater, an extrusion coater, or an air-doctor coater. The coated amount is, in terms of the wet film thickness, appropriately 0.1 μm-30 μm, preferably from 0.5 μm-15 μm. The coating rate is preferably in the range of 10 m/minute-60 m/minute.

The actinic radiation curable resin composition is coated and then dried, followed by being exposed to UV radiation. The exposure time is preferably 0.5 second-5 minutes, more preferably 3 seconds-2 minutes from the viewpoint of the curing efficiency of a UV radiation curable resin as well as operation efficiency.

Thus, a cured coating layer can be obtained. To impart anti-glare properties to the surface of a liquid crystal display panel, as well as to prevent adhesion to other substances and to enhance abrasion resistance, inorganic or organic fine particles can also be added in a coating composition for a cured coating layer.

For example, the inorganic fine particles include those containing silicon oxide, zirconium oxide, titanium oxide, aluminum oxide, tin oxide, zinc oxide, calcium carbonate, barium sulfate, talc, kaolin, or calcium sulfate.

Further, the organic fine particles include polymethacrylic acid methyl acrylate resin powder, acrylic styrene resin powder, polymethyl methacrylate resin powder, silicone resin powder, polystyrene resin powder, polycarbonate resin powder, benzoguanamine resin powder, melamine resin powder, polyolefin resin powder, polyester resin powder, polyamide resin powder, polyimide resin powder, or fluorinated ethylene resin powder. These particles can be used via addition to a UV radiation curable resin composition. The average particle diameter of any of these fine particle powders is 0.01 μm-10 μm. The amount used by blending is preferably from 0.1 part by mass-20 parts by mass based on 100 parts by mass of the UV radiation curable resin composition. In order to provide anti-glare properties, fine practices of an average particle diameter of 0.1 μm-1 μm are preferably used in an amount of 1 part by mass-15 parts by mass based on 100 parts by mass of the ultraviolet radiation curable resin composition.

By adding such fine particles in a UV radiation curable resin, an anti-glare layer can be formed which exhibits preferable unevenness of center line average surface roughness Ra of 0.05 μm-0.5 μm. Further, when these fine particles are not added in a UV radiation curable resin composition, a hard coat layer can be formed which has an excellent smooth surface of center line average surface roughness Ra of less than 0.05 μm, more preferably from 0.002 μm-less than 0.04 μm.

In addition thereto, as a substance to produce a blocking prevention function, it is also possible to use submicron particles of a volume average particle diameter of 0.005 μm-0.1 μm, which are the same component as described above, in an amount of 0.1 part by mass-5 parts by mass based on 100 parts by mass of the resin composition.

An anti-reflection layer is provided on the above hard coat layer. The arrangement method is not specifically limited. A coating method, a sputtering method, a deposition method, a CVD (chemical vapor deposition) method, and an atmospheric pressure plasma method may be used individually or in combination. In the present invention, a coating method is specifically preferably used to provide the anti-reflection layer.

As methods to form the anti-reflection layer by coating, there can be listed a method in which metal oxide powder is dispersed in a binder resin dissolved in a solvent, followed by coating and drying; a method in which a polymer having a cross-linked structure is uses as a binder resin; and a method in which an ethylenically unsaturated monomer and a photopolymerization initiator are incorporated and then a layer is formed via exposure to actinic radiation.

In the present invention, an anti-reflection layer can be arranged on a cellulose ester film provided with a UV radiation curable resin layer. To decrease reflectance, it is preferable to form a low refractive index layer on the uppermost layer of an optical film and to form a metal oxide layer therebetween which is a high refractive index layer, and further to provide a medium refractive index layer (a metal oxide layer whose refractive index has been adjusted by varying the metal oxide content, the ratio to a resin binder, or the type of metal) between the optical film and the high refractive index layer. The refractive index of the high refractive index layer is preferably 1.55-2.30, more preferably 1.57-2.20. The refractive index of the medium refractive index layer is adjusted to be an intermediate value between the refractive index (approximately 1.5) of a cellulose ester film serving as a substrate and the refractive index of the high refractive index layer. The refractive index of the medium refractive index layer is preferably 1.55-1.80. The thickness of each layer is preferably 5 nm-0.5 µm, more preferably from 10 nm-0.3 µm, most preferably from 30 nm-0.2 µm. The haze of the metal oxide layer is preferably at most 5%, more preferably at most 3%, most preferably at most 1%. The strength of the metal oxide layer is preferably at least 3H, most preferably at least 4H in terms of pencil hardness when a load of 1 kg is applied. When the metal oxide layer is formed by coating, inorganic fine particles and a binder polymer are preferably contained therein.

The medium and high refractive index layers in the present invention are preferably layers, featuring refractive indexes of 1.55-2.5, formed in such a manner that coating liquids containing monomers or oligomers of organic titanium compounds represented by Formula (F) described below, or hydrolyzed products thereof are coated and then dried.

    Formula (F)

wherein $R_{81}$ is an aliphatic hydrocarbon group having a carbon number of 1-8, preferably an aliphatic hydrocarbon group having a carbon number of 1-4. Further, a monomer or oligomer of the organic titanium compound or a hydrolyzed product thereof results in formation of a cured layer in which the alkoxide group thereof undergoes hydrolysis to create a cross-linked structure via reaction such as —Ti—O—Ti.

As preferable examples of a monomer and an oligomer of an organic titanium compound used in the present invention, there are cited a dimer—a decamer of $Ti(OCH_3)_4$, $Ti(OC_2H_5)_4$, $Ti(O-n-C_3H_7)_4$, $Ti(O-i-C_3H_7)_4$, $Ti(O-n-C_4H_9)_4$, or $Ti(O-n-C_3H_7)_4$, and a dimer—a decamer of $Ti(O-n-C_3H_7)_4$, as well as a dimer—a decamer of $Ti(O-n-C_4H_9)_4$. These may be used individually or in combinations of at least 2 types. Of these, a dimer—a decamer of $Ti(O-n-C_3H_7)_4$, $Ti(O-i-C_3H_7)_4$, $Ti(O-n-C_4H_9)_4$, or $Ti(O-n-C_3H_7)_4$ and a dimer—a decamer of $Ti(O-n-C_4H_9)_4$ are specifically preferable.

In the present invention, coating liquids for the medium and high refractive index layers are preferably prepared via addition of the above organic titanium compound into a solution to which water and an organic solvent, as described later, have been added in this sequential order. When water is added later, hydrolysis/polymerization does not progress uniformly, whereby cloudiness is generated or layer strength is decreased in some cases. After adding water and the organic solvent, it is preferable to carry out stirring and mixing dissolution for good mixing.

Further, an alternative method is employable as a preferred embodiment in which an organic titanium compound and an organic solvent are mixed, and then the resulting mixed solution is added to the above solution having been prepared by stirring the mixture of water and an organic solvent.

Herein, the amount of water is preferably in the range of 0.25-3 mol per mol of the organic titanium compound. When this amount is less than 0.25 mol, hydrolysis and polymerization insufficiently progress, resulting in lowered layer strength in some cases. In the case of more than 3 mol, hydrolysis and polymerization are excessively carried out, and then coarse $TiO_2$ particles are occasionally formed, resulting in cloudiness in some cases. Therefore, the amount of water is preferably regulated in the above range.

Further, the content of water is preferably less than 10% by mass based on the total coating liquid amount. When the content of water is at least 10% by mass based on the total coating liquid amount, cloudiness may occur since the stability of the coating liquid is decreased over time.

An organic solvent used in the present invention is preferably a water-miscible one. Such a water-miscible organic solvent includes, for example, alcohols (e.g., methanol, ethanol, propanol, isopropanol, butanol, isobutanol, secondary butanol, tertiary butanol, pentanol, hexanol, cyclohexanol, and benzyl alcohol; polyols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thioglycol); polyol ethers (e.g., ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether, and propylene glycol monophenyl ether); amines (e.g., ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine); amides (e.g., formamide, N,N-dimethylformamide and N,N-dimethylacetamide); heterocycles (e.g., 2-pyrrolidone, N-methyl-2-pyrrolidone, cyclohexylpyrrolidone, 2-oxazolidone, 1,3-dimethyl-2-imidazolidinone); sulfoxides (e.g., dimethylsulfoxide); and sulfones (e.g., sulfolane); as well as urea, acetonitrile, and acetone. Of these, alcohols, polyols, and polyol ethers are specifically preferable. As described above, the amount of any of these organic solvents used needs only to be adjusted so that the content of water is less than 10% by mass based on the total coating liquid amount by controlling the total used amount of the water and the organic solvent.

The content of a monomer or oligomer of an organic titanium compound or a hydrolyzed product thereof used in the present invention, when used individually, is preferably 50.0% by mass-98.0% by mass based on the solids contained in the coating liquid. The solid ratio is preferably 50% by mass-90% by mass, more preferably from 55% by mass-90% by mass. In addition, it is also preferable to add, to a coating composition, a polymer of an organic titanium compound (herein the organic titanium compound has been previously hydrolyzed, followed by cross-linking) or titanium oxide fine particles.

The high refractive index layer and the medium refractive index layer of the present invention may contain metal oxide particles as fine particles and further may contain a binder polymer.

When a hydrolyzed/polymerized organic titanium compound and metal oxide particles are combined in the above coating liquid preparation method, the hydrolyzed/polymerized organic titanium compound and the metal oxide particles are allowed to tightly adhere together, whereby it is possible to realize a durable coating layer provided with hardness resulting from the particles together with flexibility of a uniform layer.

The refractive index of metal oxide particles used in the high refractive index layer and the medium refractive index layer is preferably 1.80-2.80, more preferably 1.90-2.80. The primary particle average diameter of the metal oxide particles is preferably 1-150 nm, more preferably 1-100 nm, most preferably 1-80 nm. The average diameter of the metal oxide particles in the layer is preferably 1-200 nm, more preferably 5-150 nm, still more preferably 10-100 nm, most preferably 10-80 nm. The average particle diameter of the metal oxide particles can be determined, for example, by measuring the longest diameters of 200 particles randomly selected via observation using a scanning electron microscope. The specific surface area of the metal oxide particles is as a value determined via the BET method, preferably 10-400 m$^2$/g, more preferably 20-200 m$^2$/g, most preferably 30-150 m$^2$/g.

Examples of the metal oxide particles include metal oxides having at least one element selected from Ti, Zr, Sn, Sb, Cu, Fe, Mn, Pb, Cd, As, Cr, Hg, Zn, Al, Mg, Si, P, and S. Specifically, there are listed titanium dioxide (for example, rutile, rutile/anatase mixed crystal, anatase, and an amorphous structured one), tin oxide, indium oxide, zinc oxide, and zirconium oxide. Of these, titanium oxide, tin oxide, and indium oxide are specifically preferable. The metal oxide particles contain an oxide of any of the above metals as a main component and further other elements may be contained. The main component refers to a component whose content (% by mass) is the maximum of the particle composing components. Examples of these other elements include Ti, Zr, Sn, Sb, Cu, Fe, Mn, Pb, Cd, As, Cr, Hg, Zn, Al, Mg, Si, P, and S.

The metal oxide particles are preferably subjected to surface treatment. It is possible to conduct the surface treatment using an inorganic or organic compound. As examples of an inorganic compound used for the surface treatment, there are cited alumina, silica, zirconium oxide, and iron oxide. Of these, alumina and silica are preferable. Examples of an organic compound used for the surface treatment include polyols, alkanolamines, stearic acid, silane coupling agents, and titanate coupling agents. Of these, silane coupling agents are most preferable.

Specific examples of silane coupling agents include methyltrimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ (β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane, and β-cyanoethyltriethoxysilane.

Further, examples of silane coupling agents having an alkyl group of 2-substitution with respect to silicon include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, and methylvinyldiethoxysilne.

Of these, preferable are vinyltrimethoxysilane, vinyltriethoxysilane, vinylacetoxysilane, vinyltrimethoxyethoxysilane, γ-acryloyloxypropylmethoxysilane, and γ-methacryloyloxypropylmethoxysilane any of which has a double bond in the molecule, as well as γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, methylvinyldimethoxysilane, and methylvinyldiethoxysilane any of which has an alkyl group of 2-substitution with respect to silicon. Of these, there are specifically preferable γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane, and γ-methacryloyloxypropylmethyldiethoxysilane.

At least 2 types of coupling agents may simultaneously be used. In addition to the above silane coupling agents, other silane coupling agents may be used. These other silane coupling agents include alkyl esters of ortho-silicic acid (for example, methyl orthosilicate, ethyl orthosilicate, n-propyl orthosilicate, i-propyl orthosilicate, n-butyl orthosilicate, sec-butyl orthosilicate, and t-butyl orthosilicate) and hydrolyzed products thereof.

Surface treatment using a coupling agent can be carried out in such a manner that a coupling agent is added to a fine particle dispersion, and then the resulting dispersion is allowed to stand at room temperature-60° C. for several hours-10 days. To promote the surface treatment reaction, there may be added, to the above dispersion, an inorganic acid (for example, sulfuric acid, hydrochloric acid, nitric acid, chromic acid, hypochlorous acid, boric acid, orthosilicic acid, phosphoric acid, and carbonic acid) and an organic acid (for example, acetic acid, polyacrylic acid, benzenesulfonic acid, phenol, and polyglutamic acid), or a salt thereof (for example, a metal salt and an ammonium salt).

Such a silane coupling agent is preferably hydrolyzed using a required amount of water in advance. In a state where the silane coupling agent has been hydrolyzed, the above organic titanium compound and the surface of metal oxide particles are allowed to be more reactive, whereby a further durable film is formed. A hydrolyzed silane coupling agent is also preferably added in a coating liquid in advance. It is possible to use the water, having been used for this hydrolysis, in hydrolysis/polymerization of an organic titanium compound.

In the present invention, treatment may be carried out by combining at least 2 types of surface treatments. The shape of metal oxide particles is preferably rice grain-shaped, spherical, cubic, spindle-shaped, or irregular. At least 2 types of metal oxide particles may be used in the high refractive index layer and in the medium refractive index layer at the same time.

The content ratios of metal oxide particles in the high refractive index and the medium refractive index layer are preferably 5-90% by mass, more preferably 10-85% by mass, and still more preferably 20-80% by mass. When fine particles are contained, the ratio of a monomer or oligomer of the above organic titanium compound or a hydrolyzed product thereof is, based on the solids contained in the coating liquid, from 1-50% by mass, preferably 1-40% by mass, more preferably 1-30% by mass.

The above metal oxide particles in the form of being dispersed in a medium are fed to coating liquids to form a high refractive index layer and a medium refractive index layer. As a dispersion medium of metal oxide particles, a liquid featuring a boiling point of 60-170° C. is preferably used. Specific examples of the dispersion medium include water, alcohols (for example, methanol, ethanol, isopropanol, butanol, and benzyl alcohol), ketones (for example, acetone, methyl ethyl ketone, methyl isobutyl ketone, and cyclohexanone), esters (for example, methyl acetate, ethyl acetate, propyl acetate, butyl acetate, methyl formate, ethyl formate, propyl formate, and butyl formate), aliphatic hydrocarbons (for example, hexane and cyclohexanone), halogenated hydrocarbons (for example, methylene chloride, chloroform, and carbon tetrachloride), aromatic hydrocarbons (for example, benzene, toluene, and xylene), amides (for example, dimethylformamide, dimethylacetamide, and n-methylpyrrolidone), ethers (for example, diethyl ether, dioxane, and tetrahydrofuran), and ether alcohols (for example, 1-methoxy-2-propanol). Of these, specifically preferable are toluene, xylene, methyl ethyl ketone, methyl isobutyl ketone, cyclohexane, and butanol.

Further, metal oxide particles can be dispersed in a medium using a homogenizer. Examples of the homogenizer include a sand grinder mill (for example, a bead mill with pins), a high speed impeller mill, a pebble mill, a roller mill, an attritor, and a colloid mill. Of these, the sand grinder and the high speed impeller mill are specifically preferable. Preliminary dispersion treatment may optionally be conducted. Examples of appropriate homogenizers used for the preliminary dispersion treatment include a ball mill, a three-roll mill, a kneader, and an extruder.

A polymer featuring a cross-linked structure (hereinafter also referred to as a cross-linked polymer) is preferably used as a binder polymer in the high refractive index and the medium refractive index layer of the present invention. Examples of the cross-linked polymer include cross-linked products of a polymer having a saturated hydrocarbon chain such as polyolefin (hereinafter referred to as polyolefin), polyether, polyurea, polyurethane, polyester, polyamine, polyamide, or a melamine resin. Of these, cross-linked products of polyolefin, polyether, and polyurethane are preferable. Cross-linked products of polyolefin and polyether are more preferable, but cross-linked products of polyolefin are most preferable. Further, a cross-linked polymer having an anionic group is more preferable. The anionic group functions to maintain a dispersion state of inorganic fine particles, and the cross-linked structure exhibits a function to strengthen a film by imparting film-forming ability to a polymer. The above anionic group may directly bond to a polymer chain or may bond to a polymer chain via a linking group. However, the anionic group preferably bonds, as a side chain, to the main chain via a linking group.

Examples of the anionic group include a carboxylic acid group (carboxyl), a sulfonic acid group (sulfa), and phosphoric acid group (phosphono). Of these, a sulfonic acid group and a phosphoric acid group are preferable. Herein, the anionic group may be in a salt form. A cation which forms a salt with the anionic group is preferably an alkali metal ion. Further, protons of the anionic group may be dissociated. The linking group which bonds the anionic group to a polymer chain is preferably a divalent group selected from —CO—, —O—, an alkylene group, and an arylene group, as well as combinations thereof. A cross-linked polymer which is a preferable binder polymer is preferably a copolymer having a repeating unit having an anionic group and also a repeating unit having a cross-linked structure. In this case, the ratio of the repeating unit having an anionic group in a copolymer is preferably 2-96% by mass, more preferably 4-94% by mass, most preferably from 6-92% by mass. The repeating unit may have at least two anionic groups.

In a cross-linked polymer having an anionic group, another repeating unit (a repeating unit having neither an anionic group nor a cross-linked structure) may be contained. As another repeating unit, preferable are a repeating unit having an amino group or a quaternary ammonium group and a repeating unit having a benzene ring. The amino group or the quaternary ammonium group functions to maintain a dispersion state of inorganic fine particles, similarly to the above anionic group. The benzene ring functions to enhance the refractive index of the high refractive index layer. Incidentally, even when the amino group, quaternary ammonium group or benzene ring is contained in the repeating unit having an anionic group or a cross-linked structure, similar effects are produced.

In a cross-linked polymer containing, as a constituent unit, the repeating unit having an amino group or a quaternary ammonium group, the amino group or the quaternary ammonium group may directly bond to a polymer chain or may bond to a polymer chain as a side chain via a linking group. However, the latter is preferable. The amino group or the quaternary ammonium group is preferably a secondary amino group, a tertiary amino group, or a quaternary ammonium group, more preferably a tertiary amino group or a quaternary ammonium group. A group bonding to the nitrogen atom of the secondary amino group, the tertiary amino group, or the quaternary ammonium group is preferably an alkyl group, more preferably an alkyl group having 1-12 carbons, still more preferably an alkyl group having 1-6 carbons. The counter ion of the quaternary ammonium group is preferably a halide ion. The linking group which bonds the amino group or the quaternary ammonium group to a polymer chain is preferably a divalent group selected from —CO—, —NH—, —O—, an alkylene group, and an arylene group, as well as combinations thereof. When the cross-linked polymer contains a repeating unit having an amino group or a quaternary ammonium group, the ratio is preferably 0.06-32% by mass, more preferably 0.08-30% by mass, most preferably 0.1-28% by mass.

Cross-linked polymers are preferably produced via polymerization reaction during or after coating of coating liquids, in which the coating liquids are prepared for the high refractive index and the medium refractive index layer by blending monomers to form cross-linked polymers. Each layer is formed along with the production of the cross-linked polymers. A monomer having an anionic group functions as a dispersing agent for inorganic fine particles in a coating liquid. The used amount of the monomer having an anionic group is, based on the inorganic fine particles, preferably 1-50% by mass, more preferably 5-40% by mass, still more preferably 10-30% by mass. A monomer having an amino group or a quaternary ammonium group also functions as a dispersing aid in the coating liquid. The used amount of the monomer having an amino group or a quaternary ammonium group is preferably 3-33% by mass based on the monomer having an anionic group. These monomers can be allowed to effectively function prior to coating of a coating liquid via a method in which a cross-linked polymer is produced during or after coating of the coating liquid.

Monomers used in the present invention are most preferably those having at least two ethylenically unsaturated groups. Examples thereof include esters of polyols with (meth)acrylic acid (for example, ethylene glycol di(meth) acrylate, 1,4-cyclohexane diacrylate, pentaerythritol tetra (meth)acrylate, pentaerythritol tri(meth)acrylate, trimethylolpropane tri(meth)acrylate, trimethylolethane tri(meth) acrylate, dipentaerythritol tetra(meth)acrylate, dipentaerythritol penia(meth)acrylate, pentaerythritol hexa (meth)acrylate, 1,2,3-cyclohexane tetramethacrylate, polyurethane polyacrylate, and polyester polyacrylate); vinylbenzne and derivatives thereof (for example, 1,4-divinylbenzene, 4-vinylbenzoic acid-2-acryloylethyl ester, and 1,4-divinylcyclohexane); vinylsulfones (for example, divinylsulfone); acrylamides (for example, methylenebisacrylamide); and methacrylamides. Commercially available monomers having an anionic group and monomers having an amino group or a quaternary ammonium group may be used. The commercially available monomers having an anionic group preferably used include KAYAMAR PM-21 and PM-2 (produced by Nihon Kayaku Co., Ltd.); ANTOX MS-60, MS-2N, and MS-X144 (produced by Nippon Nyukazai Co., Ltd.); ARONIX M-5000, M-6000, and M-8000 Series (produced by Toagosei Co., Ltd.); BISCOAT #2000 Series (produced by Osaka Organic Chemical Industry Ltd.); NEW FRONTIER GX-8289 (produced by Dai-ichi Kogyo Seiyaku Co., Ltd.); NK ESTER CB-1 and A-SA (produced by Shin-Nakamura Chemical Co., Ltd.); and AR-100, MR-100, and MR-200 (produced by Daihachi Chemical Industry Co., Ltd.). Further, the commercially available monomers having an amino group or a quaternary ammonium group preferably used include DMAA (produced by Osaka Organic Chemical Industry Ltd.); DMAEA and DMAPAA (produced by Kohjin Co., Ltd.); BLENMER QA (produced by NOF Corp.); and NEW FRONTIER C-1615 (produced by Daiichi Kogyo Seiyaku Co., Ltd.).

It is possible to conduct polymerization reaction of a polymer via photopolymerization reaction or thermal polymerization reaction. The photopolymerization reaction is specifically preferable. A polymerization initiator is preferably used for the polymerization reaction. The polymerization initiator includes, for example, a thermal polymerization initiator and a photopolymerization initiator, described later, which are used to form a binder polymer for a hard coat layer.

Commercially available polymerization initiators may be used as the polymerization initiator. In addition to the polymerization initiator, an appropriate polymerization promoter may optionally be used. The amounts of the polymerization initiator and the polymerization promoter used are preferably in the range of 0.2-10% by mass based on the total amount of the monomers. Polymerization of a monomer (or an oligomer) may be promoted by heating a coating liquid (an inorganic fine particle dispersion containing a monomer). Further, by heating after the photopolymerization reaction conducted after coating, heat curing reaction for the formed polymer may be carried out as an additional treatment.

Relatively high refractive index polymers are preferably used for the medium refractive index and the high refractive index layer. Examples of such polymers exhibiting a high refractive index include polystyrene, styrene copolymers, polycarbonates, melamine resins, phenol resins, epoxy resins, and polyurethanes obtained via reaction of cyclic (alicyclic or aromatic) isocyanates with polyols. It is also possible to use polymers having another cyclic (aromatic, heterocyclic, or alicyclic) group and polymers having a halogen atom other than fluorine as a substituent, since a high refractive index is expressed thereby.

A low refractive index layer usable in the present invention includes a low refractive index layer formed by crosslinking of a fluorine-containing resin (hereinafter also referred to as "fluorine-containing resin prior to crosslinking") which undergoes crosslinking by heat or ionizing radiation; a low refractive index layer formed via a sol-gel method; and a low refractive index layer, formed with fine particles and a binder polymer, having voids among the fine particles or in the interior of the fine particles. A low refractive index layer applicable to the present invention is preferably one formed mainly with fine particles and a binder polymer. Especially, the low refractive index layer having voids in the interior of the particles (also called the hollow fine particles) is preferable, since refractive index can be lowered further. However, a decrease in the refractive index of the low refractive index layer is preferable due to an improvement of anti-reflection performance, which, however, makes it difficult to provide strength to the low refractive index layer. In view of the balance therebetween, the refractive index of the low refractive index layer is preferably at most 1.45, more preferably 1.30-1.50, still more preferably 1.35-1.49, specifically preferably 1.35-1.45.

Further, preparation methods of the low refractive index layer may appropriately be combined.

Preferable fluorine-containing resins prior to coating include fluorine-containing copolymers formed with fluorine-containing vinyl monomers and crosslinkable group-providing monomers. Specific examples of the fluorine-containing vinyl monomer units include fluoroolefins (for example, fluoroethylene, vinylidene fluoride, tetrafluoroethylene, hexafluoroethylene, hexafluoropropylene, and perfluoro-2,2-dimethyl-1,3-dioxol); partially- or completely-fluorinated alkyl ester derivatives of (meth)acrylic acid (for example, BISCOAT 6PM (produced by Osaka Organic Chemical Industry Ltd.) and M-2020 (produced by Daikin Industries, Ltd.)); and completely- or partially-fluorinated vinyl ethers. The crosslinkable group-providing monomers include vinyl monomers previously having a crosslinkable functional group in the molecule such as glycidyl methacrylate, vinyltrimethoxysilane, γ-methacryloyloxypropyltrimethoxysilane, or vinyl glycidyl ether, as well as vinyl monomers having a carboxyl group, a hydroxyl group, an amino group, or a sulfonic acid group (for example, (meth)acrylic acid, methylol (meth)acrylate, hydroxyalkyl (meth)acrylate, allyl acrylate, hydroxyalkyl vinyl ether, and hydroxyalkyl allyl ether). JP-A Nos. 10-25388 and 10-147739 describe that a cross-linked structure can be introduced into the latter by adding, after copolymerization, a group reactive to the functional group in the polymer, as well as a compound having at least another reactive group. Examples of the crosslinkable group include an acryloyl, a methacryloyl, an isocyanate, an epoxy, an aziridine, an oxazoline, an aldehyde, a carbonyl, a hydrazine, a carboxyl, a methylol, and an active methylene group. A fluorine-containing copolymer subjected to thermal crosslinking in the presence of a thermally-reactive crosslinking group or in combination of an ethylenically unsaturated group with a thermally radical generating agent or of an epoxy group with a thermally acid generating agent is a heat curable type. In contrast, when crosslinking is performed via exposure to radiation (preferably UV radiation or electron beams) in combination of an ethylenically unsaturated group with a photo-radical generating agent or of an epoxy group with a photolytically acid generating agent, the copolymer is an ionizing radiation curable type.

Further, in addition to the above monomers, as the fluorine-containing resin prior to coating, there may be used a fluorine-containing copolymer formed in combination of a fluorine-containing vinyl monomer with a monomer other than a crosslinkable group-providing monomer. Monomers usable in combination are not specifically limited, including, for examples, olefins (ethylene, propylene, isoprene, vinyl chloride, and vinylidene chloride); acrylates (methyl acrylate, ethyl acrylate, 2-ethylhexyl acrylate); methacrylates (methyl methacrylate, ethyl methacrylate, butyl methacrylate, and ethylene glycol dimethacrylate); styrene derivatives (styrene, divinylbenzene, vinyltoluene, and α-methylstyrene); vinyl ethers (methyl vinyl ether); vinyl esters (vinyl acetate, vinyl propionate, and vinyl cinnamate); acrylamides (N-tert-butylacrylamide and N-cyclohexylacrylamide); methacrylamides; and acrylonitrile derivatives. Further, to provide lubricating properties and anti-staining properties, a polyorganosiloxane skeleton or a perfluoropolyether skeleton is also preferably introduced into a fluorine-containing copolymer. This introduction can be carried out, for example, via polymerization of the above monomer with a polyorganosiloxane or perfluoropolyether having, at a terminal, an acryl group, a methacryl group, a vinyl ether group, or a styryl group; via polymerization of the polymer with a polyorganosiloxane or perfluoropolyether having a radical generating group at a terminal; or via reaction of a fluorine-containing copolymer with a polyorganosiloxane or perfluoropolyether having a functional group.

The ratio of each monomer used to form the fluorine-containing copolymer prior to coating is described below. The ratio of a fluorine-containing vinyl monomer is preferably 20-70 mol %, more preferably 40-70 mol %; the ratio of a crosslinkable group-providing monomer is preferably 1-20 mol %, more preferably 5-20 mol %; and the ratio of the other monomers used together is preferably 10-70 mol %, more preferably 10-50 mol %.

The fluorine-containing copolymer can be obtained by polymerizing these monomers via a method such as a solution polymerization method, a block polymerization method, an emulsion polymerization method, or a suspension polymerization method in the presence of a radical polymerization initiator.

Fluorine-containing resins prior to coating are commercially available and employable. Examples of the fluorine-containing resins prior to coating available on the market include SAITOP (produced by Asahi Glass Co., Ltd.), TEFLON (a registered trade name) AF (produced by E.I. du Pont de Nemours and Company), polyvinylidene fluoride, RUMIFRON (produced by Asahi Glass Co., Ltd.), and OPSTAR (produced by JSR Corp.).

The dynamic friction coefficient and the contact angle to water of the low refractive index layer containing a cross-linked fluorine-containing resin are in the range of 0.03-0.15 and 90-120 degrees, respectively.

The low refractive index layer containing a cross-linked fluorine-containing resin preferably contains inorganic fine particles described later from the viewpoint of adjusting refractive index. Further, the inorganic fine particles are preferably used after being surface-treated. Surface treatment methods include physical surface treatment such as plasma discharge treatment or corona discharge treatment, as well as chemical surface treatment employing a coupling agent. However, a coupling agent is preferably employed. As such a coupling agent, an organoalkoxy metal compound (for example, a titanium coupling agent and a silane coupling agent) is preferably used. In cases in which inorganic fine particles contain silica, silane coupling agent-treatment is specifically effective.

Further, various types of sol-gel materials can also preferably be used as a material for the low refractive index layer. As such sol-gel materials, usable are metal alcoholates (alcoholates of silane, titanium, aluminum, or zirconium), organoalkoxy metal compounds, and hydrolysis products thereof. Specifically, alkoxysilanes, organoalkoxysilanes, and hydrolysis products thereof are preferable. Examples thereof include tetraalkoxysilanes (such as tetramethoxysilane or tetraethoxysilane), alkyltrialkoxysilanes (such as methyltrimethoxysilane or ethyltrimethoxysilane), aryltrialkoxysilanes (such as phenyltrimethoxysilane), dialkyldialkoxysilanes, and diaryldialkoxysilanes. Further, there are also preferably used organoalkoxysilanes having various types of functional groups (such as vinyltrialkoxysilanes, methylvinyldialkoxysilanes, γ-glycidyloxypropyltrialkoxysilanes, γ-glycidyloxypropylmethyldialkoxysilanes, β-(3,4-epoxydicyclohexyl)ethyltrialkoxysilanes, γ-methacryloyloxypropyltrialkoxysilanes, γ-aminopropyltrialkoxysilanes, γ-mercaptopropyltrialkoxysilanes, or γ-chloropropyltrialkoxysilanes); and perfluoroalkyl group-containing silane compounds (for example, (heptadecafluoro-1,1,2,2-tetradecyl)triethoxysilane, 3,3,3-trifluoropropyltrimethoxysilane). Especially, fluorine-containing silane compounds are preferably used from the viewpoint of decreasing the refractive index of the layer and of providing water repellency and oil repellency.

As a low refractive index layer, there is preferably used a layer in which inorganic or organic fine particles are used to form micro-voids among the fine particles or in the interior of the fine particles. The average particle diameter of the fine particles is preferably 0.5-200 nm, more preferably 1-100 nm, still more preferably 3-70 nm, most preferably 5-40 nm. Further, the particle diameter of the fine particles is preferably as uniform (monodispersed) as possible.

Inorganic fine particles are preferably noncrystalline. The inorganic fine particles preferably contain metal oxides, metal nitrides, metal sulfides, or metal halides, more preferably metal oxides or metal halides, but most preferably metal oxides or metal fluorides. As metal atoms, preferable are Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, and Ni. Of these, Mg, Ca, B, and Si are more preferable. Inorganic compounds containing 2 types of metals may also be used. Specific examples of preferable inorganic compounds include $SiO_2$ or $MgF_2$, but $SiO_2$ is specifically preferable.

Particles having microvoids in the interior of inorganic fine particles can be formed, for example, by allowing silica molecules which form the particles to be cross-linked. When silica molecules are subjected to crosslinking, the resulting volume is reduced, resulting in porous particles. It is possible to directly synthesize microvoid-containing (porous) inorganic fine particles as a dispersion via a sol-gel method (described in JP-A Nos. 53-112732 and Examined Japanese Patent Application Publication No. 57-9051) or a deposition method (described in Applied Optics, Volume 27, page 3356 (1988)). Alternatively, such dispersion can also be obtained by mechanically pulverizing powder prepared via a drying/precipitation method. Commercially available porous inorganic fine particles (for example, $SiO_2$ sol) may be used.

In order to form a low refractive index layer, these inorganic fine particles are preferably used in such a state as dispersed in an appropriate medium. As a dispersion medium, preferable are water, alcohol (for example, methanol, ethanol, and isopropyl alcohol), and ketone (for example, methyl ethyl ketone and methyl isobutyl ketone).

Organic fine particles are preferably non-crystalline. These organic fine particles are also preferably polymer fine particles which are synthesized via polymerization reaction (for example, an emulsion polymerization method) of a monomer. A polymer of organic fine particles preferably contains fluorine atoms. The ratio of the fluorine atoms in the polymer is preferably 35-80% by mass, more preferably 45-75% by mass. Further, microvoids are also preferably formed in such organic fine particle, for example, by allowing a particle-forming polymer to be cross-linked to result in a reduced volume. To allow a particle-forming polymer to be cross-linked, a multifunctional monomer preferably accounts for at least 20 mol % based on a monomer used to synthesize the polymer. The ratio of the multifunctional monomer is more preferably 30-80 mol %, most preferably 35-50 mol %. As monomers used to synthesize the organic fine particles, examples of fluorine-containing monomers used to synthesize the fluorine-containing polymers include fluoroolefins (for example, fluoroethylene, vinylidene fluoride, tetrafluoroethylene, hexafluoropropylene, and perfluoro-2,2-dimethyl-1,3-dioxol), fluorinated alkyl esters of acrylic acid or methacrylic acid, and fluorinated vinyl ethers. Copolymers of monomers with and without fluorine atoms may be used. Examples of the monomers without fluorine atoms include olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, and butyl methacrylate), styrenes (for example, styrene, vinyltoluene, and α-methylstyrene), vinyl ethers (for example, methyl vinyl ether), vinyl esters (for example, vinyl acetate and vinyl propionate), acrylamides (for example, N-tert-butylacrylamide and N-cyclohexylacrylamide), methacrylamides, and acrylonitriles. Examples of the multifunctional monomers include dienes (for example, butadiene and pentadiene), esters of polyols with acrylic acid (for example, ethylene glycol diacrylate, 1,4-cyclohexane diacrylate, and dipentaerythritol hexaacrylate), esters of polyols with methacrylic acid (for example, ethylene glycol dimethacrylate, 1,2,4-cyclohexane tetramethacrylate, and pentaerythritol tetramethacrylate), divinyl compounds (for example, divinylcyclohexane and 1,4-divinylbenzene), divinylsulfone, bisacrylamides (for example, methylenebisacrylamide), and bismethacrylamides.

Microvoids among particles can be formed by piling at least two fine particles. Incidentally, when spherical fine particles of an equal diameter (being completely monodispersed) are close-packed, microvoids of a 26% void ratio by volume are formed among the fine particles. When spherical fine particles of an equal diameter are subjected to simple cubic packing, microvoids of a 48% void ratio by volume are formed among the fine particles. In a low refractive index layer practically used, the void ratio significantly shifts from the theoretical value due to distribution of the particle diameters of the fine particles or the presence of microvoids in the interior of the particles. The refractive index of the low refractive index layer decreases as the void ratio increases. When microvoids are formed by piling fine particles, the size of the microvoids among the particles can easily be controlled to an appropriate value (a value minimizing scattering light, resulting in no problem in the strength of the low refractive index layer) by controlling the particle diameter of the fine particles. Further, by controlling the diameter of the fine particles to be uniform, an optically uniform low refractive index layer, also featuring the uniform size of microvoids among the particles, can be realized. Herewith, the resulting low refractive index layer is controlled to be optically or macroscopically a uniform layer, though being microscopically a microvoid-containing porous layer. Microvoids among particles are preferably confined in the low refractive index layer by fine particles and a polymer. The confined voids also exhibit an advantage such that light scattering on the surface of the low refractive index layer is reduced, compared to unconfined voids.

By forming microvoids, the macroscopic refractive index of a low refractive index layer becomes lower than the sum total of the refractive indexes of the components constituting the low refractive index layer. The refractive index of a layer is the sum total of the refractive indexes per volume of layer constituent elements. The refractive indexes of components such as fine particles or polymers of the low refractive index lay are larger than 1, while the refractive index of air is 1.00. Therefore, by forming microvoids, a low refractive index layer exhibiting a significantly lower refractive index can be realized.

Further, in the present invention, an embodiment is also preferable in which hollow fine particles of $SiO_2$ are used.

Hollow fine particles referred to in the present invention refer to particles which have a particle wall, the interior of which is hollow. Exemplified are particles formed in such a manner that the above $SiO_2$ particles having microvoids in the interior of the particles are further surface-coated with an organic silicon compound (alkoxysilanes such as tetraethoxysilane) to close their pore inlets. Alternatively, the voids in the interior of the wall of the particles may be filled with a solvent or gas. For example, in the case of air, the refractive index of hollow fine particles can remarkably be lowered (to a refractive index of 1.44-1.34), compared to common silica (refractive index: 1.46), Via addition of such hollow fine particles of $SiO_2$, the refractive index of the low refractive index layer can further be lowered.

Preparation methods of allowing particles having microvoids in the above inorganic fine particles to be hollow may be based on the methods described in JP-A Nos. 2001-167637 and 2001-233611. Commercially available hollow fine particles of $SiO_2$ can optionally be used in the present invention. As these commercially available hollow fine particles, P-4 (produced by Catalysts & Chemicals Ind. Co., Ltd.) is specifically exemplified.

A low refractive index layer preferably contains a polymer in an amount of 5-50% by mass. Such a polymer functions to allow fine particles to adhere and to maintain a structure of the low refractive index layer having voids. The amount of the polymer used is controlled so that the strength of the low refractive index layer can be maintained without filling voids. The amount of the polymer is preferably 10-30% by mass based on the total amount of the low refractive index layer. To realize adhesion of fine particles using a polymer, it is preferable that (1) a polymer be allowed to bond to a surface treatment agent for fine particles; (2) a polymer shell be allowed to be formed around a fine particle serving as a core; or (3) a polymer be used as a binder among fine particles. The polymer which is bonded to a surface treatment agent in (1) is preferably a shell polymer of (2) or a binder polymer of (3). The polymer of (2) is preferably formed around fine particles via polymerization reaction prior to preparation of a low refractive index layer coating liquid. The polymer of (3) is preferably formed in such a manner that a monomer is added to a low refractive index layer coating liquid, followed by polymerization reaction during or after coating of the low refractive index layer. At least two of (1), (2), and (3) or all thereof are preferably employed in appropriate combinations. Of these, performance in combination of (1) and (3) or of all of (1), (2), and (3) is specifically preferable. Each of (1) Surface Treatment, (2) Shell, and (3) Binder will now sequentially be described.

(1) Surface Treatment

Fine particles (specifically, inorganic fine particles) are preferably surface-treated to improve affinity with a polymer. The surface treatment is classified into physical surface treatment such as plasma discharge treatment or corona discharge treatment and chemical surface treatment using a coupling agent. The chemical surface treatment is preferably conducted alone, or the physical surface treatment and the chemical surface treatment are also preferably performed in combination. As the coupling agent, an organoalkoxymetal compound (for example, a titanium coupling agent and a silane coupling agent) is preferably used. When fine particles contain $SiO_2$, surface treatment using a silane coupling agent can specifically effectively be carried out. As specific examples of the silane coupling agent, those described above are preferably used.

Surface treatment using a coupling agent can be carried out in such a manner that a coupling agent is added to a fine particle dispersion and the resulting dispersion is allowed to stand at a temperature of room temperature-60° C. for a period of several hours-10 days.

To accelerate the surface treatment reaction, there may be added, to the dispersion, an inorganic acid (for example, sulfuric acid, hydrochloric acid, nitric acid, chromic acid, hypochloric acid, boric acid, orthosilicic acid, phosphoric acid, and carbonic acid), an organic acid (for example, acetic acid, polyacrylic acid, benzenesulfonic acid, phenol, and polyglutamic acid), or a salt thereof (for example, a metal salt and an ammonium salt).

(2) Shell

Shell forming polymers are preferably polymers having a saturated hydrocarbon as the main chain. Polymers containing fluorine atoms in the main chain or side chains are preferable, but the polymers containing fluorine atoms in side chains are more preferable. Polyacrylates or polymethacrylates are preferable, but esters of fluorine-substituted alcohols with polyacrylic acid or polymethacrylic acid are most preferable. The refractive index of a shell polymer decreases, as the content of fluorine atoms therein increases. To lower the refractive index of a low refractive index layer, a shell polymer preferably contains fluorine atoms in an amount of 35-80% by mass, more preferably 45-75% by mass. A fluorine atom-containing polymer is preferably synthesized via polymerization reaction of a fluorine atom-containing ethylenically unsaturated monomer. Examples of such a fluorine atom-containing ethylenically unsaturated monomer include fluoroolefins (for example, fluoroethylene, vinylidene fluoride, tetrafluoroethylene, hexafluoropropylene, perfluoro-2, 2-dimethyl-1,3-dioxol), fluorinated vinyl ethers, and esters of fluorine substituted alcohols with acrylic acid or methacrylic acid.

A shell forming polymer may be a copolymer having repeating units with and without fluorine atoms. The repeating unit without fluorine atoms is preferably prepared via polymerization reaction of an ethylenically unsaturated monomer containing no fluorine atoms. Examples of the ethylenically unsaturated monomer containing no fluorine atoms include olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, butyl methacrylate, and ethylene glycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-tert-butylacrylamide and N-cyclohexylacrylamide), methacrylamides, and acrylonitrile.

When a binder polymer to be described in (3) later is used in combination, a crosslinkable functional group may be introduced into a shell polymer to allow the shell polymer and the binder polymer to chemically bind together via crosslinking. The shell polymer may be crystalline. When the glass transition point (Tg) of the shell polymer is higher than the temperature during formation of a low refractive index layer, microvoids in the low refractive index layer are easily maintained. However, when the Tg is higher than the temperature during formation of the low refractive index layer, fine particles are not fused, whereby the resulting low refractive index layer may not be formed as a continuous layer (resulting in a decrease in strength). In this case, it is desirable that the low refractive index layer be formed as a continuous layer, simultaneously using a binder polymer described in (3) below. A polymer shell is formed around the fine particle, resulting in a core/shell fine particle. A core containing an inorganic fine particle is preferably incorporated in the core/shell fine particle at 5-90% by volume, more preferably 15-80% by volume. At least 2 types of core/shell fine particles may simultaneously be used. Further, an inorganic fine particle containing no shell and a core/shell particle may be used at the same time.

(3) Binder

A binder polymer is preferably a polymer having a saturated hydrocarbon or a polyether as the main chain, but is more preferably a polymer having a saturated hydrocarbon as the main chain. The binder polymer is preferably cross-linked. The polymer having a saturated hydrocarbon as the main chain is preferably prepared via polymerization reaction of an ethylenically unsaturated monomer. To prepare a cross-linked binder polymer, a monomer having at least two ethylenically unsaturated groups is preferably used. Examples of the monomer having at least two ethylenically unsaturated groups include esters of polyols with (meth)acrylic acid (for example, ethylene glycol di(meth)acrylate, 1,4-dicyclohexane diacrylate, pentaerythritol tetra(meth)acrylate, pentaerythritol (meth)acrylate, trimethylolpropane tri(meth)acrylate, trimethylolethane tri(meth)acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides. A polymer having a polyether as the main chain is preferably synthesized via ring-opening polymerization reaction of a multifunctional epoxy compound. A cross-linked structure may be introduced into a binder polymer via reaction of a crosslinkable group instead of or in addition to a monomer having at least two ethylenically unsaturated groups. Examples of the crosslinkable functional group include an isocyanate group, an epoxy group, an aziridine group, an oxazoline group, an aldehyde group, a carbonyl group, a hydrazine group, a carboxyl group, a methylol group, and an active methylene group. As a monomer to introduce a crosslinked structure, there can also be used vinylsulfonic acid, acid anhydrides, cyanoacrylate derivatives, melamine, etherified methylol, esters and urethane. There may be used a functional group such as a block isocyanate group, which exhibits crosslinking properties resulting from decomposition reaction thereof. Further, the crosslinkable group is not limited to the above compounds, including those which become reactive as a result of decomposition of the above functional group. As a polymerization initiator used for polymerization reaction and crosslinking reaction of a binder polymer, a thermal polymerization initiator or a photopolymerization initiator is used, but the photopolymerization initiator is preferable. Examples of the photopolymerization initiator include acetophenones, benzoins, benzophenones, phosphine oxides, ketals, antharaquinones, thioxanthones, azo compounds, peroxides, 2,3-dialkyldione compounds, disulfide compounds, fluoroamine compounds, and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophene, and 2-benzyl-2-dimethylamino-1-(4-morpholinophenyl)-butanone. Examples of the benzoins include benzoin methyl ether, benzoin ethyl ether, and benzoin ethylisopropyl ether. Examples of the benzophenones include benzophenone, 2,4-dichlorobenzophenone, 4,4-dichlorobenzophenone, and p-chlorobenzophenone. Examples of the phosphine oxides include 2,4,6-trimethylbenzoyldiphenylphosphine oxide.

The binder polymer is preferably formed in such a manner that a monomer is added to a low refractive index layer coating liquid, followed by polymerization reaction (and further crosslinking reaction, if appropriate) during or after coating of the low refractive index layer. A small amount of a polymer (for example, polyvinyl alcohol, polyoxyethylene, polymethyl methacrylate, polymethyl acrylate, diacetyl cellulose, triacetyl cellulose, nitrocellulose, polyester, and alkyd resins) may be added to the low refractive index layer coating liquid.

Further, a slipping agent is preferably added to the low refractive index layer of the present invention or other refractive index layers. Abrasion resistance can be improved by providing appropriate slipping properties. As such a slipping agent, silicone oil or a waxy substance is preferably used. For example, compounds represented by following Formula (G) are preferable.

  Formula (G)

wherein $R_{91}$ represents a saturated or unsaturated aliphatic hydrocarbon group having a carbon atom number of at least 12. An alkyl group or an alkenyl group is preferable, but an alkyl group or an alkenyl group having a carbon atom number of at least 16 is more preferable. $R_{92}$ represents —OM1 group (M1 represents an alkali metal such as Na or K), —OH group, —$NH_2$ group, or —$OR_{93}$ group ($R_{93}$ represents a saturated or unsaturated aliphatic hydrocarbon group having a carbon atom number of at least 12 but preferably represents an alkyl group or an alkenyl group). $R_{92}$ is preferably —OH group, —$NH_2$ group or —$OR_{93}$ group. Specifically, there can also preferably be used higher fatty acids or derivatives thereof such as behenic acid, stearic acid amide, or pentacosanoic acid, as well as natural products, containing a large amount of such components, such as carnauba wax, beeswax, or montan wax. Further, there can be exemplified polyorganosiloxane disclosed in Examined Japanese Patent Application Publication No. 53-292; higher fatty acid amides disclosed in U.S. Pat. No. 4,275,146 specification; higher fatty acid esters (esters of a fatty acid having a carbon atom number of 10-24 and alcohol having a carbon atom number of 10-24) disclosed in Examined Japanese Patent Application Publication No. 58-33541, British Patent No. 927,446 specification, or JP-A Nos. 55-126238 and 58-90633; higher fatty acid metal salts disclosed in U.S. Pat. No. 3,933,516 specification; polyester compounds containing a dicarboxylic acid having a carbon atom number of at most 10 and an aliphatic or alicyclic diol disclosed in JP-A No. 51-37217; and oligopolyesters containing a dicarboxylic acid and a diol disclosed in JP-A No. 7-13292.

For example, the added amount of a slipping agent used in a low refractive index layer is preferably 0.01 mg/m$^2$-10 mg/m$^2$.

There may be added, to each of the layers of an antireflection film or coating liquids therefor, a polymerization inhibitor, a leveling agent, a thickener, an anti-coloring agent, a UV absorbent, a silane coupling agent, an antistatic agent, or an adhesion providing agent, in addition to a metal oxide particle, a polymer, a dispersion medium, a polymerization initiator, or a polymerization promoter.

Each of the layers of the antireflection film can be formed via a coating method such as a dip coating method, an air-knife coating method, a curtain coating method, a roller coating method, a wire bar coating method, a gravure coating method, or an extrusion coating method (U.S. Pat. No. 2,681,294). At least two layers may be simultaneously coated. Simultaneous coating methods are described in U.S. Pat. Nos. 2,761,791, 2,941,898, 3,508,947, and 3,526,528; and Yuji Harazaki, Coating Kogaku (Coating Engineering), page 253, Asakura Shoten (1973).

In the present invention, in the production of an anti-reflection film, drying is carried out preferably at 60° C. or higher, more preferably at 80° C. or higher, after coating the above-prepared coating liquid on a support. Further, drying is conducted preferably at a dew point of 20° C. or lower, more preferably at a dew point of 15° C. or lower. Drying is preferably initiated within 10 seconds after coating on the support. Combinations with the above conditions result in a preferable production method to produce the effects of the present invention.

EXAMPLES

The present invention will now specifically be described with reference to Examples that by no means limit the scope of the present invention.

Example 1

Production of Cellulose Ester Film Sample 1

As described below, using a cellulose ester and various additives, cellulose ester film sample 1 of the present invention was produced via melt casting.

| | |
|---|---|
| Cellulose ester C-1 | standard |
| Exemplified compound A-1 | 4.0% by mass |
| Exemplified compound A-2 | 3.0% by mass |
| Exemplified compound A-3 | 1.0% by mass |
| IRGANOX1010 (produced by Ciba Japan K.K.) | 0.50% by mass |
| GSY-P101 (produced by Sakai Chemical Industry Co., Ltd.) | 0.25% by mass |
| SumilizerGS (produced by Sumitomo Chemical Co., Ltd.) | 0.25% by mass |
| TINUVIN928 (produced by Ciba Japan K.K.) | 1.5% by mass |

Cellulose ester C-1 was dried at 130° C. for 4 hours under reduced pressure and then cooled to room temperature. Thereafter, the above additives and 0.2% by mass of AEROSIL NAX50 (produced by Nihon Aerosil Co., LTD.) serving as silica particles, as well as 0.02% by mass of KE-P100 (produced by Nippon Shokubai Co., Ltd.) were mixed. The resulting mixture was placed in a hopper of 60° C., and then extruded from a die using a biaxial kneading extruder equipped with a vacuum exhaust unit under a condition of a die temperature of 230° C., a screw rotation number of 300 rpm, a kneading time of 40 seconds, and an extrusion amount of 200 kg/hour, followed by solidification in water of 20° C. and slitting to obtain a columnar pellet of a diameter of 2 mm and a length of 3 mm. The thus-slit pellet was dried using hot air of 65° C.

Next, a schematic flow sheet showing one embodiment of an apparatus to carry out the method for producing a cellulose ester film of the present invention is shown in FIG. 1, and then using FIG. 1, the production method is described below.

The thus-produced pellet was dried at 100° C. for 4 hours, heat-melted under an ambience of nitrogen at 250° C., and then extruded from T-shaped casting die 4 on first cooling roll 5, followed by being pressed between first cooling roll 5 and touch roll 6 for formation. Thereafter, the resulting product was passed through second cooling roll 7 and third cooling roll 8 and then stretching was carried out at 160° C. at a longitudinal and transverse stretching ratio of 1.2×1.2. Thus, cellulose ester film sample 1 of a film thickness of 80 μm was obtained.

[Production of Cellulose Ester Film Samples 2-44]

Cellulose ester film samples of 2-34 of the present invention and comparative cellulose ester film samples of 35-44 were produced in the same manner as in production of cellulose ester film sample 1 except that in production of cellulose ester film sample 1, types of cellulose esters, compounds of the present invention, comparative compounds, and various kinds of other additives, as well as melt temperature of pellets were changed as listed in Tables 1-4.

Herein, the amount of each of various types of the cellulose esters used instead of used cellulose ester C-1 was allowed to be equal to that of cellulose ester C-1. Further, to allow the film thickness of each cellulose ester film sample to be 80 μm, extrusion amount and withdrawal rate were controlled.

The compounds used will now be detailed.

(Cellulose Esters)

C-1: Cellulose acetate propionate (acetyl group substitution degree: 1.41, propionyl group substitution degree: 1.32, molecular weight Mn: 69,000, and Mw/Mn=3.2)

C-2: Cellulose acetate propionate (acetyl group substitution degree: 1.31, propionyl group substitution degree: 1.23, molecular weight Mn: 66,000, and Mw/Mn=3.0)

C-3: Cellulose acetate propionate (acetyl group substitution degree: 1.44, propionyl group substitution degree: 1.46, molecular weight Mn: 74,000, and Mw/Mn=2.7)

C-4: Cellulose acetate propionate (acetyl group substitution degree: 1.65, propionyl group substitution degree: 1.05, molecular weight Mn: 90,000, and Mw/Mn=3.5)

C-5: Cellulose acetate propionate (acetyl group substitution degree: 1.50, propionyl group substitution degree: 1.44, molecular weight Mn: 81,000, and Mw/Mn=2.9)

C-6: Cellulose acetate propionate (acetyl group substitution degree: 2.00, propionyl group substitution degree: 0.75, molecular weight Mn: 91,000, and Mw/Mn=2.4)

The structures of IRGANOX1010, GSY-P101, SumilizerGS, TINUVIN928, PEP-36 (produced by Adeka Corp.), plasticizer A, plasticizer B, and plasticizer C used in Example 1 are as follows:

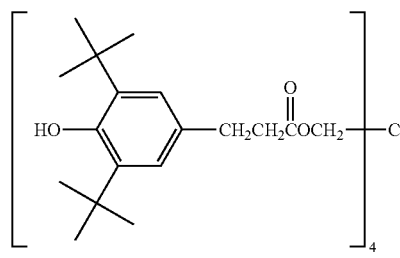

IRGANOX1010

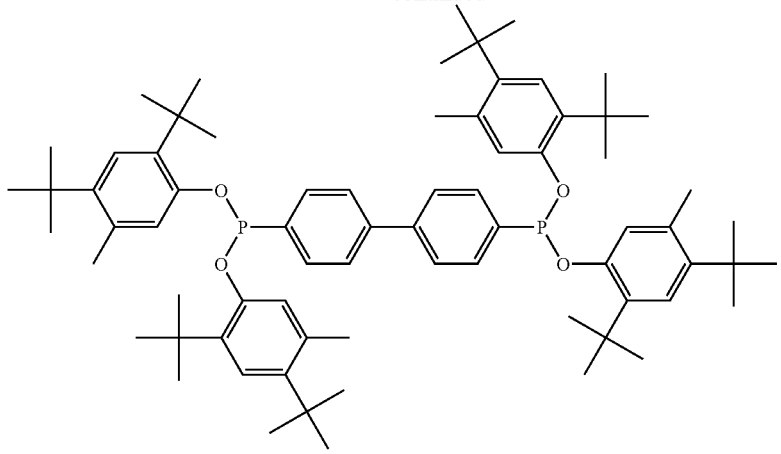
GSY-P101
(A mixture composed mainly of the compound having the following structure prepared via reaction of biphenyl, phosphorous trichloride, and 4,6-di-t-butyl-m-cresol)
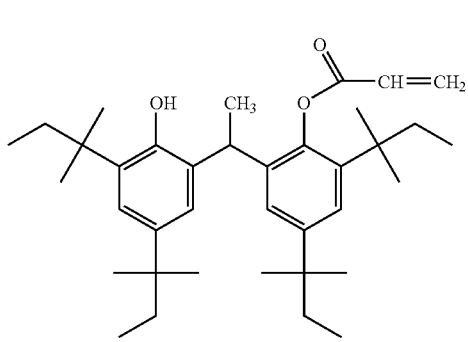
SumilizerGs
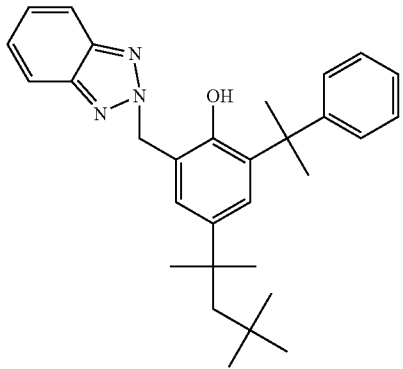
TINUVIN928
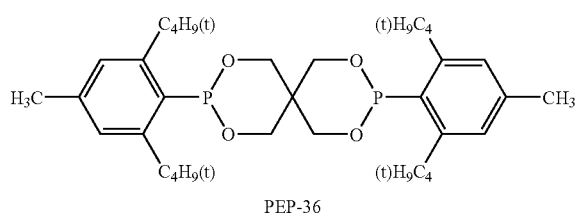
PEP-36
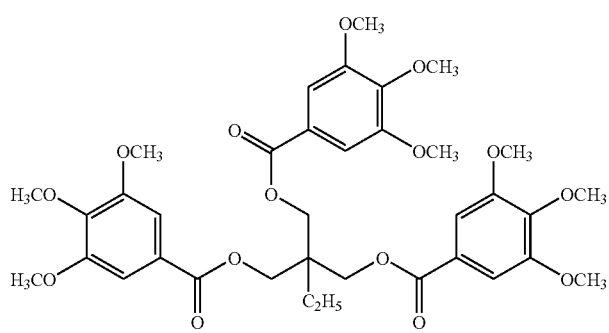
Plasticizer A

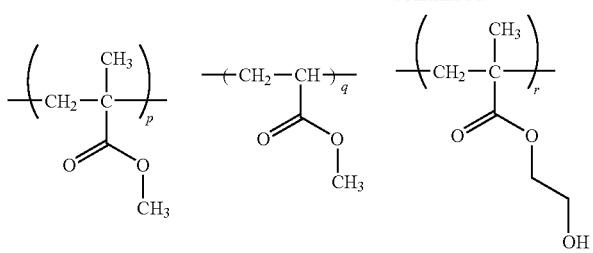

Plasticizer B (A copolymer of methyl methacrylate, methyl acrylate, and 2-hyrdoxyethyl methacrylate (refer to the composition ratio and the weight average molecular weight described below)

Composition ratio:
p/q/r = 80/10/10

Weight average molecular weight: 8,000

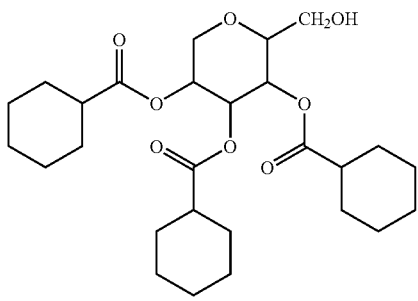

Plasticizer C

TABLE 1

| Cellulose ester sample No. | Cellulose ester | Inventive or Comparative Compound (corresponding to Formula (1)) | | Inventive or Comparative Compound (corresponding to Formula (2) or (3)) | | | |
|---|---|---|---|---|---|---|---|
| | | Compound-1 (% by mass) | Compound-2 (% by mass) | Compound-3 (% by mass) | Compound-4 (% by mass) | Compound-5 (% by mass) | Compound-6 (% by mass) |
| 1 | C-1 | A-1 (4.0) | | A-2 (3.0) | A-3 (1.0) | | |
| 2 | C-2 | A-1 (3.5) | | A-2 (2.5) | A-3 (2.0) | | |
| 3 | C-3 | A-1 (4.0) | | A-2 (3.0) | A-3 (1.0) | | |
| 4 | C-4 | A-1 (3.5) | | A-2 (2.5) | A-3 (2.0) | | |
| 5 | C-5 | A-1 (4.0) | | A-2 (3.0) | A-3 (1.0) | | |
| 6 | C-6 | A-1 (4.0) | | A-2 (3.0) | A-3 (1.0) | | |
| 7 | C-1 | A-9 (4.5) | | A-10 (4.5) | A-11 (1.0) | | |
| 8 | C-1 | A-19 (2.5) | | A-20 (1.6) | A-21 (0.9) | | |
| 9 | C-1 | A-1 (5.0) | | A-2 (4.0) | A-3 (3.0) | A-4 (2.0) | A-5 (1.0) |
| 10 | C-1 | B-1 (6.0) | | B-2 (1.0) | B-3 (1.0) | | |
| 11 | C-1 | B-15 (2.0) | | B-16 (0.8) | B-17 (0.2) | | |

| Cellulose ester sample No. | *1 | Other Additives | | | Melt Temperature (° C.) | Remarks |
|---|---|---|---|---|---|---|
| | | Additive-1 (% by mass) | Additive-2 (% by mass) | Additive-3 (% by mass) | | |
| 1 | 0.5 | GSY-P101 (0.25) | Sumilizer GS (0.25) | | 250 | inventive |

TABLE 1-continued

| | | | | | | |
|---|---|---|---|---|---|---|
| 2 | 0.44 | GSY-P101 (0.25) | Sumilizer GS (0.25) | | 250 | inventive |
| 3 | 0.5 | GSY-P101 (0.25) | Sumilizer GS (0.25) | | 250 | inventive |
| 4 | 0.44 | GSY-P101 (0.25) | Sumilizer GS (0.25) | | 250 | inventive |
| 5 | 0.5 | GSY-P101 (0.25) | Sumilizer GS (0.25) | | 250 | inventive |
| 6 | 0.5 | GSY-P101 (0.25) | Sumilizer GS (0.25) | | 250 | inventive |
| 7 | 0.45 | GSY-P101 (0.25) | Sumilizer GS (0.25) | | 250 | inventive |
| 8 | 0.5 | GSY-P101 (0.25) | Sumilizer GS (0.25) | | 250 | inventive |
| 9 | 0.33 | GSY-P101 (0.25) | Sumilizer GS (0.25) | | 250 | inventive |
| 10 | 0.75 | GSY-P101 (0.25) | Sumilizer GS (0.25) | | 250 | inventive |
| 11 | 0.17 | GSY-P101 (0.25) | Sumilizer GS (0.25) | | 250 | inventive |

*1: The value of a/(a + b) or a value of a/(a + b + c) obtained when the added amount of a compound represented by Formula (1) is designated as a (% by mass), the added amount of a compound represented by Formula (2) is designated as b (% by mass), and the added amount of a compound represented by Formula (3) is designated as c (% by mass)
(Note)
In every level, contained are 0.50% by mass of IRGANOX1010, 1.5% by mass of TINUVIN928, 0.2% by mass of AEROSIL NAX50, and 0.02% by mass of KE-P100

TABLE 2

| Cellulose ester sample No. | Cellulose ester | Inventive or Comparative Compound (corresponding to Formula (1)) | | Inventive or Comparative Compound (corresponding to Formula (2) or (3)) | | | |
|---|---|---|---|---|---|---|---|
| | | Compound-1 (% by mass) | Compound-2 (% by mass) | Compound-3 (% by mass) | Compound-4 (% by mass) | Compound-5 (% by mass) | Compound-6 (% by mass) |
| 12 | C-1 | F-1 (4.0) | | F-2 (2.0) | F-3 (2.0) | | |
| 13 | C-1 | G-1 (7.0) | | G-2 (4.0) | G-3 (3.0) | G-4 (1.0) | |
| 14 | C-1 | H-5 (7.0) | H-7 (1.0) | H-6 (2.0) | H-8 (1.0) | H-9 (1.0) | |
| 15 | C-1 | A-1 (4.0) | | A-2 (3.0) | A-3 (1.0) | | |
| 16 | C-1 | A-1 (3.5) | | A-2 (2.5) | A-3 (2.0) | | |
| 17 | C-1 | A-1 (1.6) | | A-2 (3.5) | A-3 (2.9) | | |
| 18 | C-1 | A-1 (7.0) | | A-2 (1.0) | | | |
| 19 | C-1 | A-16 (1.0) | | A-17 (7.0) | | | |
| 20 | C-1 | A-1 (3.0) | A-9 (2.0) | A-2 (3.0) | | | |
| 21 | C-3 | A-1 (3.5) | | A-2 (2.5) | A-3 (2.0) | | |
| 22 | C-4 | A-1 (4.0) | | A-2 (3.0) | A-3 (1.0) | | |

| Cellulose ester sample No. | *1 | Other Additives | | | Melt Temperature (° C.) | Remarks |
|---|---|---|---|---|---|---|
| | | Additive-1 (% by mass) | Additive-2 (% by mass) | Additive-3 (% by mass) | | |
| 12 | 0.5 | GSY-P101 (0.25) | Sumilizer GS (0.25) | | 250 | inventive |
| 13 | 0.47 | GSY-P101 (0.25) | Sumilizer GS (0.25) | | 250 | inventive |
| 14 | 0.67 | GSY-P101 (0.25) | Sumilizer GS (0.25) | | 250 | inventive |
| 15 | 0.5 | GSY-P101 (0.25) | Sumilizer GS (0.25) | plasticizer A (4) | 250 | inventive |
| 16 | 0.44 | GSY-P101 (0.25) | Sumilizer GS (0.25) | plasticizer B (4) | 250 | inventive |
| 17 | 0.2 | GSY-P101 (0.25) | Sumilizer GS (0.25) | | 250 | inventive |
| 18 | 0.88 | GSY-P101 (0.25) | Sumilizer GS (0.25) | | 250 | inventive |

TABLE 2-continued

| | | | | | |
|---|---|---|---|---|---|
| 19 | 0.13 | GSY-P101 (0.25) | Sumilizer GS (0.25) | 250 | inventive |
| 20 | 0.63 | GSY-P101 (0.25) | Sumilizer GS (0.25) | 250 | inventive |
| 21 | 0.44 | Compound (4) - 1(0.25) | Sumilizer GS (0.25) | 250 | inventive |
| 22 | 0.5 | Compound (4) - 3(0.25) | Sumilizer GS (0.25) | 250 | inventive |

*1: The value of a/(a + b) or a value of a/(a + b + c) obtained when the added amount of a compound represented by Formula (1) is designated as a (% by mass), the added amount of a compound represented by Formula (2) is designated as b (% by mass), and the added amount of a compound represented by Formula (3) is designated as c (% by mass)
(Note)
In every level, contained are 0.50% by mass of IRGANOX1010, 1.5% by mass of TINUVIN928, 0.2% by mass of AEROSIL NAX50, and 0.02% by mass of KE-P100

TABLE 3

| Cellulose ester sample No. | Cellulose ester | Inventive or Comparative Compound (corresponding to Formula (1)) | | Inventive or Comparative Compound (corresponding to Formula (2) or (3)) | | | |
|---|---|---|---|---|---|---|---|
| | | Compound-1 (% by mass) | Compound-2 (% by mass) | Compound-3 (% by mass) | Compound-4 (% by mass) | Compound-5 (% by mass) | Compound-6 (% by mass) |
| 23 | C-1 | A-1 (4.0) | | A-2 (3.0) | A-3 (1.0) | | |
| 24 | C-3 | A-1 (3.5) | | A-2 (2.5) | A-3 (2.0) | | |
| 25 | C-4 | A-1 (4.0) | | A-2 (3.0) | A-3 (1.0) | | |
| 26 | C-3 | A-1 (3.5) | | A-2 (2.5) | A-3 (2.0) | | |
| 27 | C-4 | A-1 (4.0) | | A-2 (3.0) | A-3 (1.0) | | |
| 28 | C-3 | A-1 (4.0) | | A-2 (3.0) | A-3 (1.0) | | |
| 29 | C-3 | A-1 (4.0) | | A-2 (3.0) | A-3 (1.0) | | |
| 30 | C-3 | A-1 (4.0) | | A-2 (3.0) | A-3 (1.0) | | |
| 31 | C-1 | A-1 (4.0) | | A-2 (3.0) | A-3 (1.0) | | |
| 32 | C-1 | A-1 (4.0) | | A-2 (3.0) | A-3 (1.0) | | |
| 33 | C-1 | A-1 (4.0) | | A-2 (3.0) | A-3 (1.0) | | |

| Cellulose ester sample No. | *1 | Other Additives | | | Melt Temperature (°C.) | Remarks |
|---|---|---|---|---|---|---|
| | | Additive-1 (% by mass) | Additive-2 (% by mass) | Additive-3 (% by mass) | | |
| 23 | 0.5 | GSY-P101 (0.25%) | Compound (5) - 3 (0.25) | | 250 | inventive |
| 24 | 0.44 | GSY-P101 (0.25%) | Compound (5) - 8 (0.25) | | 250 | inventive |
| 25 | 0.5 | GSY-P101 (0.25%) | Compound (5) - 45 (0.25) | | 250 | inventive |
| 26 | 0.44 | GSY-P101 (0.25%) | Compound (6) - 1 (0.25) | | 250 | inventive |
| 27 | 0.5 | GSY-P101 (0.25%) | Compound (6) - 13 (0.25) | | 250 | inventive |
| 28 | 0.5 | GSY-P101 (0.25%) | | | 250 | inventive |
| 29 | 0.5 | PEP-36 (0.25) | | | 250 | inventive |
| 30 | 0.5 | | | | 250 | inventive |
| 31 | 0.5 | GSY-P101 (0.25) | Sumilizer GS (0.25) | | 240 | inventive |
| 32 | 0.5 | GSY-P101 (0.25) | Sumilizer GS (0.25) | | 245 | inventive |
| 33 | 0.5 | GSY-P101 (0.25) | Sumilizer GS (0.25) | | 265 | inventive |

*1: The value of a/(a + b) or a value of a/(a + b + c) obtained when the added amount of a compound represented by Formula (1) is designated as a (% by mass), the added amount of a compound represented by Formula (2) is designated as b (% by mass), and the added amount of a compound represented by Formula (3) is designated as c (% by mass)
(Note)
In every level, contained are 0.50% by mass of IRGANOX1010, 1.5% by mass of TINUVIN928, 0.2% by mass of AEROSIL NAX50, and 0.02% by mass of KE-P100

TABLE 4

| Cellulose ester sample No. | Cellulose ester | Inventive or Comparative Compound (corresponding to Formula (1)) | | Inventive or Comparative Compound (corresponding to Formula (2) or (3)) | | | |
|---|---|---|---|---|---|---|---|
| | | Compound-1 (% by mass) | Compound-2 (% by mass) | Compound-3 (% by mass) | Compound-4 (% by mass) | Compound-5 (% by mass) | Compound-6 (% by mass) |
| 34 | C-1 | A-1 (4.0) | | A-2 (3.0) | A-3 (1.0) | | |
| 35 | C-1 | A-1 (8.0) | | | | | |
| 36 | C-1 | | | A-2 (8.0) | | | |
| 37 | C-1 | | | A-3 (8.0) | | | |
| 38 | C-1 | | | | | | |
| 39 | C-1 | A-19 (5.0) | | | | | |
| 40 | C-1 | B-1 (12) | | | | | |
| 41 | C-1 | B-15 (3.0) | | | | | |
| 42 | C-1 | F-1 (8.0) | | | | | |
| 43 | C-1 | A-19 (4.0) | F-1 (4.0) | | | | |
| 44 | C-1 | | | H-3 (80) | | | |

| Cellulose ester sample No. | *1 | Other Additives | | | Melt Temperature (° C.) | Remarks |
|---|---|---|---|---|---|---|
| | | Additive-1 (% by mass) | Additive-2 (% by mass) | Additive-3 (% by mass) | | |
| 34 | 0.5 | GSY-P101 (0.25) | Sumilizer GS (0.25) | | 270 | inventive |
| 35 | — | GSY-P101 (0.25) | Sumilizer GS (0.25) | | 250 | comparative |
| 36 | — | GSY-P101 (0.25) | Sumilizer GS (0.25) | | 250 | comparative |
| 37 | — | GSY-P101 (0.25) | Sumilizer GS (0.25) | | 250 | comparative |
| 38 | — | GSY-P101 (0.25) | Sumilizer GS (0.25) | plasticizer C (8.0) | 250 | comparative |
| 39 | — | GSY-P101 (0.25) | Sumilizer GS (0.25) | | 250 | comparative |
| 40 | — | GSY-P101 (0.25) | Sumilizer GS (0.25) | | 250 | comparative |
| 41 | — | GSY-P101 (0.25) | Sumilizer GS (0.25) | | 250 | comparative |
| 42 | — | GSY-P101 (0.25) | Sumilizer GS (0.25) | | 250 | comparative |
| 43 | — | GSY-P101 (0.25) | Sumilizer GS (0.25) | | 250 | comparative |
| 44 | — | GSY-P101 (0.25) | Sumilizer GS (0.25) | | 250 | comparative |

*1: The value of a/(a + b) or a value of a/(a + b + c) obtained when the added amount of a compound represented by Formula (1) is designated as a (% by mass), the added amount of a compound represented by Formula (2) is designated as b (% by mass), and the added amount of a compound represented by Formula (3) is designated as c (% by mass)
(Note)
In every level, contained are 0.50% by mass of IRGANOX1010, 1.5% by mass of TINUVIN928, 0.2% by mass of AEROSIL NAX50, and 0.02% by mass of KE-P100

[Evaluation of Cellulose Ester Film Samples]

The above-produced cellulose ester film samples were evaluated as described below. The results will be listed in Table 5.

(Pressure Defect)

The presence or absence of foreign substance deposits on conveyance rolls, being the first cooling roll, second cooling roll, and third cooling roll, was visually observed. Further, with regard to the cellulose ester film samples after peeled, the presence or absence of a pattern (pressure defects) caused by foreign substance transfer to a cellulose ester film was visually observed, A: No deposits or pressure defects are generated.

B: A slight amount of deposits are noted but no pressure defects are noted.

C: A small amount of deposits are noted and pressure defects are noted to a small extent.

D: Deposits are generated and pressure defects are easily observed.

Herein, A and B were judged to be practically non-problematic.

(Durability after Alkali Saponification)

Each of the obtained cellulose ester film samples was subjected to alkali saponification under the following conditions.

| <Alkali Saponification> | |
|---|---|
| Saponification process: 2 mol/l of NaOH | 50° C. 90 seconds |
| Washing process: water | 30° C. 45 seconds |
| Neutralization process: 10% by mass of HCl | 30° C. 45 seconds |
| Washing process: water | 30° C. 45 seconds |

Under the above conditions, each sample was subjected to saponification, washing, neutralization, and washing in this sequential order, followed by being sufficiently drained to carry out blow drying at 80° C. for 1 hour.

Each obtained cellulose ester film sample having been saponified was allowed to stand under a high temperature/humidity ambience of 80° C. and 90% RH for 300 hours. Then, the presence or absence of crystalline deposits on the surface of the cellulose ester film sample was visually observed to carry out evaluation based on the following criteria.

A: No generation of crystalline deposits on the surface is noted at all.

B: A slight amount of crystalline deposits are partially noted on the surface.

C: A slight amount of crystalline deposits are noted over the entire surface.

D: Definitive crystalline deposits are noted over the entire surface.

Herein, A and B were judged to be practically non-problematic.

TABLE 5

| Cellulose Ester Film Sample No. | Pressure Defect | Durability after Saponification | Remarks |
|---|---|---|---|
| 1 | A | A | inventive |
| 2 | A | A | inventive |
| 3 | A | A | inventive |
| 4 | A | A | inventive |
| 5 | A | A | inventive |
| 6 | B | A | inventive |
| 7 | A | A | inventive |
| 8 | A | A | inventive |
| 9 | A | A | inventive |
| 10 | B | A | inventive |
| 11 | B | A | inventive |
| 12 | A | A | inventive |
| 13 | A | A | inventive |
| 14 | A | A | inventive |
| 15 | A | A | inventive |
| 16 | A | A | inventive |
| 17 | B | A | inventive |
| 18 | A | B | inventive |
| 19 | B | A | inventive |
| 20 | A | A | inventive |
| 21 | A | A | inventive |
| 22 | A | A | inventive |
| 23 | A | A | inventive |
| 24 | A | A | inventive |
| 25 | A | A | inventive |
| 26 | A | A | inventive |
| 27 | A | A | inventive |
| 28 | A | A | inventive |
| 29 | A | B | inventive |
| 30 | B | B | inventive |
| 31 | A | A | inventive |
| 32 | A | A | inventive |
| 33 | B | A | inventive |
| 34 | B | A | inventive |
| 35 | C | D | comparative |
| 36 | C | D | comparative |
| 37 | C | D | comparative |
| 38 | C | D | comparative |
| 39 | C | D | comparative |
| 40 | D | D | comparative |

TABLE 5-continued

| Cellulose Ester Film Sample No. | Pressure Defect | Durability after Saponification | Remarks |
|---|---|---|---|
| 41 | D | D | comparative |
| 42 | C | D | comparative |
| 43 | C | D | comparative |
| 44 | C | D | comparative |

Table 5 clearly showed that cellulose ester film samples 1-34 of the present invention were excellent films exhibiting pressure defects to a minimal extent and enhanced durability after saponification, compared to cellulose ester film samples 35-44 as the comparative examples.

Example 2

The following compositions were prepared.

| (Antistatic Layer Coating Composition (1)) | |
|---|---|
| Polymethyl methacrylate (mass average molecular weight: 550,000 and Tg: 90° C.) | 0.5 part |
| Propylene glycol monomethyl ether | 60 parts |
| Methyl ethyl ketone | 16 parts |
| Ethyl lactate | 5 parts |
| Methanol | 8 parts |
| Conductive polymer resin P-1 (particles of 0.1-0.3 μm) | 0.5 part |

Conductive polymer resin P-1

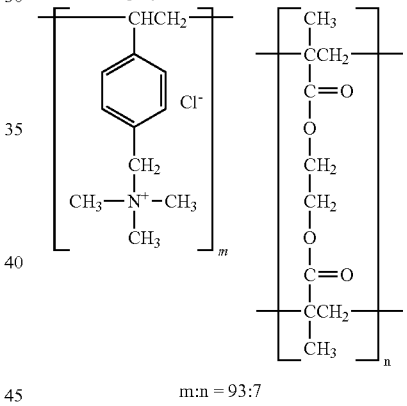

m:n = 93:7

| (Hard Coat Layer Coating Composition (2)) | |
|---|---|
| Dipentaerythritol hexaacrylate monomer | 60 parts |
| Dipentaerythritol hexaacrylate dimer | 20 parts |
| Dipentaerythritol hexaacrylate trimer and higher multimer components | 20 parts |
| Diethoxybenzophenone photoreaction initiator | 6 parts |
| Silicone-based surfactant | 1 part |
| Propylene glycol monomethyl ether | 75 parts |
| Methyl ethyl ketone | 75 parts |
| (Anti-curling Layer Coating Composition (3)) | |
| Acetone | 35 parts |
| Ethyl acetate | 45 parts |
| Isopropyl alcohol | 5 parts |
| Diacetyl cellulose | 0.5 part |
| 2% acetone dispersion of submicron particle silica (AEROSIL 200 V, produced by Ninon Aerosil Co., LTD.) | 0.1 part |

Function-provided polarizing plate protective films were produced as follows.

[Production of Polarizing Plate Protective Film 1]

Cellulose ester film sample 1 of the present invention produced in Example 1 was double-wrapped with a polyethylene sheet and stored under a condition of 25° C. and 50% RH for 30 days. Then, each polyethylene sheet was removed. Anti-curling layer coating composition (3) was gravure-coated on one side of the cellulose ester film sample at a wet film thickness of 13 μm and dried at a drying temperature of 80±5° C. Then, antistatic layer coating composition (1) was coated, at a film conveyance rate of 30 m/minute and a coating width of 1 m, on the other side of this cellulose ester film sample under an ambience of 28° C. and 82% RH at a wet film thickness of 7 μm, and then dried in a drying section set at 80±5° C. to provide a resin layer of a dry film thickness of about 0.2 μm. Thus, a cellulose ester film sample provided with such an antistatic layer was obtained. Further, on this antistatic layer, hard coat layer coating composition (2) was coated at a wet film thickness of 13 μm and dried at a drying temperature of 90° C., followed by exposure to UV radiation at 150 mJ/m$^2$ to provide a clear hard coat layer of a dry film thickness of 5 μm. This is designated as polarizing plate protective film sample 1.

Polarizing plate protective film samples 2-34 of the present invention and comparative polarizing plate protective film samples 35-44 were produced in the same manner as described above except that cellulose ester film sample 1 was replaced with cellulose ester film samples 2-34 of the present invention and comparative cellulose ester film samples 35-44, respectively.

[Evaluation of Polarizing Plate Protective Film Samples]

The above-produced polarizing plate protective film samples were evaluated as described below. The results will be listed in Table 6.

(Abrasion Resistance)

Each obtained cellulose ester film sample was stored under an ambience of 23° C. and 55% RH. Thereafter, #0000 steel wool (SW) was placed on the film surface of the hard coat layer side of the sample at a load of 200 g/cm$^2$ to measure the number of abrasion lines per cm in width generated during 10 reciprocations with the load. Herein, with regard to the number of abrasion lines, of the portions applied with the load, measurement was performed on a portion having the maximum number of abrasion lines and then evaluation was conducted based on the following criteria.

A: 0-5 lines/cm
B: 6-10 lines/cm
C: 11-20 lines/cm
D: At least 21 lines/cm

Herein, A and B were judged to be practically non-problematic.

TABLE 6

| Polarizing plate protective film sample no. | Abrasion resistance | Remarks |
| --- | --- | --- |
| 1 | A | Inventive |
| 2 | A | Inventive |
| 3 | A | Inventive |
| 4 | A | Inventive |
| 5 | A | Inventive |
| 6 | B | Inventive |
| 7 | A | Inventive |
| 8 | A | Inventive |
| 9 | A | Inventive |
| 10 | B | Inventive |
| 11 | B | Inventive |
| 12 | B | Inventive |
| 13 | B | Inventive |

TABLE 6-continued

| Polarizing plate protective film sample no. | Abrasion resistance | Remarks |
| --- | --- | --- |
| 14 | B | Inventive |
| 15 | A | Inventive |
| 16 | A | Inventive |
| 17 | A | Inventive |
| 18 | A | Inventive |
| 19 | A | Inventive |
| 20 | A | Inventive |
| 21 | A | Inventive |
| 22 | A | Inventive |
| 23 | A | Inventive |
| 24 | A | Inventive |
| 25 | A | Inventive |
| 26 | A | Inventive |
| 27 | A | Inventive |
| 28 | A | Inventive |
| 29 | A | Inventive |
| 30 | B | Inventive |
| 31 | B | Inventive |
| 32 | B | Inventive |
| 33 | A | Inventive |
| 34 | A | Inventive |
| 35 | C | Comparative |
| 36 | C | Comparative |
| 37 | C | Comparative |
| 38 | D | Comparative |
| 39 | C | Comparative |
| 40 | D | Comparative |
| 41 | D | Comparative |
| 42 | D | Comparative |
| 43 | C | Comparative |
| 44 | D | Comparative |

Table 6 clearly showed that polarizing plate protective film samples 1-34 of the present invention produced from cellulose ester film samples 1-34 of the present invention exhibited excellent abrasion resistance, compared to comparative polarizing plate protective film samples 35-44 produced from cellulose ester film samples 35-44 as the comparative examples.

Example 3

Production and Evaluation of Polarizing Plates

A polyvinyl alcohol film of a thickness of 120 μm was immersed in an aqueous solution containing 1 part by mass of iodine, 2 parts by mass of potassium iodide, and 4 parts by mass of boric acid and stretched at 50° C. by a factor of 4 to produce a polarizer.

Each of cellulose ester film samples 1-34 of the present invention and comparative cellulose ester film samples 35-44 produced in Example 1 was double-wrapped with a polyethylene sheet and stored under an ambience of 25° C. and 50% RH for 30 days. Then, each polyethylene sheet was removed and each cellulose ester film was alkali-treated with a 2.5 ml/l sodium hydroxide aqueous solution of 40° C. for 60 seconds, followed by washing and drying to carry out alkali treatment of the surface thereof.

The alkali-treated surface of each of samples 1-34 of the present invention and comparative samples 35-44 was bonded to both sides of the above polarizer using a 5% aqueous solution of a completely saponified polyvinyl alcohol as an adhesive to produce polarizing plates 1-34 of the present invention and comparative polarizing plates 35-44 formed with a protective film.

[Evaluation of Polarizing Plates]

The above-produced polarizing plate samples were evaluated as described below. The results will be listed in Table 7.

(Adhesion Properties)

Each polarizing plate sample was treated at 80° C. and 90% RH for 1200 hours and then the bonded state of the polarizer and the protective film was observed to carry out ranking based on the following criteria.

A: No peeling occurs.

B: Peeling is slightly noted, resulting, however, in no practical problem.

C: Peeling is noted to some extent, resulting in a practical problem.

D: Peeling occurs.

Herein, A and B were judged to be practically non-problematic.

(Processability)

In production of a polarizing plate sample, the presence or absence of minute bubbles were visually observed at the interface between a polarizer and a cellulose ester film sample during bonding. Processability is considered excellent with respect to a sample having a less number of such bubbles.

A: No bubbles were present on the bonding surface at all.

B: A slight number of bubbles were noted partially on the bonding surface.

C: A small number of bubbles were noted over the entire bonding surface.

D: Bubbles were markedly noted over the entire bonding surface.

Herein, A and B were judged to be practically non-problematic.

(Durability)

From one of the above-produced polarizing plate samples, 2 sheets of polarizing plate samples of 500 mm×500 mm were cut out and heat-treated (condition: allowed to stand at 90° C. for 100 hours), and thereafter placed in the orthogonal state. Then, the length of a white defect portion at the edge of whichever center line portion is longer in the vertical and the horizontal direction was measured and the ratio of the side to the length (500 mm) was calculated for the following judgment based on the ratio. The white defect portion at the edge means that the edge portion of a polarizing plate through which no light normally passes in the orthogonal state becomes a portion in a state where light passes therethrough, which can visually be judged. In the state of a polarizing plate, a defect in which no display is realized at the edge is produced.

A: A white defect at the edge is less than 50.

B: A white defect at the edge is 5%-less than 10%.

C: A white defect at the edge is 10%-less than 20%.

D: A white defect at the edged is at least 20%.

Herein, A and B were judged to be practically non-problematic.

TABLE 7

| Polarizing Plate Sample No. | Adhesion Properties | Processability | Durability | Remarks |
|---|---|---|---|---|
| 1 | A | A | A | inventive |
| 2 | A | A | A | inventive |
| 3 | A | A | A | inventive |
| 4 | A | A | A | inventive |
| 5 | B | A | A | inventive |
| 6 | A | A | A | inventive |
| 7 | A | A | B | inventive |
| 8 | A | A | B | inventive |
| 9 | A | A | A | inventive |
| 10 | A | B | B | inventive |
| 11 | A | B | B | inventive |
| 12 | A | A | B | inventive |
| 13 | A | A | A | inventive |
| 14 | B | A | B | inventive |
| 15 | A | A | A | inventive |
| 16 | A | A | A | inventive |
| 17 | B | A | A | inventive |
| 18 | B | B | A | inventive |
| 19 | A | A | B | inventive |
| 20 | A | A | A | inventive |
| 21 | A | A | A | inventive |
| 22 | A | A | A | inventive |
| 23 | A | A | A | inventive |
| 24 | A | A | A | inventive |
| 25 | A | A | A | inventive |
| 26 | A | A | A | inventive |
| 27 | A | A | A | inventive |
| 28 | B | A | A | inventive |
| 29 | B | B | B | inventive |
| 30 | B | B | B | inventive |
| 31 | B | A | A | inventive |
| 32 | A | A | A | inventive |
| 33 | A | A | A | inventive |
| 34 | A | B | B | inventive |
| 35 | D | B | B | comparative |
| 36 | C | B | C | comparative |
| 37 | C | C | C | comparative |
| 38 | D | D | D | comparative |
| 39 | C | B | D | comparative |
| 40 | C | D | D | comparative |
| 41 | C | D | D | comparative |
| 42 | C | C | D | comparative |
| 43 | C | C | D | comparative |
| 44 | D | C | B | comparative |

Table 7 clearly showed that cellulose ester film samples 1-34 of the present invention exhibited excellent adhesion properties to a polarizer and excellent processability, compared to comparative cellulose ester film samples 35-44; and above-produced polarizing plates 1-34 of the present invention exhibited excellent durability, compared to comparative polarizing plates 35-44.

(Characteristic Evaluation as Liquid Crystal Display Devices)

The polarizing plates of 15 diagonal inch display VL-1530S (produced by Fujitsu Ltd.), being a VA type liquid crystal display device, were removed. Then, each of the above-produced polarizing plates was cut to fit in the size of the liquid crystal cell. Two polarizing plates, having been thus produced, were orthogonally bonded to sandwich the liquid crystal cell in such a manner that the polarization axis of each polarizing plate was directed in the same direction as original to produce a 15 diagonal inch VA type color liquid crystal display. Then, characteristics of the cellulose ester films as a polarizing plate were evaluated, whereby each of the liquid crystal display devices employing polarizing plates 1-34 of the present invention exhibited enhanced contrast and excellent display performance, compared to liquid crystal display devices employing comparative polarizing plates 35-44, which confirmed excellence as a polarizing plate for an image display device such as a liquid crystal display.

Example 4

Production of Anti-reflection Films and Polarizing Plates

Using each of cellulose ester films 1-44 produced in Example 1, a hard coat layer and an anti-reflection layer were formed on one side thereof to produce an anti-reflection film provided with a hard coat. With this, a polarizing plate was produced.

<Hard Coat Layer>

The following hard coat layer composition was coated at a dry film thickness of 3.5 μm and dried at 80° C. for 1 minute. Then, curing was carried out, using a high pressure mercury lamp (80 W) in a condition of 150 mJ/cm² to produce a hard coat film provided with a hard coat layer. The refractive index of the hard coat layer was 1.50.

| <Hard Coat Layer Composition (C-1)> | |
| --- | --- |
| Dipentaerythritol hexaacrylate (containing components of dimers and higher multimers at about 20%) | 108 parts by mass |
| IRUGACURE184 (produced by Ciba Japan K.K.) | 2 parts by mass |
| Propylene glycol monomethyl ether | 180 parts by mass |
| Ethyl acetate | 120 parts by mass |

Subsequently, a medium refractive index layer, a high refractive index layer, and a low refractive index layer were coated on the hard coat layer in this sequential order to provide an anti-reflection layer.

<Medium Refractive Index Layer>

The following medium refractive index layer composition was coated on the hard coat layer of the above hard coat film using an extrusion coater and dried under a condition of 80° C. and 0.1 m/second for 1 minute. In this case, a non-contact floater was used until completion of finger-touch dryness (a state where dryness is felt by finger touch to the coated surface). As the non-contact floater, horizontal floater-type air-turnbars (produced by Bellmatic Ltd.) were used. The static pressure in the floater was set at 9.8 kPa and conveyance was carried out via uniform floating about 2 mm in the width direction. After drying, curing was conducted via exposure to UV radiation at 130 mJ/cm² using a high pressure mercury lamp (80W) to produce a medium refractive index layer film provided with a medium refractive index layer. The thickness of the medium refractive index layer of this medium refractive index layer film was 84 nm and the refractive index was 1.66.

| <Medium Refractive Index Layer Composition> | |
| --- | --- |
| 20% ITO fine particle dispersion (average particle diameter: 70 nm, isopropyl alcohol solution) | 100 g |
| Dipentaerythritol hexaacrylate | 6.4 g |
| IRUGACURE184 (produced by Ciba Japan K.K.) | 1.6 g |
| Tetrabutoxytitanium | 4.0 g |
| 10% FZ-2207 (produced by Nippon Unicar Co., Ltd., propylene glycol monomethyl ether solution) | 3.0 g |
| Isopropyl alcohol | 530 g |
| Methyl ethyl ketone | 90 g |
| Propylene glycol monomethyl ether | 265 g |

<High Refractive Index Layer>

The following high refractive index layer composition was coated on the medium refractive index layer using an extrusion coater and dried under a condition of 80° C. and 0.1 m/second for 1 minute. In this operation, a non-contact floater was used until completion of finger-touch dryness (a state where dryness is felt by finger touch to the coated surface). The non-contact floater was used under the same conditions as in formation of the medium refractive index layer. After drying, curing was conducted via exposure to UV radiation at 130 mJ/cm² using a high pressure mercury lamp (80W) to produce a high refractive index layer film provided with a high refractive index layer.

| <High Refractive Index Layer Composition> | |
| --- | --- |
| Tetra-n-butoxytitanium | 95 parts by mass |
| Dimethyl polysiloxane (KF-96-1000CS, produced by Shin-Etsu Chemical Co., Ltd.) | 1 part by mass |
| γ-methacryloxypropyltrimethoxysilane 3 (KBM503, produced by Shin-Etsu Chemical Co., Ltd.) | 5 parts by mass |
| Propylene glycol monomethyl ether | 1750 parts by mass |
| Isopropyl alcohol | 3450 parts by mass |
| Methyl ethyl ketone | 600 parts by mass |

Herein, the thickness of the high refractive index layer of this high refractive index layer film was 50 μl and the refractive index was 1.82.

<Low Refractive Index Layer>

Initially, silica-based fine particles (hollow particles) were prepared.

(Preparation of Silica-based Fine Particle P-1)

A mixture of 100 g of a silica sol of an average particle diameter of 5 nm and a $SiO_2$ concentration of 20% by mass and 1900 g of purified water was heated to 80° C. The pH of this mother reaction liquid was 10.5. There were simultaneously added, to the mother liquid, 9000 g of a 0.98% by mass sodium silicate aqueous solution as $SiO_2$ and 9000 g of a 1.02% by mass sodium aluminate aqueous solution as $Al_2O_3$. During the above addition, the temperature of the reaction liquid was kept at 80° C. The pH of the reaction liquid increased to 12.5 immediately after the addition, and thereafter remained nearly the same. After completion of the addition, the reaction liquid was cooled to room temperature and washed with an ultrafiltration membrane to prepare an $SiO_2 \cdot Al_2O_3$ core particle dispersion of a solid concentration of 20% by mass (Process (a)).

Then, 1700 g of water was added to 500 g of this core particle dispersion, followed by being heated to 98° C. While this temperature remained the same, 3000 g of silicic acid liquid ($SiO_2$ concentration: 3.5% by mass), having been prepared via dealkalization of an sodium silicate aqueous solution using a cation exchange resin, was added to prepare a core particle dispersion forming a first silica cover layer (Process (b)).

Subsequently, 1125 g of purified water was added to 500 g of the core particle dispersion, which had formed the first silica cover layer, having a solid concentration of 13% by mass resulting from washing with the ultrafiltration membrane. Further, dealuminization was performed by allowing the pH to become 1.0 by dripping concentrated hydrochloric acid (35.5%). Then, while 10 L of a hydrochloric acid aqueous solution of a pH of 3 and 5 L of purified water were added, aluminum salts dissolved were separated using an ultrafiltration membrane to prepare a porous $SiO_2 \cdot Al_2O_3$ particle dispersion, in which some of the constituent components of the core particles which had formed the first silica cover layer were removed (Process (c)). A mixed liquid of 1500 g of the above porous particle dispersion, 500 g of purified water, 1750 g of ethanol, and 626 g of 28% ammonia water was heated to 35° C., and then 104 g of ethyl silicate ($SiO_2$: 28% by mass) was added. Thereafter, the surface of the porous particles forming the first silica cover layer was coated with a hydrolysis polycondensate of ethyl silicate to form a second silica cover layer. Subsequently, using an ultrafiltration membrane, a silica-based fine particle dispersion of a solid concentration of 20% by mass was prepared in which the solvent was replaced with ethanol.

The thickness, the average particle diameter, MOx/SO$_2$ (mol ratio), and the refractive index of the first silica cover layer containing this silica-based particle are listed in Table 8. Herein, the average particle diameter was determined via a dynamic light scattering method. The refractive index was determined via the following method using Series A and AA (produced by Cargill Co.) as standard refraction fluids.

<Determination Method of Particle Refractive Index>

(1) A particle dispersion is placed in an evaporator and the dispersion medium is evaporated.

(2) The resulting substance is dried at 120° C. to give powder.

(3) Two or three drops of a standard refraction fluid having a known refractive index are dropped on a glass plate and the above powder is mixed therewith.

(4) Above operation (3) is conducted for various standard refraction fluids, and when the mixed liquid becomes transparent, the refractive index of the standard refraction fluid used is designated as the refractive index of the colloidal particle.

TABLE 8

| | | Core Particle | Silica Cover Layer | | | Silica-based Fine Particle | | |
| | | | First | Second | Outer | | Average | |
| No. | Type | Mo$x$/SiO$_2$ Mol Ratio | Layer Thickness (nm) | Layer Thickness (nm) | Shell Thickness (nm) | Mo$x$/SiO$_2$ Mol Ratio | Particle Diameter (nm) | Refractive Index |
|---|---|---|---|---|---|---|---|---|
| P-1 | Al/Si | 0.5 | 3 | 5 | 8 | 0.0017 | 47 | 1.28 |

(Formation of a Low Refractive Index Layer)

Above silica-based fine particle P-1 of an average particle diameter of 60 nm was added to a matrix prepared by mixing 95 mol % of Si(OC$_2$H$_5$)$_4$ with 5 mol % of C$_3$F$_7$—(OH$_3$F$_6$)$_{24}$—O—(CF$_2$)$_2$—C$_2$H$_4$—O—CH$_2$Si(OCH$_3$)$_3$, and then using 1.0N-HCl as a catalyst, a low refractive index coating agent which was further diluted with a solvent was produced. The coating solution was coated on the above actinic radiation curable resin layer or the high refractive index layer at a film thickness of 100 nm via a die coater method and dried at 120° C. for 1 minute to form a low refractive index layer of a refractive index of 1.37 via exposure to UV radiation.

Thus, anti-reflection films were produced using cellulose ester film samples 1-44 produced in Example 1.

Subsequently, a polyvinyl alcohol film of a thickness of 120 μm was uniaxially stretched (temperature; 110° C. and stretching factor: 5). The resulting film was immersed in an aqueous solution containing 0.075 g of iodine, 5 g of potassium iodide, and 100 g of water for 60 seconds and thereafter in an aqueous solution containing 6 g of potassium iodide, 7.5 g of boric acid, and 100 g of water at 68° C. The thus-immersed film was washed and dried to obtain a polarizer.

Then, the polarizer, the anti-reflection film described above, and a cellulose ester film of the rear side were bonded based on following steps 1-5 to produce a polarizing plate. As the polarizing plate protective film of the rear side, Konica Minolta TAC KC8UCR-4 (produced by Konica Minolta Opto, Inc.), a commercially available cellulose ester film, was used for the polarizing plate.

Step 1: The above anti-reflection film was obtained whose side bonded to the polarizer was saponified in such a manner that immersion was carried out in a 2 mol/l sodium hydroxide solution of 60° C. for 90 seconds and then washing and drying were conducted.

Step 2: The polarizer was immersed in a bath containing a polyvinyl alcohol adhesive of a solid content of 2% by mass for 1-2 seconds.

Step 3: An excessive amount of the adhesive having adhered to the polarizer in step 2 was lightly wiped off and the resulting polarizer was placed on the optical film, treated in step 1, for lamination.

Step 4: The anti-reflection film sample, the polarizer, and the cellulose ester film laminated in step 3 were bonded together at a pressure of 20-30 N/cm$^2$ and a conveyance rate of about 2 m/minute.

Step 5: The sample produced in step 4 via bonding of the polarizer, the cellulose ester film, and the anti-reflection film was dried in a drying apparatus of 80° C. for 2 minutes to produce a polarizing plate.

[Production of Liquid Crystal Display Devices]

Liquid crystal panels for viewing angel measurement were produced via the following manner and characteristics as a liquid crystal display device were evaluated.

The polarizing plates originally bonded on both sides were removed from 32 diagonal inch TV set AQ-32AD5 (produced by Sharp Corp.), being a VA-type liquid crystal display device, and then each of the above-produced polarizing plates was bonded to the glass surface of the liquid crystal cell.

Then, each liquid crystal display device was produced in which, in this operation, with regard to the bonding direction of the polarizing plate, the anti-reflection film surface was placed on the liquid crystal observation side and also the absorption axis was directed in the same direction as that of the originally bonded polarization plate.

The anti-reflection films produced using cellulose ester film samples 1-34 of the present invention produced in Example 1 exhibited minimal hardness non-uniformity and streak non-uniformity, and the polarizing plates and the liquid crystal display devices using the same exhibited no reflection color non-uniformity and excellent display characteristics in terms of contrast. In contrast, the anti-reflection films produced using cellulose ester film samples 35-44 compared in Example 1 exhibited hardness and streak non-uniformity, and in the polarizing plates and the liquid crystal display devices using the same, reflection color non-uniformity was observed.

What is claimed is:

1. A cellulose ester film comprising:
   a cellulose ester; a compound represented by Formula (1); and a compound represented by Formula (2);

Formula (1):

$$G + L - R_1)_r$$

Formula (2):

$$(HO +_m G + L - R_1)_n,$$

wherein G represents a monosaccharide residue or a polysaccharide residue having 2 to 10 monosaccharide units; L represents a divalent linking group comprising one or more group selected from a group of a single bond, —O—, —CO—, —NR$_2$— (wherein R$_2$ represents an aliphatic group or an aromatic group), and an aliphatic group; R$_1$ represents an aliphatic group or an aromatic group, each of which may have a substituent respectively; m and n represent an integer of 1 or more; r represents an integer of 3 or more and m+n≧3; and the cellulose ester film satisfies Expression (I);

Expression (I) 0.20<a/(a+b)<0.80, wherein a represents the percent by weight of the compound represented by Formula (1) in the cellulose ester film, and b represents the percent by weight of the compound represented by Formula (2) in the cellulose ester film.

2. The cellulose ester film of claim 1 comprising:

a compound represented by Formula (3); and the cellulose ester satisfying Expression (II);

$$0.20 \leq a/(a+b+c) \leq 0.80, \qquad \text{Expression (II)}$$

wherein a represents the percent by weight of the compound represented by Formula (1) in the cellulose ester film, b represents the percent by weight of the compound represented by Formula (2) in the cellulose ester film and c represents the percent by weight of the compound represented by Formula (3) in the cellulose ester film;

Formula (3):

wherein G represents a monosaccharide residue or a polysaccharide residue having 2 to 10 monosaccharide units; L represents a divalent linking group comprising one or more group selected from a group of a single bond, —O—, —CO—, —NR$_2$— (wherein R$_2$ represents an aliphatic group or an aromatic group) and an aliphatic group; R$_1$ represents an aliphatic group or an aromatic group, each of which may have a substituent respectively; p and q represent an integer of 1 or more, p≠m, q≠n and p+q≧3.

3. The cellulose ester film of claim 2, wherein L in Formulas (1) to (3) is a divalent linking group represented by —OCO—.

4. The cellulose ester film of claim 2, wherein G in Formulas (1) to (3) is the polysaccharide residue having 2 to 6 monosaccharide units.

5. The cellulose ester film of claim 4, wherein G is a sucrose residue.

6. The cellulose ester film of claim 2, wherein R$_1$ in Formulas (1) to (3) is an aromatic group.

7. The cellulose ester film of claim 1 comprising:
a compound represented by Formula (4);

Formula (4):

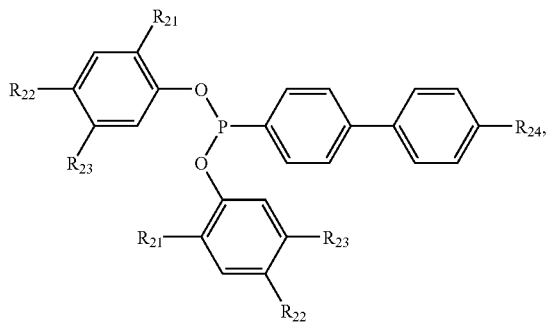

wherein R$_{21}$ and R$_{22}$ represent an alkyl group or a cyclo alkyl group, each of which may have a substituent respectively; R$_{23}$ represents an alkyl group or a cyclo alkyl group or an aryl group, each of which may have a substituent respectively; and R$_{24}$ represents a hydrogen atom or a phosphor atom.

8. The cellulose ester film of claim 1 comprising:

a compound represented by Formula (5) or a compound represented by Formula (6);

Formula (5):

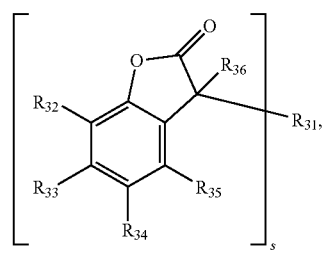

wherein R$_{32}$ and R$_{35}$ each independently represent a hydrogen atom or a substituent; R$_{36}$ represent a hydrogen atom or a substituent; s represents an integer of 1 to 4; R$_{31}$ represents a substituent when s is 1; R$_{31}$ represents a linking group having 2 to 4 valence when s is an integer of 2 to 4; wherein the substituent represent an alkyl group, a cyclo alkyl group, an aryl group, an acylamino group, an alkylthio group, an arylthio group, an alkenyl group, a halogen atom, an alkynyl group, a heterocyclic group, an alkylsulfonyl group, an arylsulfonyl group, an alkylsulfynyl group, an arylsulfynyl group, a phosphono group, an acyl group, a carbamoyl group, a sulfamoyl group, a sulfonamide group, a cyano group, an alkoxy group, an aryloxy group, a heterocyclic oxy group, a cyloxy group, an acyloxy group, a sulfonic acid group, a salt of sulfonic acid, an aminocarbonyloxy group, an amino group, an aniline group, an imide group, an ureido group, an alkoxycarbonylamino group, an alkoxycarbonyl group, an aryloxycarbonyl group, a heterocyclicthio group, a thioureido group, a carboxyl group, a slat of carboxylic acid, a hydroxyl group, a mercapto group or a nitro group;

Formula (6):

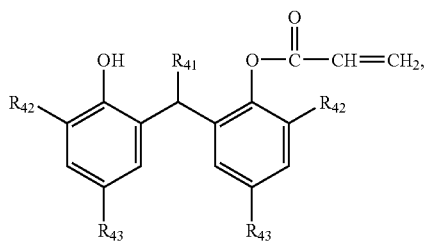

wherein $R_{41}$ represent a hydrogen atom or an alkyl group having 1 to 10 carbon atoms; $R_{42}$ and $R_{43}$ each independently represent a independently represent an alkyl group having 1 to 8 carbon atoms.

9. The cellulose ester film of claim 1 wherein the cellulose ester satisfies Expression (III) and (IV);

$$2.4 \leq X+Y \leq 2.90, \quad \text{Expression (III)}$$

$$1.00 \leq Y \leq 1.50, \quad \text{Expression (IV)}$$

wherein X represents a degree of substitution by an acetyl group and Y represents a degree of substitution by an propionyl group.

10. A method of producing the cellulose ester film of claim 1 comprising a step of a melt casting.

11. The method of producing the cellulose ester film of claim 10, wherein a melting temperature is 245° C. to 265° C.

12. A protective film for a polarizing plate comprising the cellulose ester film of claim 1 or the cellulose ester film produced by the method of production for the cellulose ester film of claim 10.

13. A polarizing plate comprising the cellulose ester film of claim 1 or the cellulose ester film produced by the method of production for the cellulose ester film of claim 11 at least on one side of polarizer.

14. A liquid crystal display comprising the polarizing plate of claim 13 at least on side of a liquid crystal cell.

* * * * *